(12) United States Patent
Kanoh et al.

(10) Patent No.: US 6,208,395 B1
(45) Date of Patent: *Mar. 27, 2001

(54) REFLECTIVE LIQUID CRYSTAL DISPLAY AND METHOD FOR FABRICATING THE SAME

(75) Inventors: Hiroshi Kanoh; Eishi Mizobata; Setsuo Kaneko, all of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/689,718

(22) Filed: Aug. 16, 1996

(30) Foreign Application Priority Data

Aug. 16, 1995 (JP) ................................... 7-208817

(51) Int. Cl.⁷ ........................... G02F 1/136; G02F 1/1335
(52) U.S. Cl. .............................................. 349/113; 349/41
(58) Field of Search .................................. 349/147, 148, 349/143, 138, 122, 113, 139, 158, 51

(56) References Cited

U.S. PATENT DOCUMENTS

| 4,106,859 | * | 8/1978 | Doriguzzi et al. | 349/138 |
| 4,836,655 | * | 6/1989 | Yamazaki | 349/49 |
| 5,283,675 | * | 2/1994 | Ooi et al. | 349/88 |
| 5,379,136 | * | 1/1995 | Hu et al. | 349/31 |
| 5,408,345 | * | 4/1995 | Mitsui et al. | 349/138 |
| 5,418,633 | * | 5/1995 | Kim et al. | 349/81 |
| 5,463,481 | * | 10/1995 | Yamamura | 349/74 |
| 5,500,750 | * | 3/1996 | Kanbe et al. | 349/138 |
| 5,526,149 | * | 6/1996 | Kanbe et al. | 349/113 |
| 5,619,356 | * | 4/1997 | Kozo et al. | 349/99 |
| 5,691,791 | * | 11/1997 | Nakamura et al. | 349/113 |
| 5,734,455 | * | 3/1998 | Yoshida et al. | 349/99 |
| 5,894,539 | * | 4/1999 | Epstein | 362/26 |

FOREIGN PATENT DOCUMENTS

| 57-81288 | 5/1982 | (JP) . |
| 58-93031 | 6/1983 | (JP) . |
| 5-173158 | 7/1993 | (JP) . |
| 5-232465 | 9/1993 | (JP) . |
| 6-27481 | 2/1994 | (JP) . |
| 6-75238 | 3/1994 | (JP) . |

* cited by examiner

Primary Examiner—William L. Sikes
Assistant Examiner—Dung Nguyen
(74) Attorney, Agent, or Firm—Young & Thompson

(57) ABSTRACT

The present invention relates to a light reflection plate provided on a substrate included in a reflective liquid crystal display device. The light reflection plate comprises the following elements. Convex patterns are shaped in random and formed on the substrate. The convex patterns have side walls defining apertures, bottoms of which are defined by the substrate. At least a light reflective film is made of a conductive material and continuously extending over the convex patterns and within the apertures to have the light reflective film possess a rough surface comprising convex and concave portions which have random sizes in relation to the convex patterns.

17 Claims, 62 Drawing Sheets

FIG. 2C        PRIOR ART
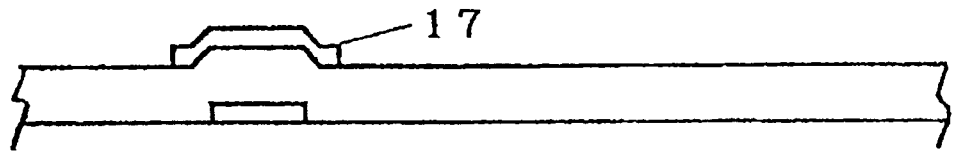
FIG. 2D        PRIOR ART
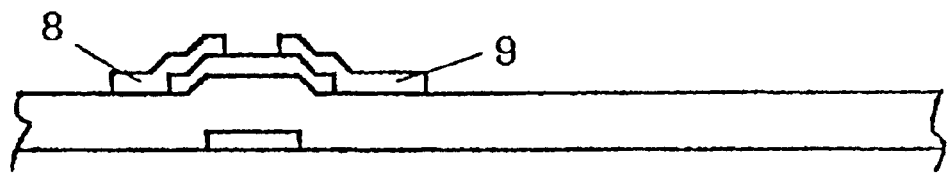

Incident Angle θ
of Light Source (Degree)

F I G. 2 2 C
F I G. 2 2 D
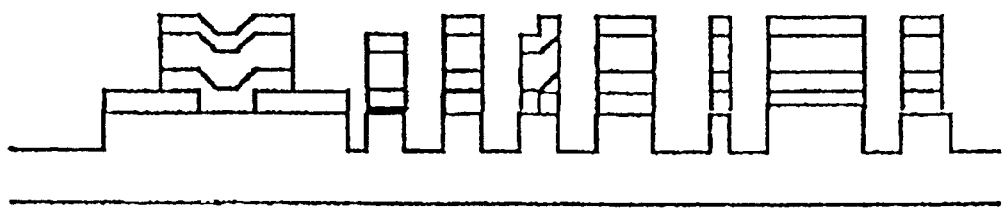

REFLECTIVE LIQUID CRYSTAL DISPLAY AND METHOD FOR FABRICATING THE SAME

BACKGROUND OF THE INVENTION

The present invention relates to a reflective liquid crystal display device, particularly relates to a reflective liquid crystal display device having a feature in a light reflection plate thereof.

In the reflective liquid crystal display device, a light having been incident from outside is reflected by a light reflecting plate provided inside of the liquid crystal display device to use the reflected light as a light source for the display, for which reason any back light is not necessary for the light source. It has been considered that the reflective liquid crystal display device with the light reflecting plate is suitable for reductions in dissipation power, thickness and weight rather than a light transmission liquid crystal display. The reflective liquid crystal display device includes a liquid crystal layer, a switching element such as a thin film transistor or a diode, and a light reflecting plate. The liquid crystal layer may comprise either a twisted nematic liquid crystal, a super-twisted nematic liquid crystal, a guest-host liquid crystal or a polymer dispersion liquid crystal.

The reflective liquid crystal display device is required to have a bright and white displaying performance in the light transmission mode. The light reflective performance of the light reflecting plate depends upon various parameters of the surface roughness of the light reflection plate, particularly sloped angles of convex and concave portions constituting the rough surface of the light reflection plate, and the irregularity of the surface roughness.

In the conventional reflective liquid crystal display device, an active matrix driving system is used together with the light reflection plate, wherein thin-film transistors (TFT) or diodes having a metal/insulator/metal structure, for short an MIM structure, are used as a switching element for realizing high line and high quality pictures.

The structure of the conventional reflective liquid crystal display device will be described with reference to FIG. 1.

The conventional liquid crystal display device comprises top and bottom substrates 1 and 4 which sandwich a liquid crystal layer 11. The top substrate 1 comprises laminations of a glass substrate 2 and a transparent electrode 3 which is in contact with the liquid crystal layer 11. The bottom substrate 4 comprises a glass substrate 5, arrays of thin film transistors 6 with an inverse stagger structure provided on the glass substrate 5, a polyamide interlayer insulator 7 provided to cover the arrays of thin film transistors 6 and a light reflection plate 10 provided over the polyimide interlayer insulator 7 and under the liquid crystal layer 11. The light reflection plate 10 has a surface roughness 14. The light reflection plate 10 is made of a conductive material so that the light reflection plate 10 serves as a pixel electrode. The surface of the polyimide interlayer insulator 7 has a roughness 18 on which the light reflection plate 10 substantially corrugated to have the surface roughness 14 is provided. The polyimide interlayer insulator 7 has contact holes 49 over drain electrodes 9 of the thin film transistors 6 so that the light reflection plate 10 extends not only over the polyimide interlayer insulator 7 but also within the contact holes 49 whereby the light reflection plate 10 made of a conductive material for serving as the pixel electrode is in contact with the drain electrodes 9 of the thin film transistors 6.

The liquid crystal layer 11 comprises a guest-host liquid crystal which has been injected into a gap between the top and bottom substrates 1 and 4.

An incident light 12 is transmitted through the glass substrate 2, the transparent electrode 3 and the liquid crystal layer 3 to the light reflection plate 10 by which the transmitted light is reflected and transmitted through the liquid crystal layer 3 to the substrate 1 and then outputted therefrom. The reflective liquid crystal display device utilizes the reflected light 13. In order to obtain a sufficient brightness of the screen for the liquid crystal display, it is necessary that lights having been incident in various angles may be reflected in a direction just or almost vertical to the surface of the substrates 1 and 4. The rough surface 14 of the light reflection plate 10 comprises convex and concave portions which form top and valley portions and sloped portions. If the incident light having been in the direction vertical to the surfaces of the substrates 1 and 4 is reflected at the top and valley portions of the rough surface 14 of the light reflection plate 10, then the reflected light is transmitted in the direction just or almost vertical to the surfaces of the substrates 1 and 4. If the incident light having been in a direction tilted from the normal of the surfaces of the substrates 1 and 4 is reflected at the sloped portions of the rough surface 14 of the light reflection plate 10, then the reflected light is also transmitted in the direction just or almost vertical to the surfaces of the substrates 1 and 4. The rough surface 14 including the top and valley portions and the sloped portions allows the incident lights having been incident not only in the vertical direction but also in the tilted direction to be reflected and transmitted in just or almost the vertical direction to the surfaces of the substrates 1 and 4.

The above conventional reflective liquid crystal display device may be fabricated as follows. The descriptions of the fabrication processes for the above reflective liquid crystal display device will hereinafter be made with reference to FIGS. 2A through 2G.

With reference to FIG. 2A, a gate electrode 15 is formed on the glass substrate 5.

With reference to FIG. 2B, a gate insulation film 16 is formed, which extends over the glass substrate 5 and the gate electrode 15. A surface of the gate insulation film 16 has a hillock over the gate electrode 15. A semiconductor layer 17 being doped or undoped with an impurity is formed on an entire surface of the gate insulation film 16. A surface of the semiconductor layer 17 also has a hillock over the hillock of the gate insulation film 16.

With reference to FIG. 2C, the semiconductor layer 17 is selectively removed by patterning process to leave the same over and in the vicinity of the hillock of the gate insulation film 16.

With reference to FIG. 2D, source and drain electrodes 8 and 9 are formed, wherein the source electrode 8 extends over a left side portion of the remaining semiconductor layer 17 and over the gate insulation film 16 in the vicinity of the left side portion of the remaining semiconductor layer 17, whilst the drain electrode 9 extends over a right side portion of the remaining semiconductor layer 17 and over the gate insulation film 16 in the vicinity of the right side portion of the remaining semiconductor layer 17 to thereby form a thin film transistor 6.

With reference to FIG. 2E, a polyimide insulation film 7 is formed, which extends over the gate insulation film 16 and over the source and drain electrodes 8 and 9. A surface of the polyimide insulation film 7 is subjected to a patterning to form a rough surface which comprises convex and concave portions whereby the rough surface comprises top and valley portions and sloped portions.

With reference to FIG. 2F, a contact hole 49 is formed in the polyimide insulation film over the drain electrode 9 to expose a part of the drain electrode 9.

With reference to FIG. 2G, a light reflection plate 10 made of a conductive material is formed on the rough surface with the convex and concave portions of the polyimide insulation film 7 as well as in the contact hole 49 so that the light reflection plate 10 is in contact with the drain electrode 9 of the thin film transistor 6. The light reflection plate 10 is patterned to form a pixel electrode.

In the above fabrication processes, the photo-lithography processes have been used six times. The first photo-lithography process was made in patterning the gate electrode 15. The second photo-lithography process was made in patterning the semiconductor layer 17. The third photo-lithography process was made in forming the source and drain electrodes 8 and 9. The fourth photo-lithography process was made in forming the rough surface 14 of the polyimide insulation film 7. The fifth photo-lithography process was made in forming the contact hole 49. The sixth photo-lithography process was made in patterning the light reflection plate 10.

The above fabrication processes are disclosed in Tohru Koizumi and Tatsuo Uchida, Proceedings of the SID, Vol. 29, 157, 1988.

The above fabrication processes for the conventional reflective liquid crystal display device comprises a number of the photo-lithography processes and complicated steps. Particularly, the three photo-lithography processes are needed to form the thin film transistor 6 as a switching device and further three photo-lithography processes are needed to form the light reflection plate 10. Those facts result in increase in the manufacturing cost and this increase raises a problem with a high price of the reflective liquid crystal display device.

In the above circumstance, it had been required to provide an improved reflective liquid crystal display device at a low price and an improved fabrication process for the improved reflective liquid crystal display device at a low manufacturing cost.

SUMMARY OF THE INVENTION

Accordingly, it is an object of the present invention to provide a reflective liquid crystal display device having an active matrix driving element and a bright light reflecting plate at a low manufacturing cost.

It is another object of the present invention to provide a method for fabricating the reflective liquid crystal display device at a low manufacturing cost.

The present invention relates to a light reflection plate provided on a substrate included in a reflective liquid crystal display device. The light reflection plate comprises the following elements. Convex patterns are shaped in random and formed on the substrate. The convex patterns have side walls defining apertures, bottoms of which are defined by the substrate. At least a light reflective film is made of a conductive material and continuously extending over the convex patterns and within the apertures to have the light reflective film possess a rough surface comprising convex and concave portions which have random sizes in relation to the convex patterns.

It is preferable that the convex patterns comprise laminations of a plurality of common layers to layers constituting a thin film transistor formed on the substrate and that the common layers are formed on the substrate. In this case, the side walls may be vertical to a surface of the substrate. Alternatively, the side walls may be oblique to a surface of the substrate.

It is preferable that the substrate has an upper region comprising ridged portions and recessed portions defining the ridged portions, and the convex patterns comprise the ridged portions and laminations, formed on the ridged portions, of a plurality of common layers to layers constituting a thin film transistor formed on the substrate. In this case, the side walls may be vertical to a surface of the substrate.

It may optionally be possible to provide an inter-layer insulator extending over the convex patterns and under the light reflective film, wherein the inter-layer insulator has a rough surface on which the light reflective film possessing the rough surface is formed. In this case, the interlayer insulator may be made of an organic insulation material. Alternatively, the inter-layer insulator may be made of an inorganic insulation material.

It is preferable that the thin film transistor has a forward stagger structure.

The present invention provides a reflective liquid crystal display device comprising the following elements. An active switching element comprises a plurality of films and is selectively formed on a predetermined region of a first substrate. Arrays of light reflection plates are provided on the first substrate. A light reflective film is made of a conductive material and continuously extending over the convex patterns and within the apertures to have the light reflective film possess a rough spice comprising convex and concave portions which have random sizes in relation to the convex patterns, the light reflective film serves as a pixel electrode. A second substrate with a transparent common electrode is bonded through a plurality of spacers to the first substrate to have the arrays of the light reflection plates face to the transparent common electrode to form an inner space within which a liquid crystal layer is provided.

Each of the light reflection plates comprises the following elements. Convex patterns are shaped in random and formed on the first substrate except for the predetermined region. The convex patterns having side walls defining apertures, bottoms of which are defined by the first substrate.

The convex patterns may comprise laminations of a plurality of common layers to layers constituting a thin film transistor formed on the substrate, and the common layers are formed on the substrate.

The side walls may be vertical to a surface of the substrate. Alternatively, the side walls may be oblique to a surface of the substrate.

The substrate may have an upper region comprising ridged portions and recessed portions defining the ridged portions. The convex patterns may comprise the ridged portions and laminations, formed on the ridged portions, of a plurality of common layers to layers constituting a thin film transistor formed on the substrate.

The side walls may be vertical to a surface of the substrate.

It may be possible to provide an inter-layer insulator extending over the convex patterns and under the light reflective film, wherein the inter-layer insulator has a rough surface on which the light reflective film possessing the rough surface is formed.

It is possible that the inter-layer insulator may be made of an organic insulation material. Alternatively, the inter-layer insulator may be made of an inorganic insulation material.

It is possible that the thin film transistor may have a forward stagger structure.

The present invention provides a method for forming a light reflection plate on a substrate provided in a reflective liquid crystal display device. The method comprises the following steps. Convex patterns shaped in random are formed on the substrate. The convex patterns have side walls defining apertures, bottoms of which are defined by the substrate. At least a light reflective film is formed, which is made of a conductive material and continuously extending over the convex patterns and within the apertures to have the light reflective film possess a rough surface comprising convex and concave portions which have random sizes in relation to the convex patterns.

The convex patterns may be formed by the following steps. Laminations of a plurality of layers are formed. The laminated layers are selectively etched to form convex patterns and a thin film transistor formed on the substrate.

It may be possible that the side walls are vertical to a surface of the substrate. Alternatively, the side walls may be oblique to a surface of the substrate.

It may also be possible that, following to the etching, the substrate is subjected to additional etching to form an upper region comprising ridged portions and recessed portions defining the ridged portions. In this case, the side walls maybe vertical to a surface of the substrate.

It is possible that further an inter-layer insulator is formed, which extends over the convex patterns so that the light reflective film is formed on the inter-layer insulator, wherein the inter-layer insulator has a rough surface on which the light reflective film possessing the rough surface is formed. In this case, the inter-layer insulator is made of an organic insulation material. Alternatively, the inter-layer insulator is made of an inorganic insulation material. The thin film transistor may have a forward stagger structure.

BRIEF DESCRIPTIONS OF THE DRAWINGS

FIGS. 2A through 2G are cross-sectional elevation views illustrative of the fabrication processes for the bottom substrate in the conventional reflective liquid crystal display illustrated in FIG. 1.

FIGS. 20D through 20I are cross-sectional elevation views illustrative of the fabrication processes for the bottom substrate with the light reflection plate in the reflective liquid crystal display, wherein a normal insulating film is used, according to the seventh embodiment of the present invention.

FIGS. 22A through 22F are cross-sectional elevation views illustrative of the fabrication processes for the bottom substrate with the light reflection plate in the reflective liquid crystal display according to the ninth embodiment of the present invention.

Figure 32A:
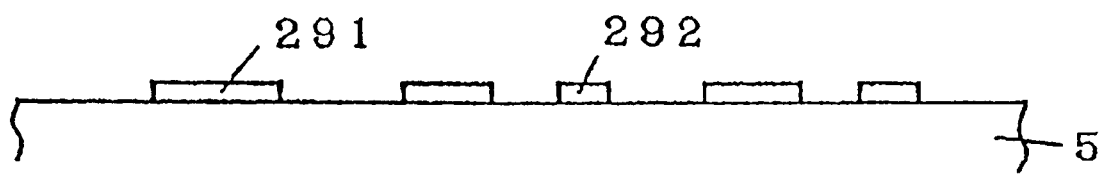

FIGS. 32A to through 32D are cross-sectional elevation views illustrative of the fabrication processes for the bottom substrate with the light reflection plate in the reflective liquid crystal display according to the twentieth embodiment of the present invention.

Figure 33:
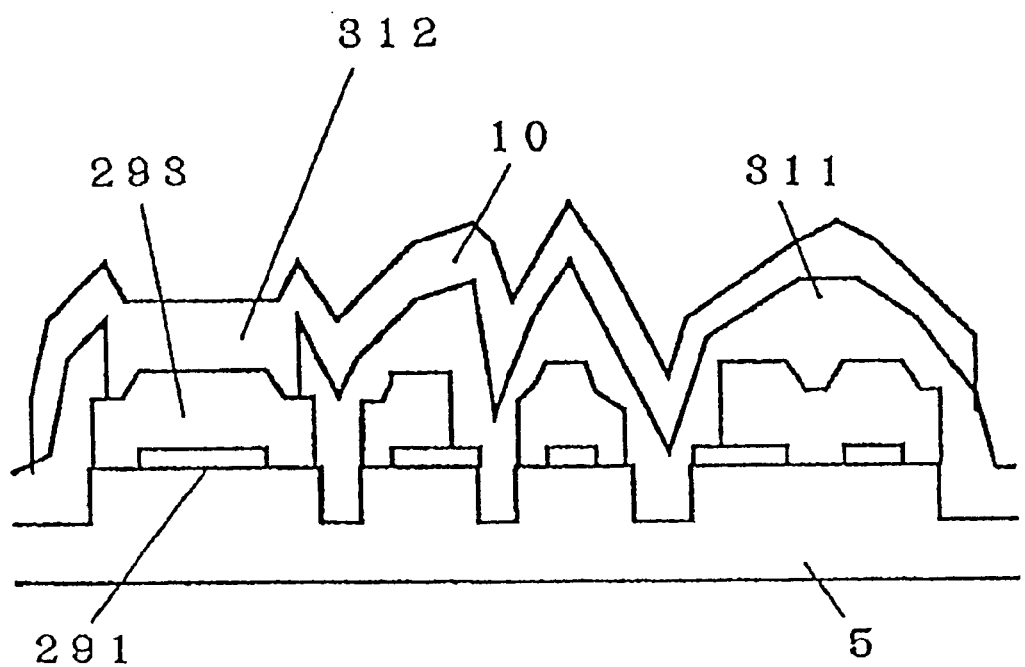

FIG. 33 is a cross-sectional elevation view illustrative of a structure of the bottom substrate with the light reflection plate in the reflective liquid crystal display according to the twenty first embodiment of the present invention.

FIGS. 34A through 34D are cross-sectional elevation views illustrative of the fabrication processes for the bottom substrate with the light reflection plate in the reflective liquid crystal display according to the twenty second embodiment of the present invention.

FIGS. 35A through 35D are cross-sectional elevation views illustrative of the fabrication processes for the bottom substrate with the light reflection plate in the reflective liquid crystal display according to the twenty third embodiment of the present invention.

FIGS. 36A through 36E are cross-sectional elevation views illustrative of the fabrication processes for the bottom substrate with the light reflection plate in the reflective liquid crystal display according to the twenty fourth embodiment of the present invention.

DISCLOSURE OF THE INVENTION

The present invention relates to a light reflection plate provided on a substrate included in a reflective liquid crystal display device. The light reflection plate comprises the following elements. Convex patterns are shaped in random and formed on the substrate. The convex patterns have side walls defining apertures, bottoms of which are defined by the substrate. At least a light reflective film is made of a conductive material and continuously extending over the convex patterns and within the apertures to have the light reflective film possess a rough surface comprising convex and concave portions which have random sizes in relation to the convex patterns.

It is preferable that the convex patterns comprise laminations of a plurality of common layers to layers constituting a thin film transistor formed on the substrate and that the common layers are formed on the substrate. In this case, the side walls may be vertical to a surface of the substrate. Alternatively, the side walls may be oblique to a surface of the substrate.

It is preferable that the substrate has an upper region comprising ridged portions and recessed portions defining the ridged portions, and the convex patterns comprise the ridged portions and laminations, formed on the ridged portions, of a plurality of common layers to layers constituting a thin film transistor formed on the substrate. In this case, the side walls may be vertical to a surface of the substrate.

It may optionally be possible to provide an inter-layer insulator extending over the convex patterns and under the light reflective film, wherein the inter-layer insulator has a rough surface on which the light reflective film possessing the rough surface is formed. In this case, the inter-layer insulator may be made of an organic insulation material. Alternatively, the inter-layer insulator may be made of an inorganic insulation material.

It is preferable that the thin film transistor has a forward stagger structure.

The present invention provides a reflective liquid crystal display device comprising the following elements. An active switching element comprises a plurality of films and is selectively formed on a predetermined region of a first substrate. Arrays of light reflection plates are provided on the first substrate. A light reflective film is made of a conductive material and continuously extending over the convex patterns and within the apertures to have the light reflective film possess a rough surface comprising convex and concave portions which have random sizes in relation to the convex patterns, the light reflective film serves as a pixel electrode. A second substrate with a transparent common electrode is bonded through a plurality of spacers to the first substrate to have the arrays of the light reflection plates face to the transparent common electrode to form an inner space within which a liquid crystal layer is provided.

Each of the light reflection plates comprises the following elements. Convex patterns are shaped in random and formed on the first substrate except for the predetermined region the convex patterns having side walls defining apertures, bottoms of which are defined by the first substrate.

The convex patterns may comprise laminations of a plurality of common layers to layers constituting a thin film transistor formed on the substrate, and the common layers are formed on the substrate.

The side walls may be vertical to a surface of the substrate. Alternatively, the side walls may be oblique to a surface of the substrate.

The substrate may have an upper region comprising ridged portions and recessed portions defining the ridged portions. The convex patterns may comprise the ridged portions and laminations, formed on the ridged portions, of a plurality of common layers to layers constituting a thin film transistor formed on the substrate.

The side walls may be vertical to a surface of the substrate.

It may be possible to provide an inter-layer insulator extending over the convex patterns and under the light reflective film, wherein the inter-layer insulator has a rough surface on which the light reflective film possessing the rough surface is formed.

It is possible that the inter-layer insulator may be made of an organic insulation material. Alternatively, the inter-layer insulator may be made of an inorganic insulation material.

It is possible that the thin film transistor may have a forward stagger structure.

The present invention provides a method for forming a light reflection plate on a substrate provided in a reflective liquid crystal display device. The method comprises the following steps. Convex patterns shaped in random are formed on the substrate. The convex patterns have side walls defining apertures, bottoms of which are defined by the substrate. At least a light reflective film is formed, which is made of a conductive material and continuously extending over the convex patterns and within the apertures to have the light reflective film possess a rough source comprising convex and concave portions which have random sizes in relation to the convex patterns.

The convex patterns may be formed by the following steps. Laminations of a plurality of layers are formed. The laminated layers are selectively etched to form convex patterns and a thin film transistor formed on the substrate.

It may be possible that the side walls are vertical to a surface of the substrate. Alternatively, the side walls may be oblique to a surface of the substrate.

It may also be possible that, following to the etching, the substrate is subjected to additional etching to form an upper region comprising ridged portions and recessed portions defining the ridged portions. In this case, the side walls maybe vertical to a surface of the substrate.

It is possible that further an inter-layer insulator is formed, which extends over the convex patterns so that the light reflective film is formed on the inter-layer insulator, wherein the inter-layer insulator has a rough surface on which the light reflective film possessing the rough surface is formed. In this case, the inter-layer insulator is made of an organic insulation material. Alternatively, the inter-layer insulator is made of an inorganic insulation material. The thin film transistor may have a forward stagger structure.

In order to carry out the object, according to the reflective liquid crystal display device of the present invention, the convex patterns are previously formed on a position, where the light reflecting plate should be formed, when the active matrix driving element is formed on the insulating layer. The convex patterns are formed by using at least one of a metal layer, an insulating layer or a semiconductor layer which is formed during the manufacturing steps of the active matrix driving element.

That is to say, the reflective liquid crystal display device according to the present invention comprises a first insulating substrate having an active matrix driving element and a light reflecting plate having the convex patterns thereon, a second insulating substrate having a transparent electrode, and a liquid crystal layer provided between said first and second insulating substrates. The rough surface is obtained by patterning at least one of a metal film, an insulating film and a semiconductor film, which are formed on said first insulating substrate during a step for manufacturing said active matrix driving element, is formed under said light reflecting plate.

The reflective liquid crystal display device according to the present invention has another aspect that the display device comprises a first insulating substrate having an active matrix driving element and a light reflecting plate having an unevenness thereon, a second insulating substrate having a transparent electrode, and a liquid crystal layer provided between said first and second insulating substrates. The convex pattern for the rough surface obtained by patterning at least one of a metal film, an insulating film and a semiconductor film, which are formed during the step for manufacturing the active matrix driving element, and an insulating film formed on the convex pattern for the rough surface are provided under the light reflecting plate.

The reflective liquid crystal display device according to the present invention comprises a first insulating substrate having an active matrix driving element and a light reflecting plate having an unevenness thereon, a second insulating substrate having a transparent electrode, and a liquid crystal layer provided between said first and second insulating substrates. A first convex pattern for the rough surface, which is obtained by patterning the first insulating substrate, and a second convex pattern for the rough surface, which is obtained by pattering at least one of a metal film, an insulating film or a semiconductor film, which are formed during the step for manufacturing the active matrix driving element, are formed under the light reflecting plate in a synchronized manner.

The reflective liquid crystal display device according to the present invention comprises a first insulating substrate having an active matrix driving element and a light reflecting plate having a rough surface thereon, a second insulating substrate having a transparent electrode, and a liquid crystal layer provided between the first and second insulating substrates. A first convex pattern for the rough surface, which is obtained by patterning said first insulating substrate, a second convex pattern for the rough surface, which is obtained by patterning at least one of a metal film, insulating film or a semiconductor film, which are formed during the step for manufacturing said active matrix driving element, are formed under the light reflecting plate concurrently. An insulating film is provided on the second convex pattern for the rough surface is also formed under the light reflecting plate.

It is preferred that at least one of the height, the period, the oblique angle of the formed under the light reflecting plate is arranged to be irregular.

It may be possible to arrange such that said insulating film provided on the second convex patterns for the rough surface also covers the active matrix driving element and a wiring arrangement thereof. The light reflection plate also serves as a pixel electrode. The light reflection plate is electrically connected to the active matrix driving element via contact holes.

It may also be possible to arrange such that each contact hole is arranged in a different position at every pixel electrode.

Further, it may be possible to use a photo sensitive insulating film as the insulating film formed on said second convex patterns for the rough surface.

Furthermore, it may be possible to use known transistors, or diodes for the active matrix element, particularly it is preferred to use thin film transistors having a forward stagger structure.

A method for manufacturing a reflective liquid crystal display according to the present invention comprises the following steps. At least one of a metal film was patterned an insulating film or a semiconductor film, which are formed during the step for manufacturing an active matrix driving element, at the same time when said active matrix driving element is provided, to form an unevenness at a position where a light reflecting plate should be formed. A light reflecting plate is formed on the convex patterns.

There are formed a first insulating substrate, on which said active matrix element and said light reflecting plate are formed, and a second insulating substrate having a transparent electrode thereon to each other. There is injected a liquid crystal material between the first and second insulating substrates.

According to the present invention, the convex portion of the rough surface of the light reflecting plate is preliminary formed at the position where the light reflecting plate should be formed at the same time when the active matrix driving element is formed on the insulating substrate, the convex patterns of the rough surface is formed by using at least one of the metal film, the insulating film or the semiconductor film which are formed during the step for manufacturing the active matrix driving element. Therefore, it is possible to reduce the number of fabrication steps of the display device.

According to the invention, only four processes are necessary to manufacture them in total. That is to say, three photo lithography steps for the thin-film transistor and another photo lithography steps for the pixel electrode are needed.

FIG. 3 shows manufacturing steps of the reflective liquid crystal display according to the present invention. It should be noted that the same numerical references are used for the same elements as those in FIG. 1.

Figure 3A:
FIGS. 3A through 3E are cross-sectional elevation views illustrative of the fabrication processes for the bottom substrate of the reflective liquid crystal display with a thin-film transistor having a inverse stagger structure according to the present invention.

The manufacturing steps of the thin-film transistor are as follows. A metal layer for the gate electrode 15 is provided on the glass substrate 5. The gate electrode 15 and the ground work of the unevenness of the light reflecting plate are formed by a first photo lithographing step (FIG. 3A). A gate insulating film 16, a semiconductor film 17 and a metal film for source and drain electrodes of the transistor are formed on the gate electrode 15 and the pattern 20 (FIG. 3B); these films are etched so as to leave an island 22 for the thin-film transistor and a pattern of the ground work of the unevenness of the light reflection plate (FIG. 3C). That is to say, during these steps, the ground work of the unevenness can be formed at the same time that the thin-film transistor is provided. Therefore, the process for manufacturing the display can be made simple. After these steps, a source electrode 8 and a drain electrode 9 are formed (FIG. 3D) to complete the thin-film transistor.

Then the unevenness pattern is covered by a metal material having a high reflectivity to form a light reflecting plate 10 having an unevenness and (FIG. 36) then the bottom substrate of the reflective liquid crystal display is completed.

Figure 3B:
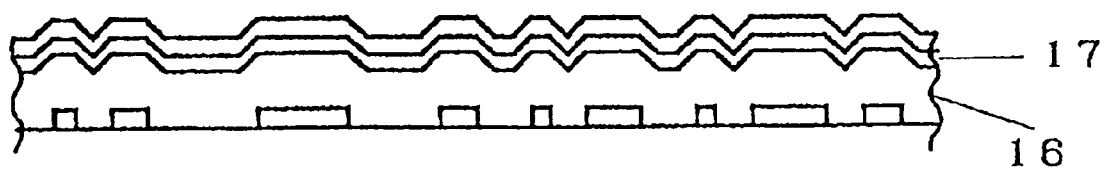
Figure 3C:
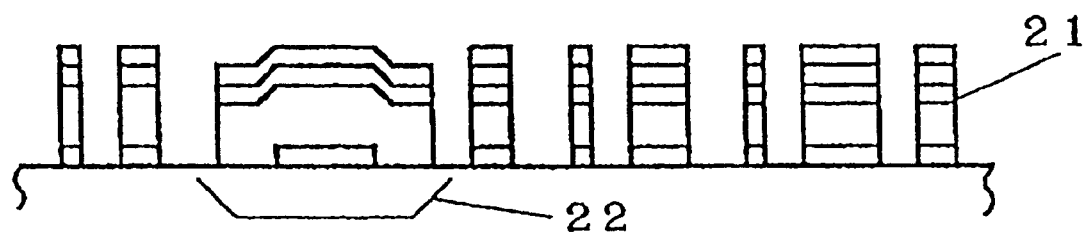
Figure 3D:
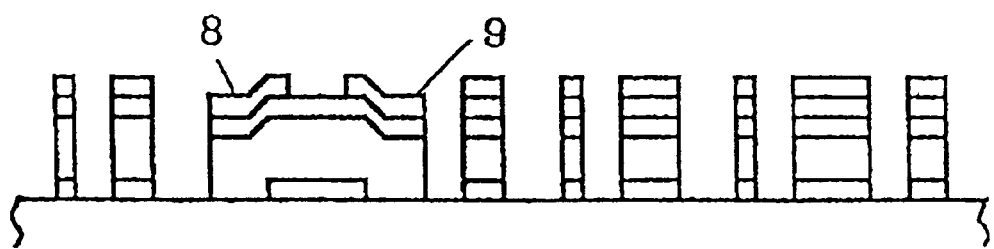
Figure 3E:
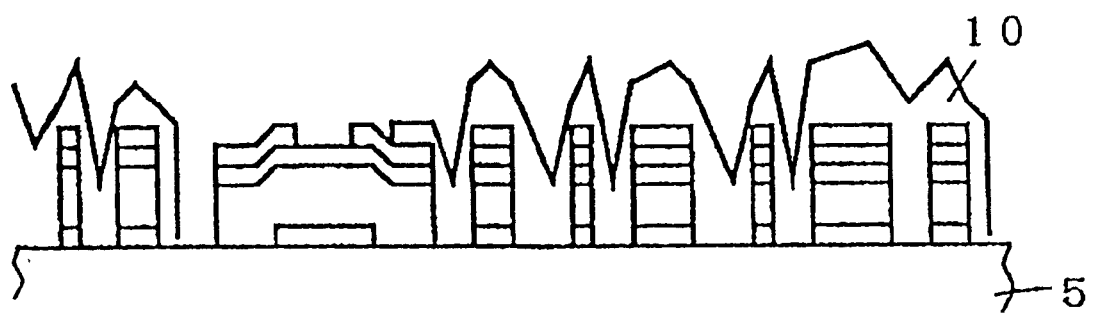
Figure 4:
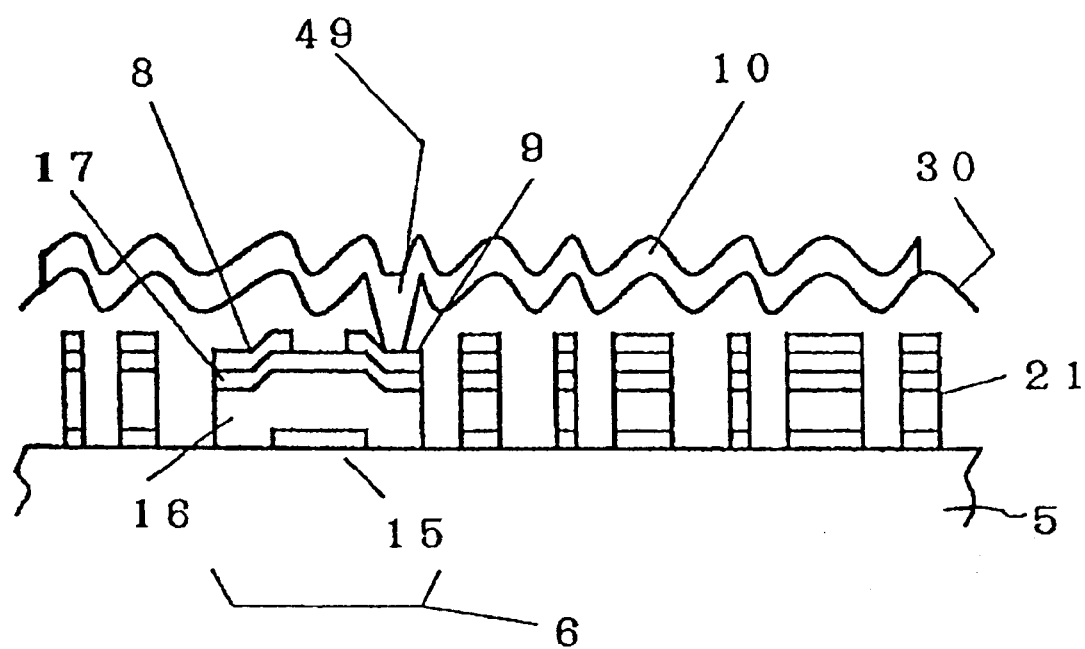
FIG. 4 is a cross-sectional elevation view illustrative of a structure of the reflective liquid crystal display with a thin-film transistor having an inverse stagger structure.

The function of the second aspect of the invention will be explained in accordance with FIG. 4 is a cross-sectional view showing a structure of the bottom substrate of the reflective liquid crystal display device where an organic system insulating film or non-organic system insulating film is provided under the light reflecting plate 10. In FIG. 4, the same numerical references are used for the same elements as those in FIG. 3. The difference between the devices shown in FIGS. 3 and 4 is that the organic system insulating film or the non-organic system insulating film 30 is provided between the light reflecting plate 10 and the thin-film transistor 6 and the unevenness pattern 21, and the light reflecting plate 10 is connected to the drain electrode 9 via the contact hole 49.

According to the second aspect of the invention, the light reflecting plate 10 can be formed on the layer different from the layer where the thin-film transistor 6, the source electrode 8 and the drain electrode 9 are formed. Therefore, the area of the light reflecting plate can be maximized. Further, since the oblique portion of the unevenness 30 can be made smooth, so that the light reflecting performance of the unevenness of the light reflecting plate becomes excellent. Furthermore, since the thin-film transistor 6 is passivated, it can be possible to prevent is the thin-film transistor 6 from being deteriorated by the liquid crystal material.

Moreover, when the display device is arranged such that the insulating film is formed on the active matrix driving element and the wiring arrangement thereof, the light reflection plate is formed on the organic system insulating film or the inorganic system insulating film 30 so as to cover the active matrix driving element, the light reflecting plate 10 also serves as the pixel electrode, and the light reflecting plate 10 is formed on the layer different from the layer where the thin-film transistor and the wiring arrangement thereof are formed. Since, the area of the light reflecting plate can be maximized, almost all of the incident light coming to inside of the liquid crystal display can be used as the reflected light. Further, since the light reflecting plate can be used as a pixel electrode, it is not necessary to provide a separate pixel electrode, so that the number of the process for manufacturing the liquid crystal display device can be decreased.

Figure 5:
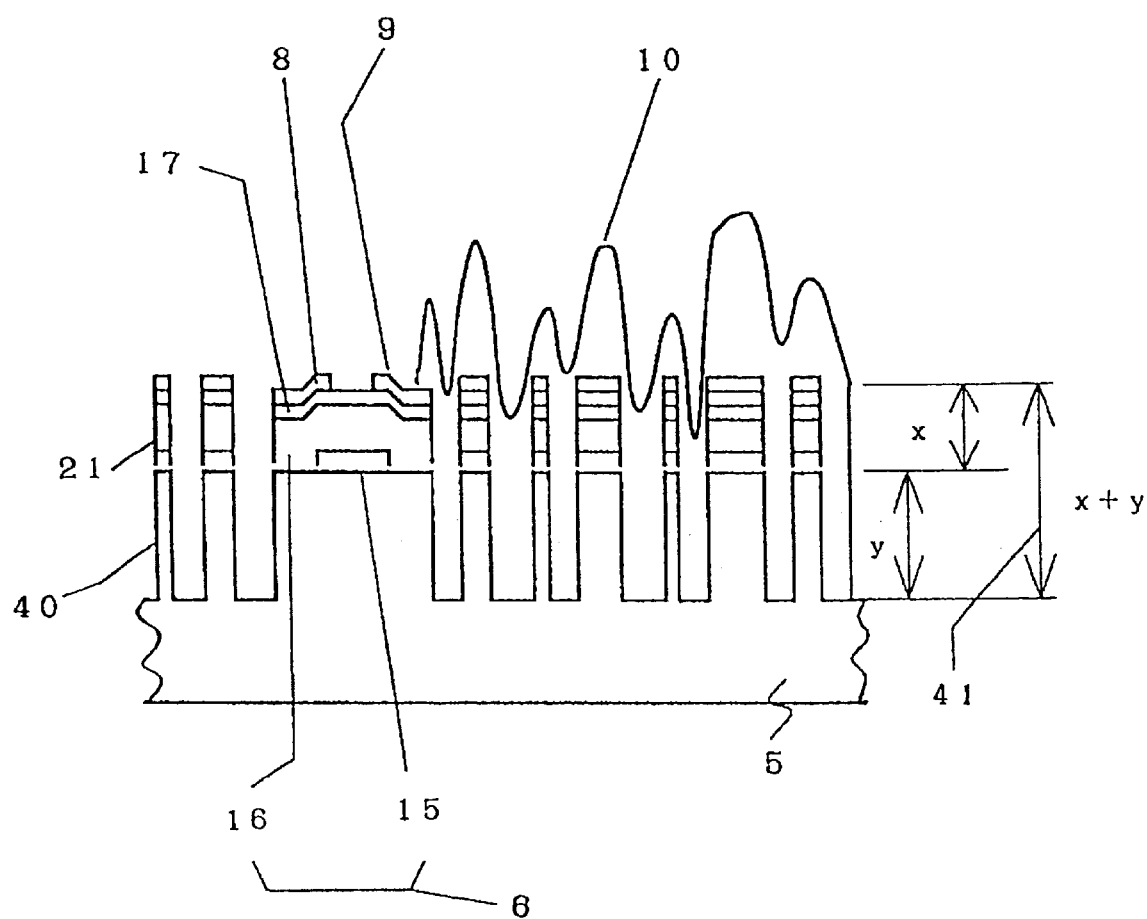
FIG. 5 is a cross-sectional elevation view illustrative of a structure of the reflective liquid crystal display with a thin-film transistor having an inverse stagger structure according to the present invention.

FIG. 5 is a cross sectional view showing a reflective liquid crystal display device where the ground work of the unevenness is formed by patterning the lower side insulating substrate. It should be noted that the same numerical references are used in FIG. 5 for the same elements as those in FIG. 3. The different point between the display devices shown in FIGS. 3 and 5 is that the lower side insulating substrate 5 is patterned to form the ground work 40 of the unevenness being synchronized with the above-explained ground work 21 of the unevenness pattern.

The unevenness 40 formed on the insulating substrate 5 (the height of the unevenness is y) and the unevenness 21 (the height thereof is x), which is formed on the films at the same time when the thin-film transistor is manufactured, are added so as to be used as the ground work 41 of the unevenness of the light reflecting plate 10. Therefore, the height of the unevenness 41 is not limited by the thickness x of the films, which are formed when the thin-film transistor is manufactured. That is to say, the unevenness 41 having a height of x+y can be freely determined by changing the height of the unevenness y of the insulating substrate 5. As a result, the light dispersion performance of the light reflecting plate 10 is improved.

If the height, the period, and the shape of the unevenness of the light reflecting plate 10 has a periodic structure, an interference would be generated in the reflected light and then the light reflecting plate would be colored. However, the color generated on the plate 10 is removed because at least one of the height the period and the shape of the unevenness is arranged to be irregular, and the performance of the liquid crystal display is improved.

Figure 6:
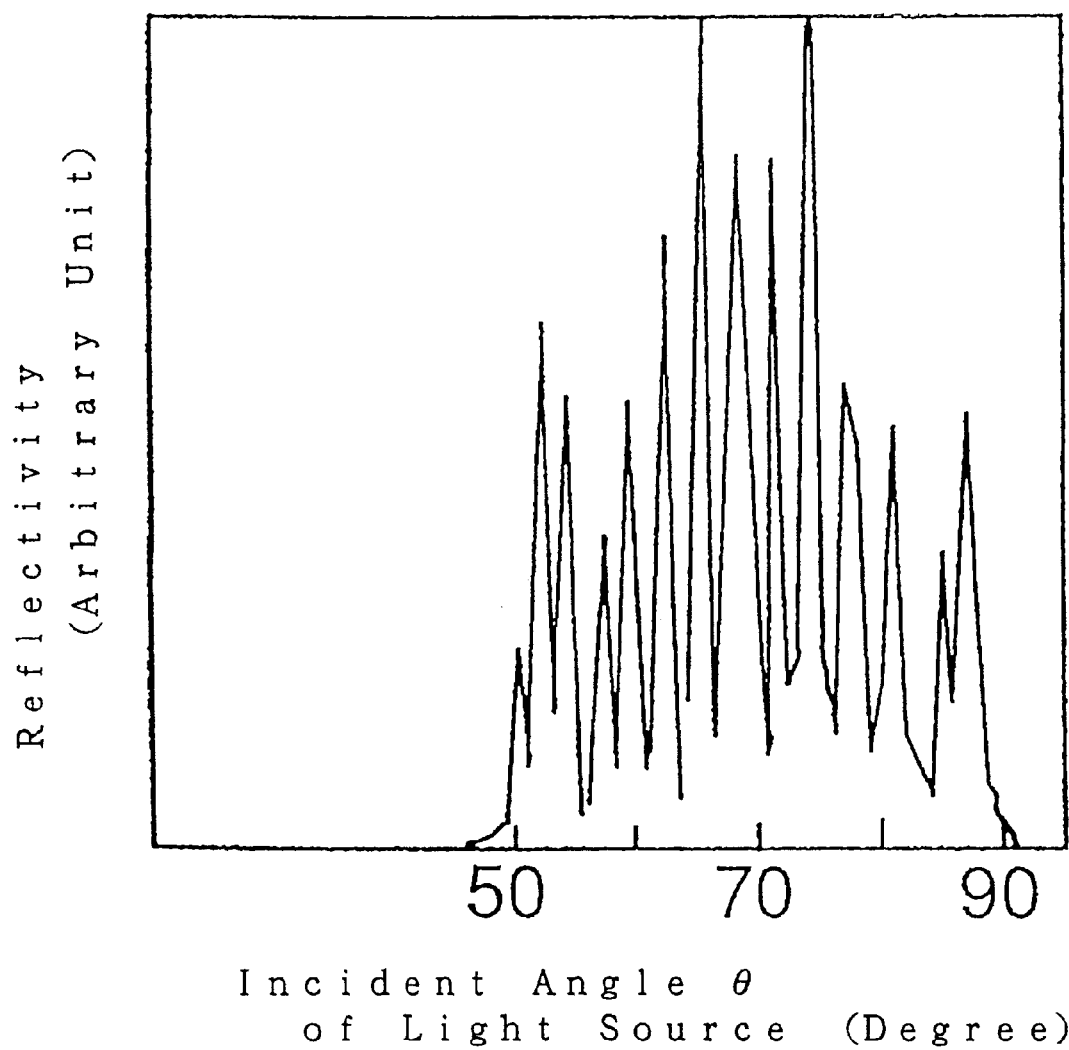
FIG. 6 is a diagram illustrative of the reflectivity of the light reflecting plate free of a surface roughness versus an incident angle of the light source.
Figure 7:
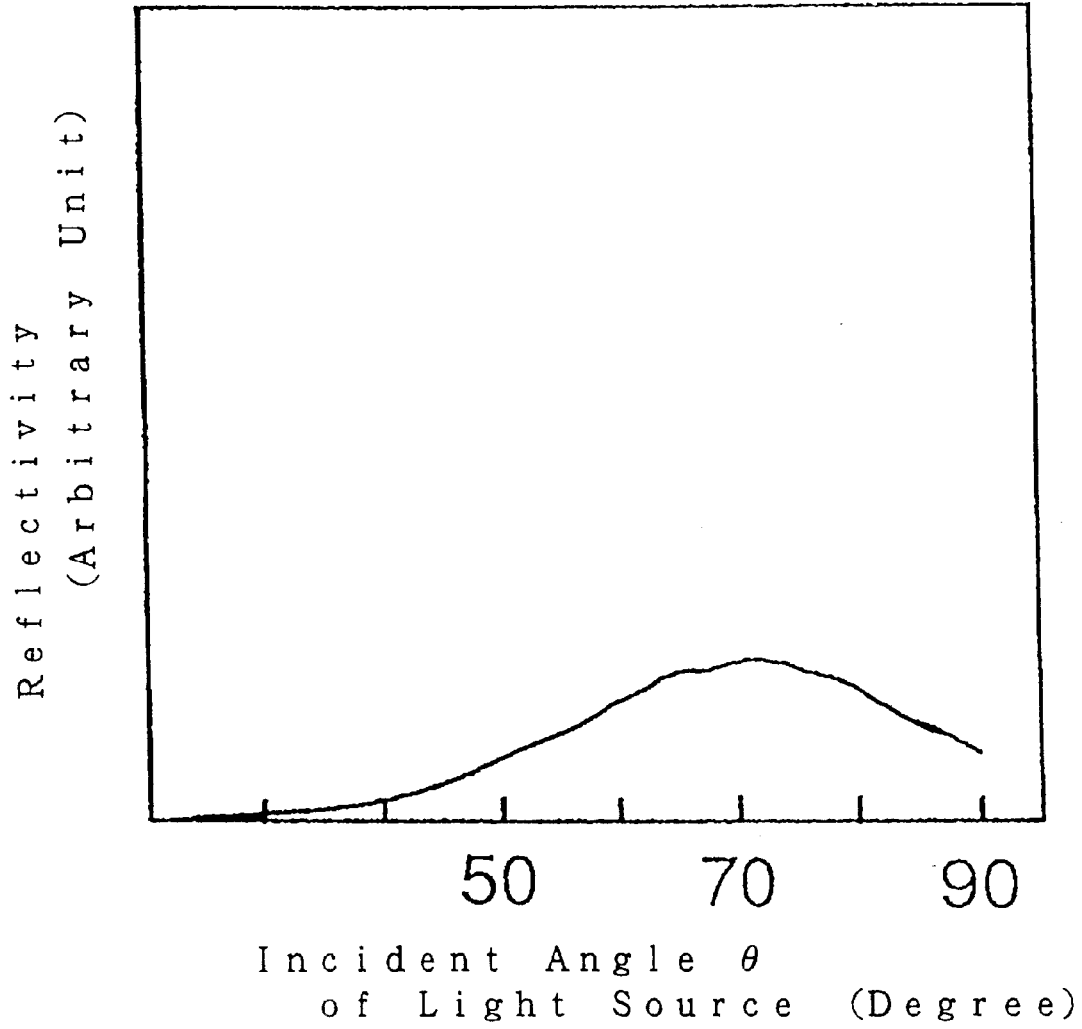
FIG. 7 is a diagram illustrative of the reflectivity of the light reflecting plate with a surface roughness versus an incident angle of the light source.
Figure 8:
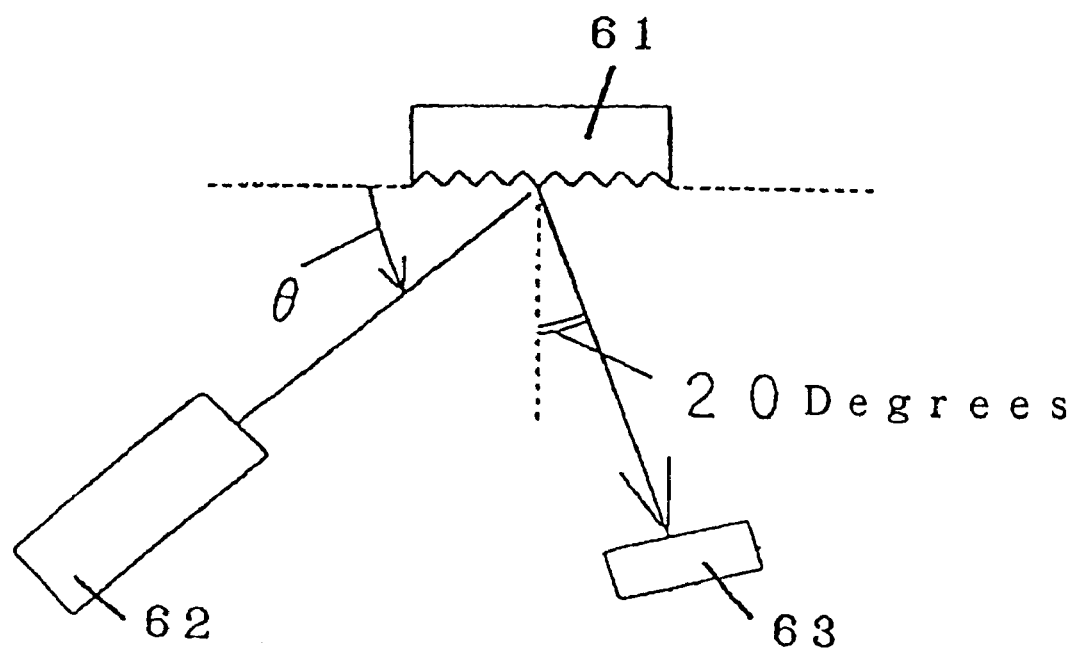
FIG. 8 is a schematic view illustrative of a configuration of a reflectivity evaluation system.

In FIG. 6, the performance of the light reflecting plate where the unevenness has a periodic structure is shown; and in FIG. 7 is depicted the performance of the light reflection plate of the present invention where the unevenness has an irregular structure. FIG. 8 is a schematic view showing a structure of a light reflection performance evaluation system, which is used for evaluating the performance of the plates shown in FIGS. 6 and 7. In FIG. 8, the numerical reference 61 represents a light reflecting plate, 62 a light source, and 63 represents a photo detector. In the evaluating system, the reflectivity of these plates were measured varying the angle of the light being incident from the light source 62 upon the plate.

According to the light reflecting plate, in which the rough surface has a periodic structure, since an interference is caused by the periodic structure, the light reflecting performance has many interference peaks as shown in FIG. 6. In such a structure, when a white lamp is used as a light source, the light reflecting plate would be colored. Contrary to this, according to the light reflecting plate having an irregular unevenness of the present invention, the light reflecting performance shows no peak as shown in FIG. 7. That means the infringement is eliminated from the plate according to the present invention. The graph of FIG. 7 shows that the reflectivity is continuously varied with respect to the incident angle of the light, and thus no color is observed on the light reflecting plate.

The function of the liquid crystal display device will be explained where the contact holes for electrically connecting the light reflecting plate and the thin-film transistor are arranged in an irregular manner at every pixel.

Figure 9A:
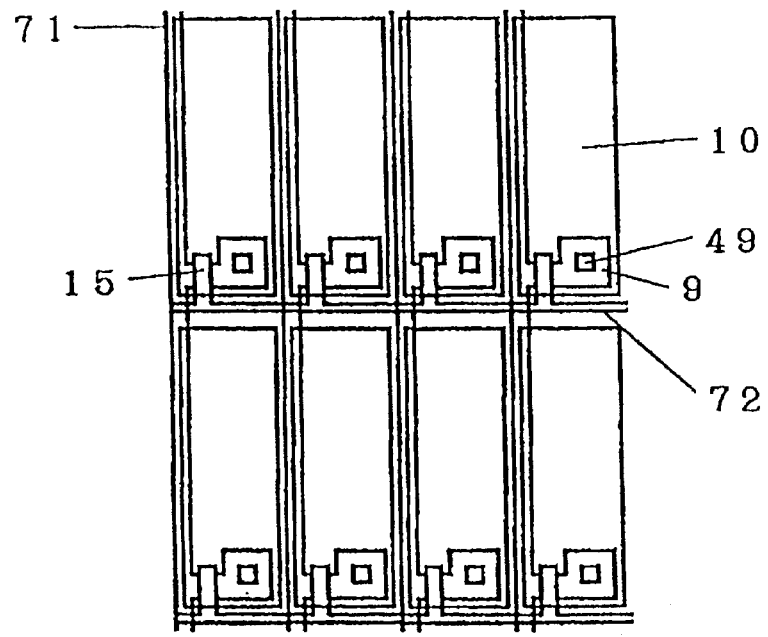
FIG. 9A is a plan view illustrative of arrays of the contact holes in the conventional liquid crystal display.
Figure 9B:
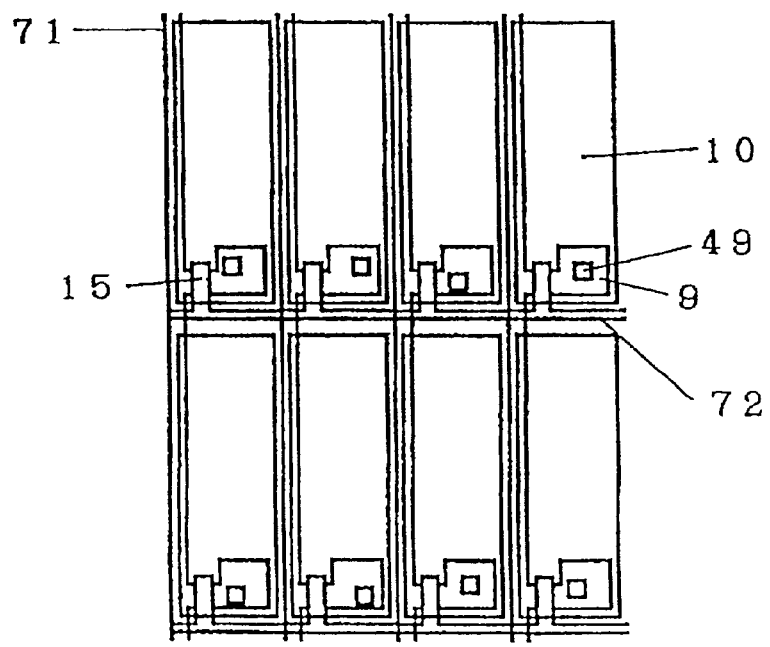
FIG. 9B is a plan view illustrative of arrays of the contact holes in the liquid crystal display according to the present invention.

FIG. 9A is a plan view showing a structure of the liquid crystal display where the contact holes are arranged in a periodic manner; while, FIG. 9B is a plan view illustrating a structure of the liquid crystal display where the contact holes are arranged in an irregular manner. In these figures, the same numerical references are given to the same elements as those shown in FIG. 4. The numerical reference 71 represents a signal line of the source and 72 is a signal line of the gate.

In FIG. 9A, the contact holes 49 are arranged in a periodic manner in the display pixel size, so that plane portions of the holes are observed on the display panel.

Contrary to this, in FIG. 9B, the position of the contact holes 49 are arranged to be different from each other in each pixel. Therefore, the concave portions of the contact holes constitute of a part of the irregular unevenness structure formed on the surface of the light reflecting plate, so that the contact holes are not observed on the display and a preferred light reflecting performance can be obtained.

In FIG. 10, the manufacturing steps of the liquid crystal display device in which a thin-film transistor having a forward stagger structure is used as an active matrix driving element. The source electrode 8, the drain electrode 9 and the unevenness pattern 20 are formed on the glass substrate 5 by the first photolithography (FIG. 10A); the doping layer, the semiconductor film 17, the gate insulating film 16, and the metal electrode layer are continuously formed on the electrodes and the unevenness (FIG. 10B); the gate electrode 15, the island for the thin-film transistor element, and the unevenness 21 are formed simultaneously during the second photolithography (FIG. 10C); then the light reflecting plate 10 is formed by the third photolithography (FIG. 10D).

Contrary to this, in the thin-film transistor having an inverse stagger structure is used as an active matrix driving element, the light reflecting plate 10 is formed in the fourth photolithographing step as shown in FIG. 3. Therefore, it is proved that the number of the photolithographing steps can be decreased by using the thin-film transistor having a forward stagger structure as an active matrix element

PREFERRED EMBODIMENTS

First Embodiment

A first embodiment according to the present invention will be described with reference to FIGS. 3A through 3E illustrative of the fabrication processes for the bottom substrate of the reflective liquid crystal display with a thin-film transistor having an inverse stagger structure.

With reference to FIG. 3A, a chromium metal layer having a thickness of 50 nm is formed on a glass substrate 5 and then patterned by a first pboto lithography process to form both a gate electrode 15 and a convex and concave pattern 20 on the glass substrate 5.

With reference to FIG. 3B, a gate insulating film 16 is formed by a plasma chemical vapor deposition method so that the gate insulating film 16 covers the entire surface of the glass substrate 5 including the gate electrode 15 and the convex and concave pattern 20. The gate insulating film 16 comprises laminations of a silicone oxide film having a thickness of 300 nm and a silicon nitride film having a thickness of 100 nm. A semiconductor film 17 made of an amorphous silicon and having a thickness of 100 nm is formed by the plasma chemical vapor deposition method on the gate insulating film 16. An impurity doped semiconductor layer made of an amorphous silicon doped with an n-type impurity of phosphorous is further formed by the plasma chemical vapor deposition method on the semiconductor film 17. The impurity doped semiconductor layer has a thickness of 100 nm. Further, a chromium metal layer having a thickness of 50 nm is deposited by a spattering method on the impurity doped semiconductor layer. The gate electrode 15 and the convex and concave pattern 20 results in formation of a rough surface including convex and concave portions of the gate insulating film 16. This rough surface including convex and concave portions of the gate insulating film 16 results in formation of a rough surface including convex and concave portions of the semiconductor film 17. This rough surface including convex and concave portions of the semiconductor film 17 results in formation of a rough surface including convex and concave portions of the impurity doped semiconductor layer. Further, this rough surface including convex and concave portions of the impurity doped semiconductor layer results in formation of a rough surface including convex and concave portions of the chromium metal layer.

With reference to FIG. 3C, an island 22 and convex patterns 21 are formed by a second lithography process so that the convex patterns 21 are provided only on the chromium patterns 20.

With reference to FIG. 3D, the chromium metal layer on the island 22 is selectively removed by a third lithography process to form source and drain electrodes 8 and 9 on the island 22.

With reference to FIG. 3E, an aluminum layer having a thickness of 300 nm is deposited by a spattering method on the surface of glass substrate 5 on which the island 22 and the convex patterns 21 have been provided. The convex patterns 21 cause the deposited aluminum layer to have a largely rough surface including large convex and large concave portions. The deposited aluminum layer is then patterned by a fourth lithography process to selectively remove the same over and in the vicinity of the island 22 to thereby form a light reflection plate 10 over the glass substrate 5 except on or in the vicinity of the island 22.

In the first embodiment, the patterns 21 which cause the rough surface including the convex and concave portions of the light reflecting plate 10 was formed at the same time when the island 22 is formed in order to simplify the fabrication processes for the bottom substrate with the light reflection plate 10.

The plasma chemical vapor deposition processes were made under the following conditions for depositing silicon oxide film, the silicon nitride film, the amorphous silicon film, the n-type amorphous silicon film. When the silicon oxide film was formed, silane gas and oxygen gas were used as reaction gases where a flow rate of silane gas to oxygen gas was set in the range of about 0.1 to 0.5. A growth temperature at which the silicon oxide film was grown was set in the range of about 200° C. to 300° C. under a pressure of 1 Torr. A plasma power was set at 200 W. When the silicon nitride film was deposited, silane gas and ammonia gas were used as the reaction gases where a flow rate of silane gas to ammonia gas was set in the range of about 0.1 to 0.8. A growth temperature at which the silicon nitride film was set at about 250° C. under a pressure of 1 Torr. A plasma power was set at 200 W. When the amorphous silicone film was deposited, silane gas and hydrogen gas were used as the reaction gas, where a flow rate of silane gas to hydrogen gas was set in the range of about 0.5 to 2. A growth temperature at which the amorphous silicone film was formed was set in the range of about 200° C. to 250° C. under a pressure of 1 Torr. A plasma power was set at 50 W. When the n-type amorphous silicon film was deposited, silane gas and phosphate were used for the reaction gases, where a flow rate silane gas and phosphate gas was set in the range of 1 to 2. A growth temperature for growing the n-type amorphous silicon film was set at about 200° C. to 250° C. under a pressure of 1 Torr. A plasma power was set at 50 W.

When the island 22, the patterns 21, the gate electrode and the pattern 20 were formed, the chromium layer was etched by using a wet etching method. The silicon oxide film, the silicon nitride film and the amorphous silicone film were etched by a dry etching method. For etching the chromium layer, an aqueous solution of a perchloric acid and secondary curium ammonium nitride was used. Further, for etching the silicon nitride film and the silicon oxide film, a fluorite tetracarbide gas and an oxygen gas were used as etching gases under a reaction pressure of 5 mTorr to 300 mTorr at a power of 100 W to 300 W. Furthermore, for etching the amorphous silicon film, a chlorine gas and a hydrogen gas were used under a reaction pressure of 5 mTorr to 300 mTorr at a power of 50 W to 200 W.

The total number of the photo-lithography processes is four, which is less than six times the photo lithography processes required in the conventional fabrication method. In the present embodiment, the patterns 21 comprise laminations of a chromium metal layer, a silicon oxide film, a silicon oxide film, an amorphous silicon film, an n-type amorphous silicon film, and chromium. Therefore, the height of the patterns 21 was defined by the total thickness of these films. The total thickness of these films was set at about 700 nm. Whereas it is not necessary to limit the total thickness of those films, the height of the patterns 21 may be changed by changing the height of the metal electrode, the insulating layer or the semiconductor layer.

In the present embodiment, the shape in the plan view and the positional arrangement of the patterns 21 may be modified to math various requirements and conditions.

Figure 11A:
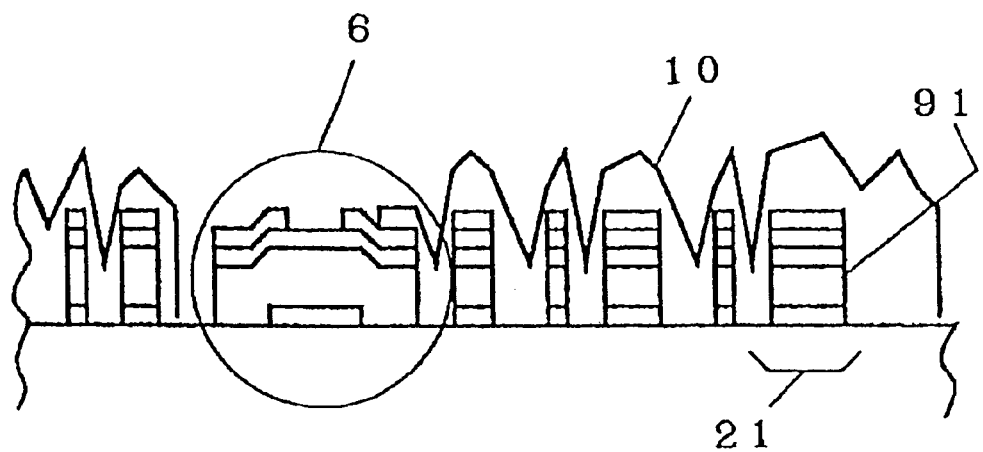
FIGS. 11A and 11B are cross-sectional elevation views illustrative of the rough surfaces formed on the light reflecting plates of the first according to the present invention.
Figure 11B:
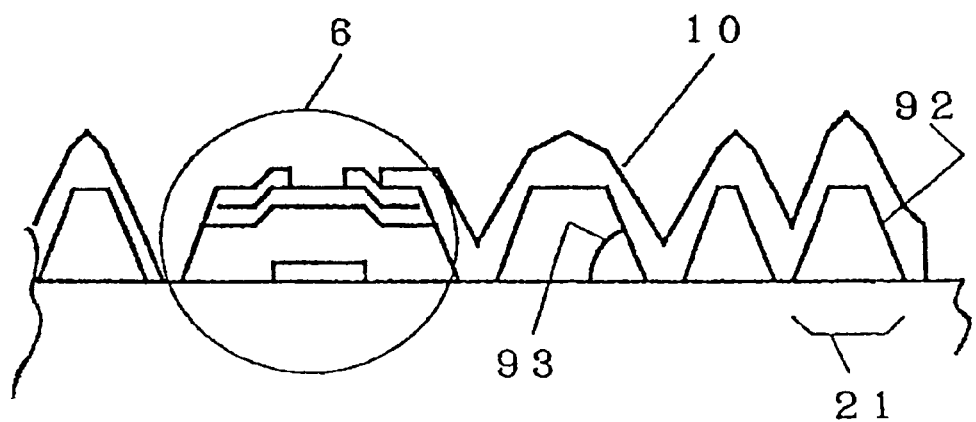

When the patterns 21 were formed, the side walls of the patterns may be arranged to be tapered to adjust the conditions of the photo resist and the exposure process. In FIG. 11A, illustrated is the structure of the bottom substrate of the reflective liquid crystal display device where the side walls of the patterns are arranged to adjust the substrate. In FIG. 11B, shown is the structure of the bottom substrate where the side walls of the patterns are tapered. In FIGS. 11A and 11B, the same reference numbers are used for the same elements as those in FIGS. 3A through 3E. According to the structure shown in FIG. 11B, since the side walls of the patterns are tapered, the reflection plate 10 is provided more easily than when the side walls of the patterns are almost vertical.

The oblique angle 93 of the tapered side walls 92 of the patterns is set in the range of about 5 to 15 degrees, and an aperture ratio of the reflection plate is set at about 70 to 80%.

Figure 12:
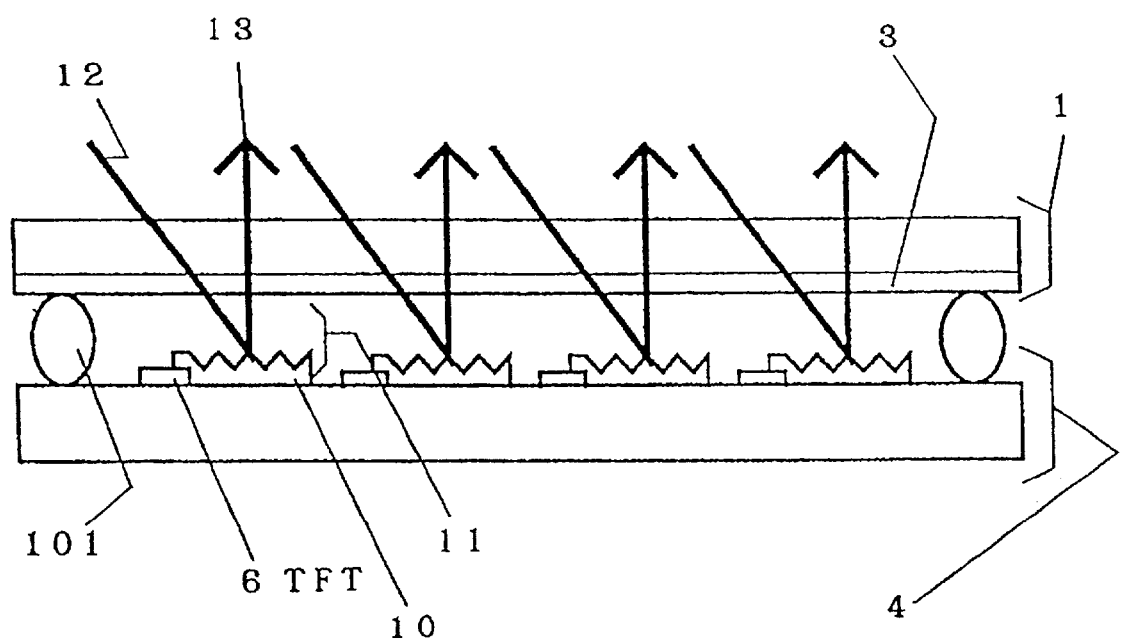
FIG. 12 is a cross sectional elevation view illustrative of the structure of the reflective liquid crystal display device according to the first embodiment of the present invention.

FIG. 12 is a cross sectional elevation view illustrative of the structure of the reflective liquid crystal display device according to the first embodiment of the present invention.

Figure 1:
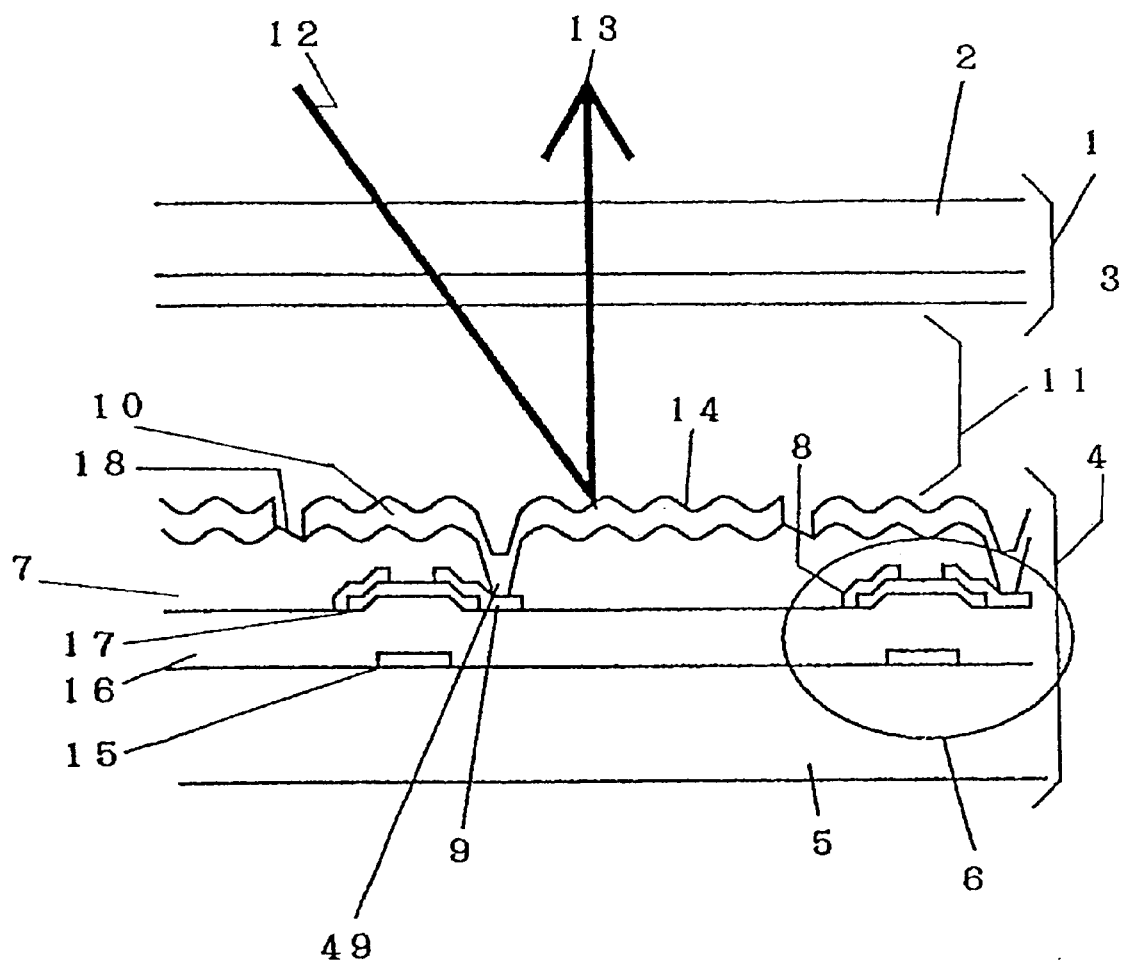
FIG. 1 is a cross-sectional view illustrative of the structure of the conventional reflective liquid crystal display.
Figure 2A:
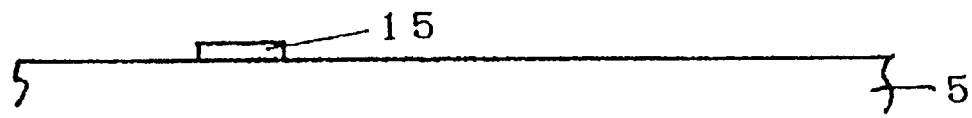
Figure 2B:
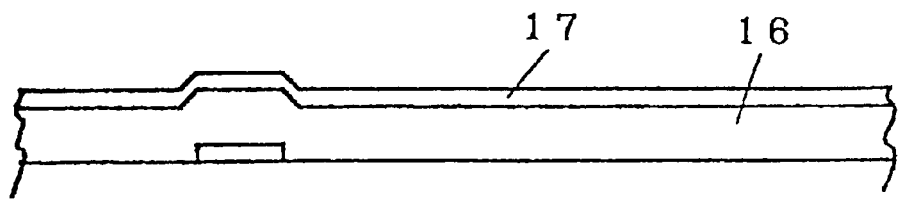
Figure 2E:
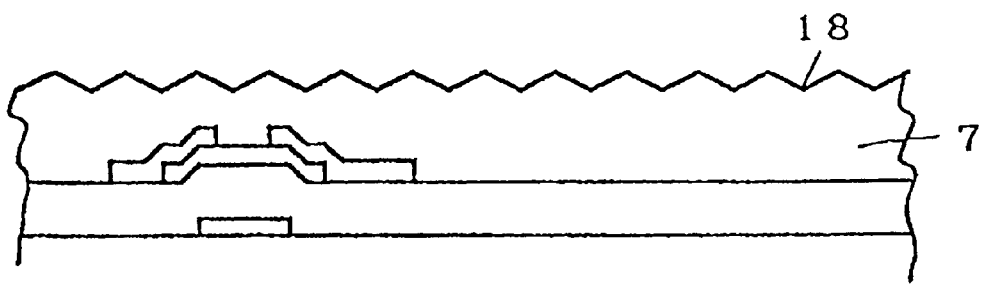
Figure 2F:
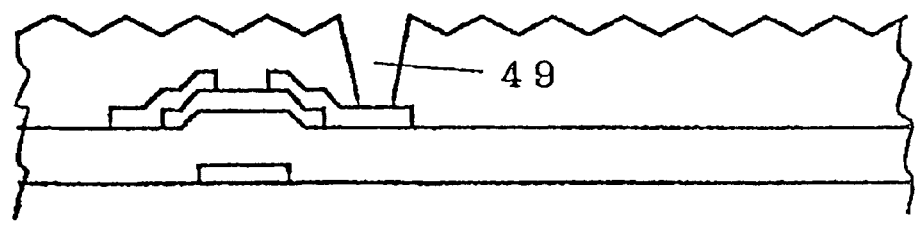
Figure 2G:
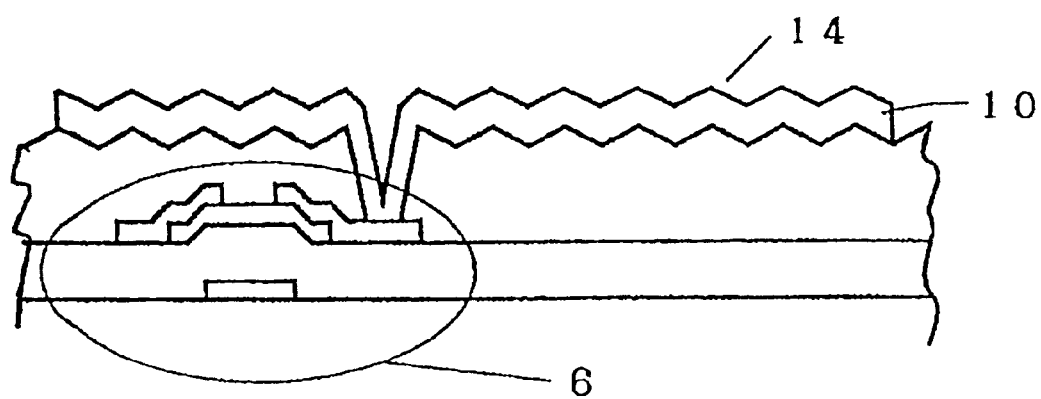

In FIG. 12, the same numerical references are used for the same elements as those in FIG. 1. The bottom substrate 5 fabricated according to the processes shown in FIGS. 3A through 3E is bonded with the top substrate 1 having a transparent electrode 3 formed by ITO so as to have the surfaces of the top and bottom substrates face to each other. It should be noted that orientations are applied on both the surfaces of the light reflecting plate 10 of the bottom substrate 4 and of the transparent electrode 3 of the top substrate 1. Both the top and bottom substrates are bonded to each other via spacers comprising plastic particles, wherein an epoxy system adhesive 101 is applied on circumferential portions of the panel. Thereafter, a guest-post liquid crystal is injected into a gap defined between the top and bottom substrates to thereby form a liquid crystal layer 11, then the fabrication processes for the liquid crystal display have been completed.

According to this embodiment, a monochrome reflecting panel having practically sufficient brightness and whiteness was realized at a low cost. Further, it is preferable that an RGB color filter is arranged on the top substrate 1, a bright color reflection panel may be obtained at a low cost.

Second Embodiment

A second embodiment according to the present invention will be described with reference to FIGS. 13A through 13F illustrative of the fabrication processes for the bottom substrate of the reflective liquid crystal display with a thin-film transistor having an inverse stagger structure.

The reflective liquid crystal display according to this embodiment has almost the same structure as that of the first embodiment, except for providing another insulating layer between the light reflecting plate 10 and the patterns 21. In the second embodiment, the thin-film transistor having the inverse stagger structure is also used as an active matrix driving element.

Figure 13A:
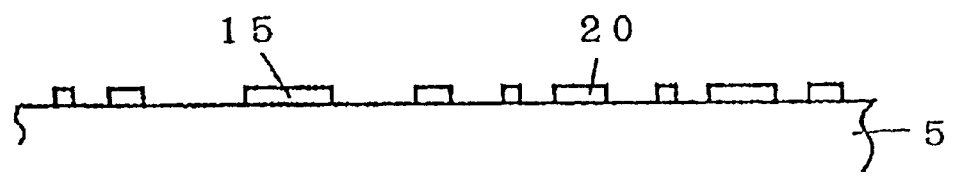
FIGS. 13A through 13F are cross-sectional elevation views illustrative of the fabrication processes for the bottom substrate with the light reflection plate in the reflective liquid crystal display device according to the second embodiment of the present invention.

With reference to FIG. 13A, a chromium metal layer having a thickness of 50 nm is formed on a glass substrate 5 and then patterned by a first photo lithography process to form both a gate electrode 15 and a convex and concave pattern 20 on the glass substrate 5.

Figure 13B:
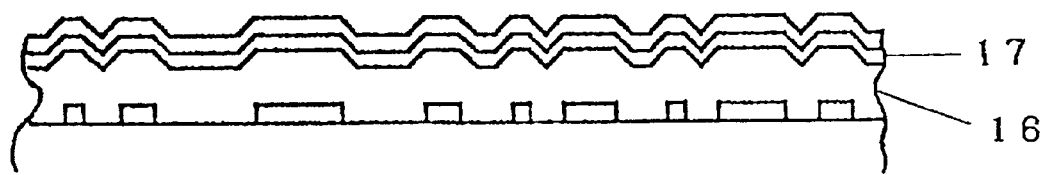

With reference to FIG. 13B, a gate insulating film 16 is formed by a plasma chemical vapor deposition method so that the gate insulating film 16 covers the entire surface of the glass substrate 5 including the gate electrode 15 and the convex and concave pattern 20. The gate insulating film 16 comprises laminations of a silicone oxide film having a thickness of 300 nm and a silicon nitride film having a thickness of 100 nm. A semiconductor film 17 made of an amorphous silicon and having a thickness of 100 nm is formed by the plasma chemical vapor deposition method on the gate insulating film 16. An impurity doped semiconductor layer made of an amorphous silicon doped with an n-type impurity of phosphorous is further formed by the plasma chemical vapor deposition method on the semiconductor film 17. The impurity doped semiconductor layer has a thickness of 100 nm. Further, a chromium metal layer having a thickness of 50 nm is deposited by a spattering method on the impurity doped semiconductor layer. The gate electrode 15 and the convex and concave pattern 20 results in formation of a rough surface including convex and concave portions of the gate insulating film 16. This rough surface including convex and concave portions of the gate insulating film 16 results in formation of a rough surface including convex and concave portions of the semiconductor film 17. This rough surface including convex and concave portions of the semiconductor film 17 results in formation of a rough surface including convex and concave portions of the impurity doped semiconductor layer. Further, this rough surface including convex and concave portions of the impurity doped semiconductor layer result in formation of a rough surface including convex and concave portions of the chromium metal layer.

Figure 13C:
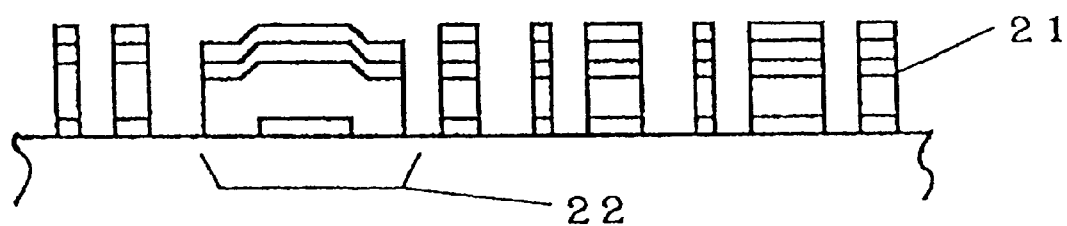

With reference to FIG. 13C, an island 22 and convex patterns 21 are formed by a second lithography process so that the convex patterns 21 are provided only on the chromium patterns 20.

Figure 13D:
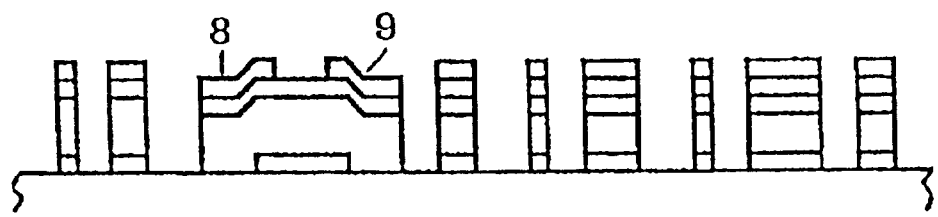

With reference to FIG. 13D, the chromium metal layer on the island 22 is selectively removed by a third lithography process to form source and drain electrodes 8 and 9 on the island 22.

Figure 13E:
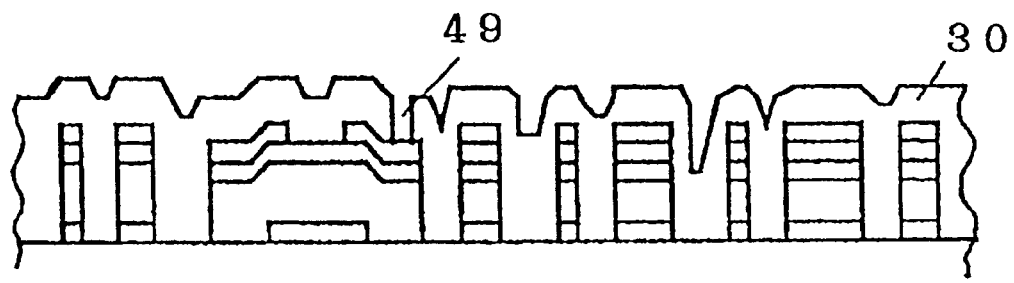

With reference to FIG. 13E, an insulating film 30 is formed on the island 22 and the patterns 21. Contact holes 49 are formed by the fourth photo lithography process.

Figure 13F:
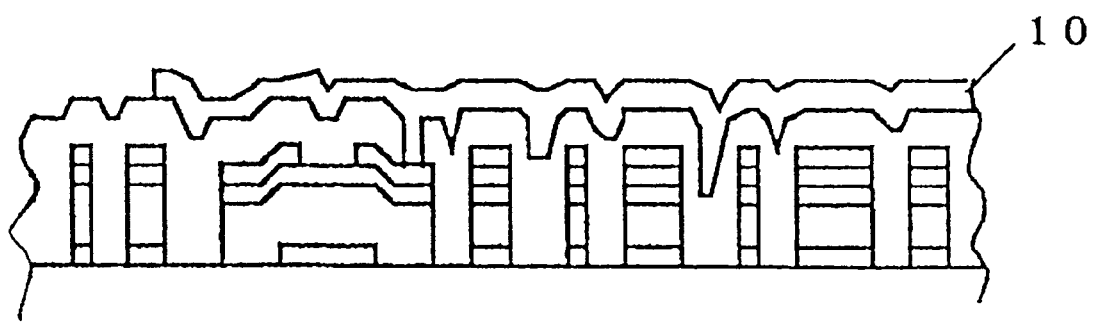

With reference to FIG. 13F, an aluminum layer having a thickness of 300 nm is formed on the insulating film 30 by a spattering method and patterned by the fifth photolithography process to complete the light reflecting plate 10.

In the second embodiment, an organic system insulation film 30 is formed as an inter-layer insulator over the patterns 21 and the thin-film transistor region 22 and under the light reflecting plate 10. The organic system insulation film 30 comprises a photo sensitive polyimide film, i.e. RN-901 commercially available from Nissan Chemical Corporation. The organic system insulation film 30 is formed under the following conditions. The RN-901 is applied by a spin coating method at a rotation speed of 300 rpm for 5 seconds and then a subsequent spin coating method at a rotation speed of 2800 rpm for 20 seconds, and the spin-coated layer is preliminary baked at a temperature of 80° C. for 10 minutes. Thereafter, the layer is exposed by use of a super high pressure mercury-vapor lamp and then patterned by a developer of NMD-3 including 2.38% of TMA solution and commercially available from Tokyo Ouka Co., Ltd. Finally, a post baking process is conducted at a temperature of 250° C. for 100 minutes.

According to the second embodiment, five photo lithography processes were made.

In the second embodiment, since the bottom substrate 4 is covered with the organic system inslating film 30 having a thickness of 1 micrometer, the oblique angle of the side walls of the patterns is gentle.

Figure 14:
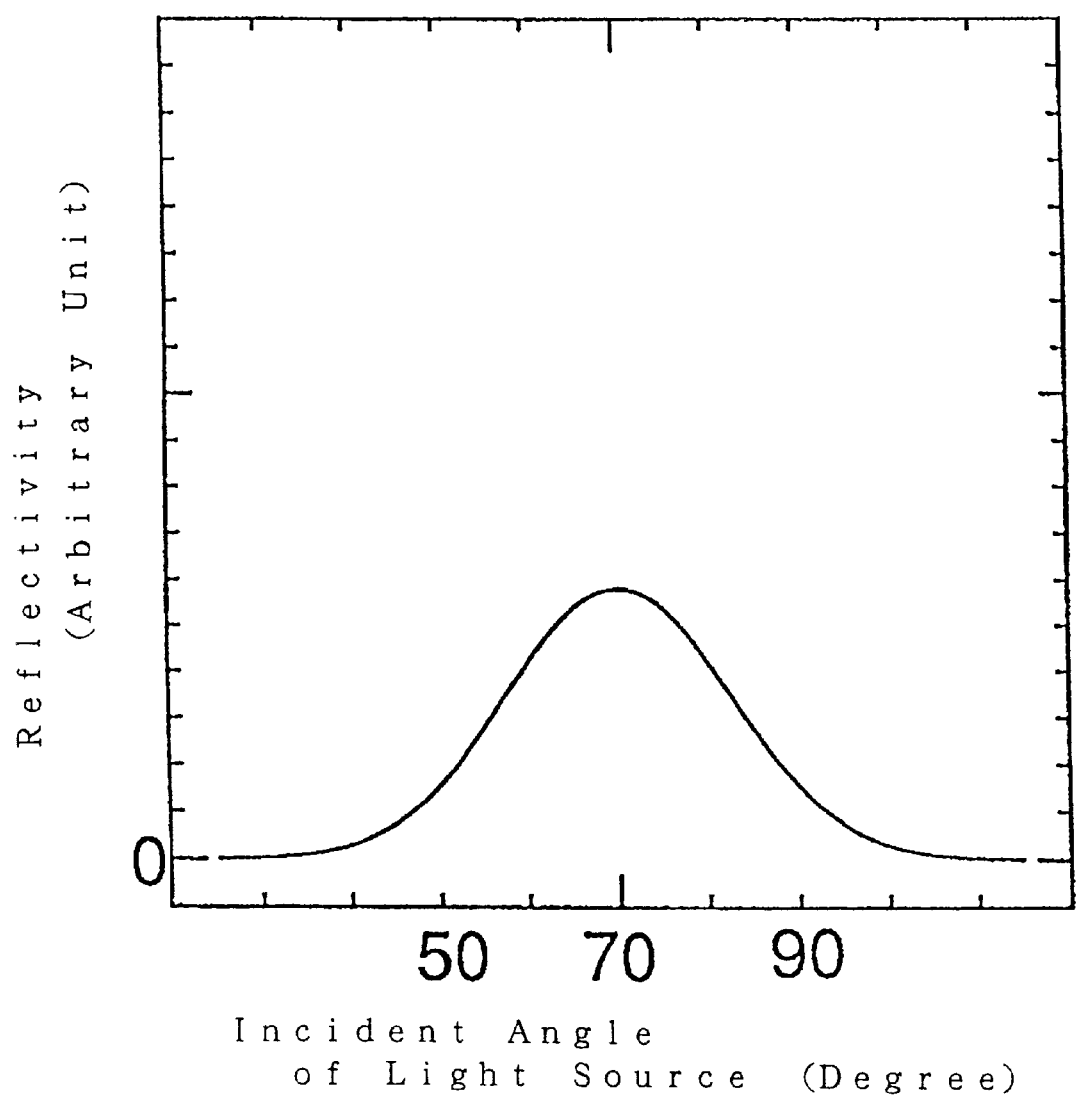
FIG. 14 is a diagram illustrative of the reflectivity of the light reflecting plate with an insulation film versus the incident angle of the light source according to the second embodiment of the present invention.
Figure 15:
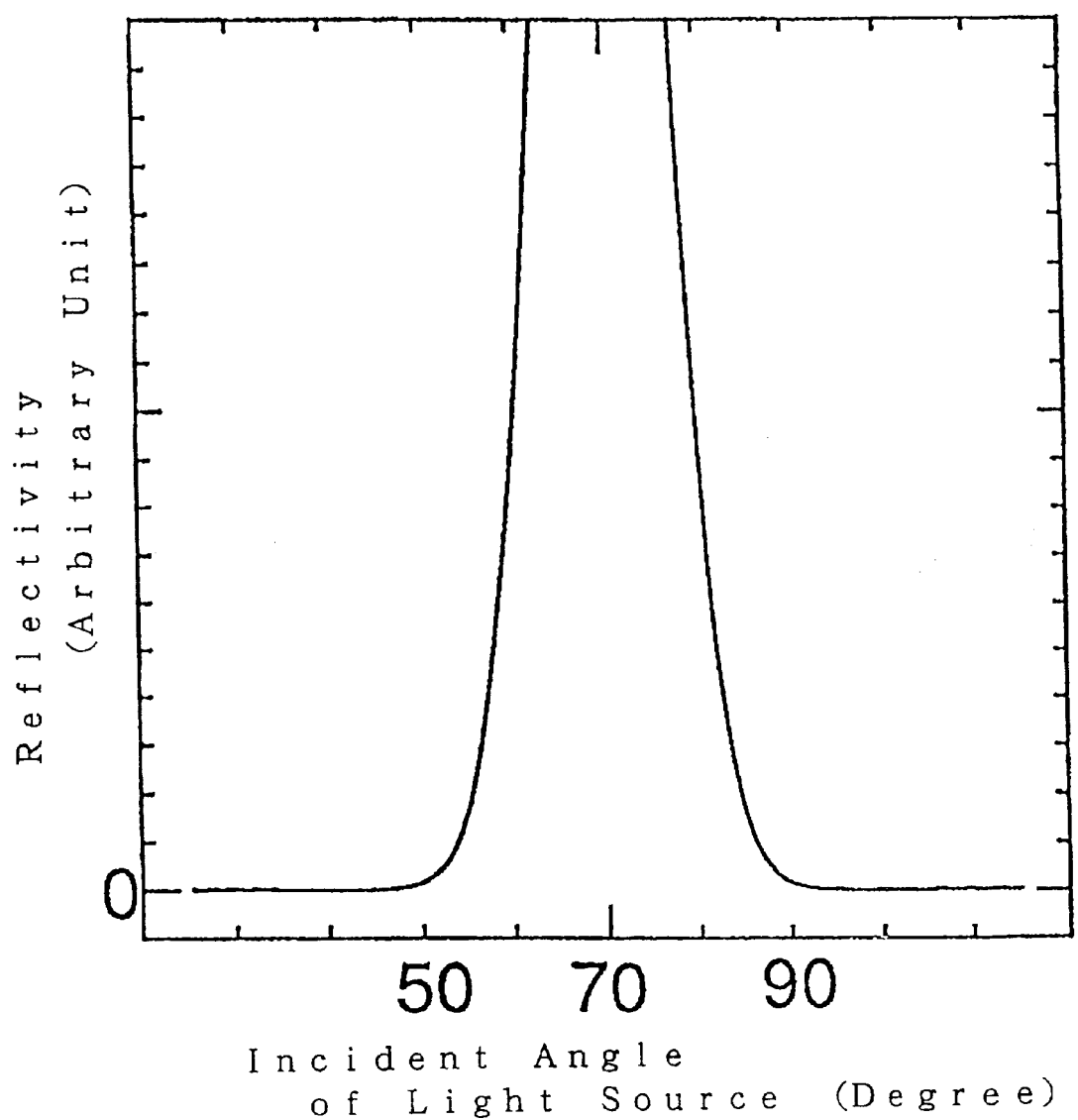
FIG. 15 is a diagram illustrative of the reflectivity of the light reflecting plate without an insulation film versus the incident angle of the light source according to the second embodiment of the present invention.

In FIG. 14, there is shown the reflectivity of the light reflecting plate 10 where the organic system insulating film 30 is provided between the reflecting plate 10 and the patterns 21. In FIG. 15, illustrated is the reflectivity of the light reflecting plate 10 where no insulating film is provided. It should be noted that the reflectivity was evaluated by the evaluating system shown in FIG. 8. As will be appreciated from FIGS. 14 and 15, when no insulating film 30 is provided, the light reflecting intensity in a positive reflecting direction becomes great and the light reflecting intensity is determined depending upon the incident angle of the light. Contrary to this, according to the second embodiment, a greater light reflecting intensity is obtained in a wide angle of the field of view. When such a light reflecting plate is applied in the reflective liquid crystal display, a bright displaying performance can be obtained.

In the second embodiment, the mean oblique angle of side walls of the patterns formed on the surface of the light reflecting plate is set at about 10 degrees. It is proved that the mean oblique angle of the patterns can be changed by controlling the condition of the organic system insulating film 30, i.e. The thickness of the film, the baking temperature, the position and/or the size of the patterns, so that it is possible to obtain the light reflecting plate having a preferred light reflecting performance so as to match various practical uses.

It should be noted that the flat shape and the position of the patterns, which was formed in the fabrication step shown in FIG. 13C, may be arranged in random.

Since the light reflecting plate 10 is positioned on the top layer of the bottom substrate, the area of the light reflecting plate 10 is made maximum. As a result, the aperture ratio of the light reflecting plate 10 is about 80 to 90%. and thus the light reflecting plate 10 having a great brightness can be realized.

Similar to the first embodiment, the bottom substrate 4 is bonded with the top substrate 1 so as to have the surfaces of the top and bottom substrates face to each other, and the guest-host liquid crystal is injected into the gap between the top and bottom substrates to complete the fabrications of the reflective liquid crystal display.

According to the reflective liquid crystal display device of the second embodiment, sufficiently bright monochrome light reflection panel having a whiteness index as good as a news paper can be realized with a low cost. If an RGB color filter is provided on the opposite side substrate, a bright color reflective panel can be obtained with a low cost.

In the second embodiment, a positive type organic system insulating film is used as an inter-layer insulator provided between the thin-film transistor element region and the convex and concave portions. However, the present invention is not limited to this embodiment. For instance, if photoneece UR3800 commercially available from Toyo Rayon Co., Ltd. is used as a negative type photo sensitive organic system insulating film, or HM-5001 commercially available from Nissan Chemical Corporation is used as a photo sensitive inorganic system insulating film, then the same effects can be obtained as those described in the present embodiment. Further, when the organic system insulating film having no photo sensitivity, for instance, RN-812 commercially available from Nissan Chemical Corporation or the inorganic system insulating film having no photo sensitivity, for instance, NT-L6008 commercially available from Nissan Chemical Corporation is used, then the reflective liquid crystal display device providing the same effect can be obtained, provided that additional processes for applying a photo resist material, developing and removing the photo resist material are necessary.

Third Embodiment

FIGS. 16A through 16F are cross-sectional elevation views illustrative of the fabrication processes for the bottom substrate with a light reflection plate of the reflective liquid crystal display. In the third embodiment.

Figure 16A:
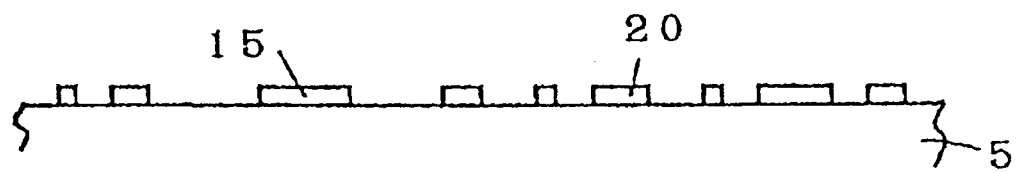
FIGS. 16A through 16F are cross-sectional elevation views illustrative of the fabrication processes for the bottom substrate with a light reflection plate of the reflective liquid crystal display according to the third embodiment of the present invention.

With reference to FIG. 16A, a chromium metal layer having a thickness of 50 nm is formed on a glass substrate 5 and then patterned by a first photo lithography process to form both a gate electrode 15 and a convex and concave pattern 20 on the glass substrate 5.

Figure 16B:
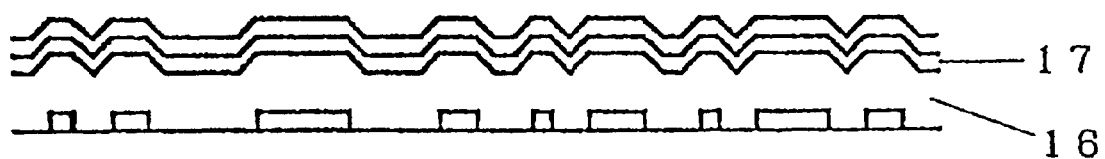

With reference to FIG. 16B, a gate insulating film 16 is formed by a plasma chemical vapor deposition method so that the gate insulating film 16 covers the entire surface of the glass substrate 5 including the gate electrode 15 and the convex and concave pattern 20. The gate insulating film 16 comprises laminations of a silicone oxide film having a thickness of 300 nm and a silicon nitride film having a thickness of 100 nm. A semiconductor film 17 made of an amorphous silicon and having a thickness of 100 nm is formed by the plasma chemical vapor deposition method on the gate insulating film 16. An impurity doped semiconductor layer made of an amorphous silicon doped with an n-type impurity of phosphorous is further formed by the plasma chemical vapor deposition method on the semiconductor film 17. The impurity doped semiconductor layer has a thickness of 100 nm. Further, a chromium metal layer having a thickness of 50 nm is deposited by a spattering method on the impurity doped semiconductor layer. The gate electrode 15 and the convex and concave pattern 20 results in formation of a rough surface including convex and concave portions of the gate insulating film 16. This rough surface including convex and concave portions of the gate insulating film 16 results in formation of a rough surface including convex and concave portions of the semiconductor film 17. This rough surface including convex and concave portions of the semiconductor film 17 results in formation of a rough surface including convex and concave portions of the impurity doped semiconductor layer. Further, this rough surface including convex and concave portions of the impurity doped semiconductor layer results in formation of a rough surface including convex and concave portions of the chromium metal layer.

Figure 16C:
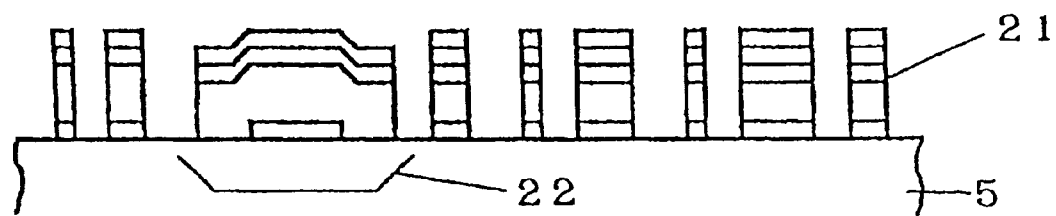

With reference to FIG. 16C, an island 22 and convex patterns 21 are formed by a second lithography process so that the convex patterns 21 are provided only on the chromium patterns 20, wherein the island and the patterns comprising laminations of the chromium metal layer, the silicon oxide film, the silicon nitride film, the amorphous silicon film, the n-type amorphous silicon film, and the chromium metal layer are selectively etched by use of the photo-lithography process.

Figure 16D:
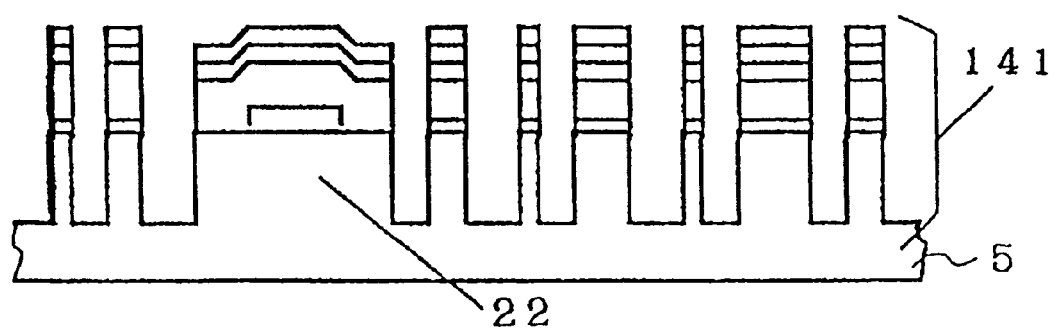

With reference to FIG. 16D, the glass substrate 5 under those layers is further selectively etched by one micrometer by the same continuous etching process as used in the previous process illustrated in FIG. 16C. The etching process is conducted by using a solution with 50% hydrogen fluorine acid. As a result, the patterns 141 having a maximum height of 1.7 micro meters are formed on the bottom substrate 5.

Figure 16E:
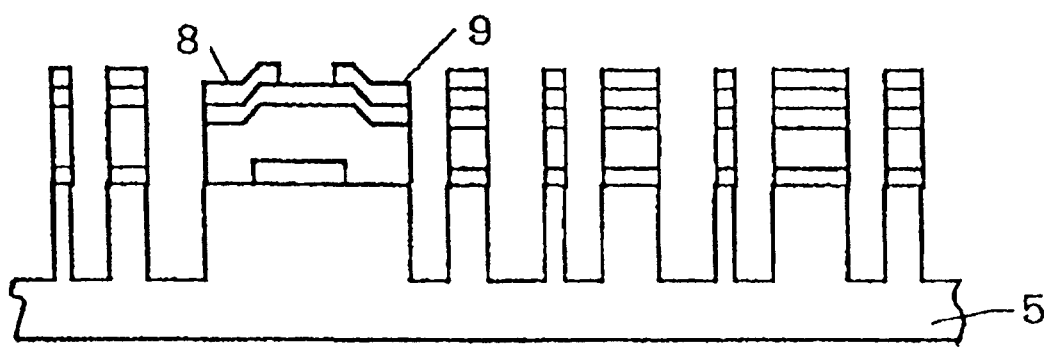

With reference to FIG. 16E, the chromium metal layer on the island 22 is selectively removed by a third lithography process to form source and drain electrodes 8 and 9 on the island 22.

Figure 16F:
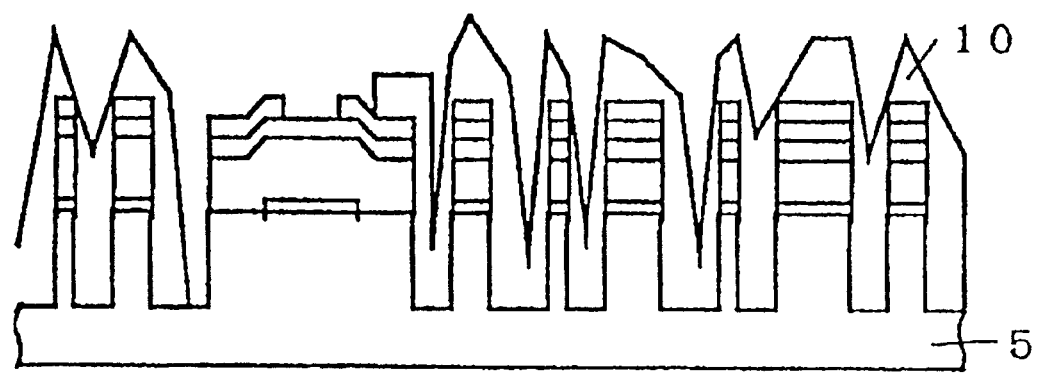

With reference to FIG. 16F, an aluminum layer having a thickness of 300 nm is deposited by a spattering method on the surface of glass substrate 5 on which the island 22 and the convex patterns 141 have been provided. The convex patterns 141 causes the deposited aluminum layer to have a largely rough surface including large convex and large concave portions. The deposited aluminum layer is then patterned by a fourth lithography process to selectively remove the same over and in the vicinity of the island 22 to thereby form a light reflection plate 10 over the glass substrate 5 except on or in the vicinity of the island 22.

In the third embodiment, since the glass substrate 5 is selectively etched, it is possible to obtain a large height of the patterns 141 independent from the thickness of the thin-film transistor element. Therefore, not only the optimum thickness of the thin-film transistor for obtaining the high performances of the thin film transistor can be obtained but also the suitable height of the patterns 141 for realizing the preferred light reflection performance can also be obtained.

According to the reflective liquid crystal display device of the second embodiment, sufficiently bright monochrome light reflection panel having a whiteness index as good as a news paper can be realized with a low cost. If an RGB color filter is provided on the opposite side substrate, a bright color reflective panel can be obtained with a low cost.

Fourth Embodiment

Figure 17:
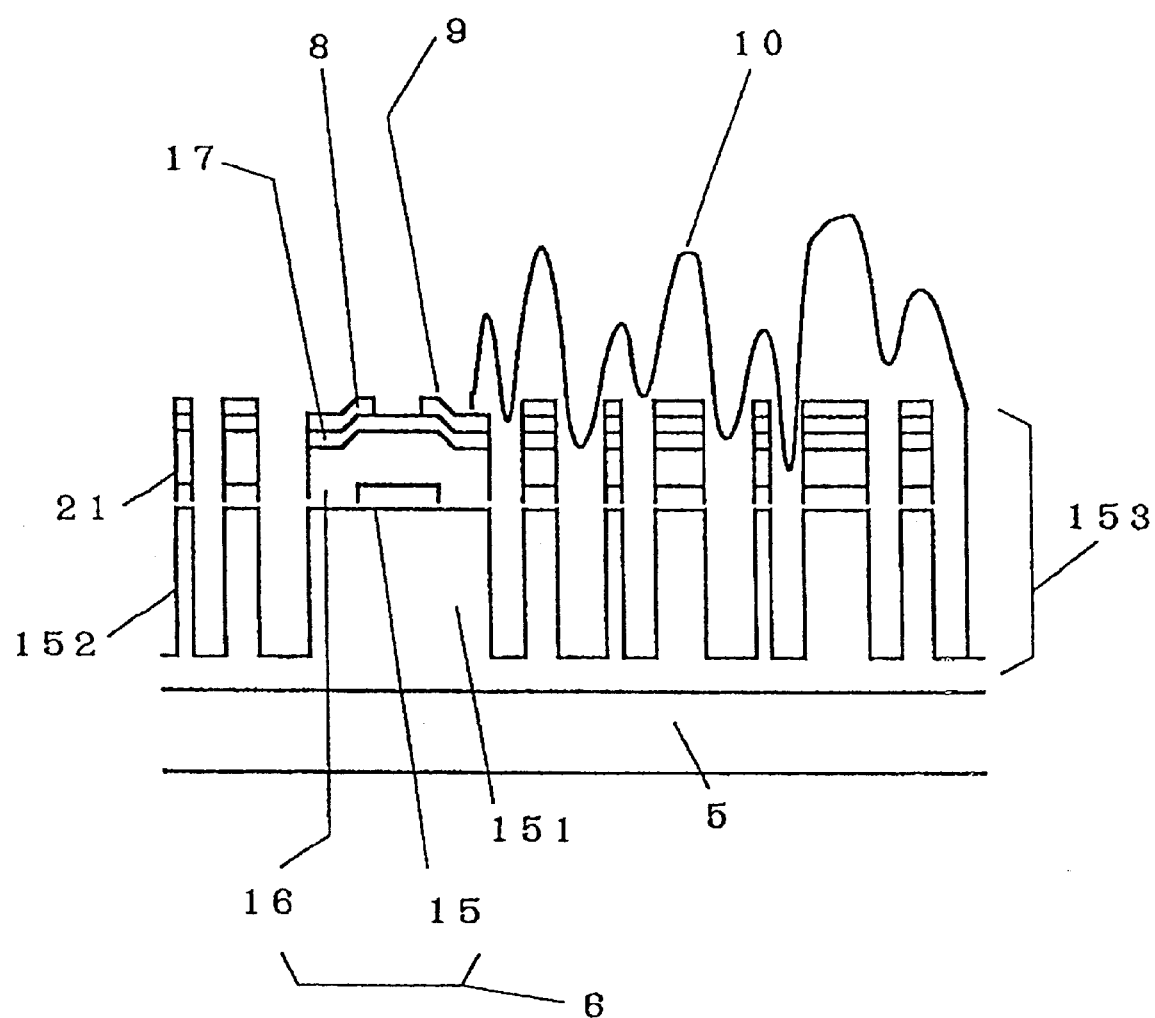
FIG. 17 is a cross-sectional elevation view illustrative of a structure of the bottom substrate with the light reflection plate in the reflective liquid crystal display device according to the fourth embodiment of the present invention.

FIG. 17 is a cross-sectional elevation view illustrative of a structure of the bottom substrate with the light reflection plate in the reflective liquid crystal display device according to the fourth embodiment of the present invention.

A silicon oxide film 151, on which patterns 152 should preliminary be provided, is first formed on the glass substrate 5 with a thickness of 2 micrometers by a plasma chemical vapor deposition method. The plasma chemical vapor deposition was made under conditions that 10 sccm of silane gas and 80 sccm of oxygen gas are supplied as source gases at a temperature of 350° C. and under a reaction pressure of 1 Torr.

A chromium metal layer having a thickness of 50 nm is formed on a glass substrate 5 and then patterned by a first photolithography process to form both a gate electrode 15 and a convex and concave pattern 20 on the glass substrate 5.

A chromium metal layer having a thickness of 50 nm is formed on a glass substrate 5 and then patterned by a first photolithography process to form both a gate electrode 15 and a convex and concave pattern 20 on the glass substrate 5.

A gate insulating film 16 is formed by a plasma chemical vapor deposition method so that the gate insulating film 16 covers the entire surface of the glass substrate 5 including the gate electrode 15 and the convex and concave pattern 20. The gate insulating film 16 comprises laminations of a silicone oxide film having a thickness of 300 nm and a silicon nitride film having a thickness of 100 nm. A semiconductor film 17 made of an amorphous silicon and having a thickness of 100 nm is formed by the plasma chemical vapor deposition method on the gate insulating film 16. An impurity doped semiconductor layer made of an amorphous silicon doped with an n-type impurity of phosphorous is further formed by the plasma chemical vapor deposition method on the semiconductor film 17. The impurity doped semiconductor layer has a thickness of 100 nm. Further, a chromium metal layer having a thickness of 50 nm is deposited by a spattering method on the impurity doped semiconductor layer. The gate electrode 15 and the convex and concave pattern 20 results in formation of a rough surface including convex and concave portions of the gate insulating film 16. This rough surface including convex and concave portions of the gate insulating film 16 results in formation of a rough surface including convex and concave portions of the semiconductor film 17. This rough surface including convex and concave portions of the semiconductor film 17 results in formation of a rough surface including convex and concave portions of the impurity doped semiconductor layer. Further, this rough surface including convex and concave portions of the impurity doped semiconductor layer results in formation of a rough surface including convex and concave portions of the chromium metal layer.

An island 22 and convex patterns 21 are formed by a second lithography process so that the convex patterns 21 are provided only on the chromium patterns 20, wherein the island and the patterns comprising laminations of the chromium metal layer, the silicon oxide film, the silicon nitride film, the amorphous silicon film, the n-type amorphous silicon film, and the chromium metal layer are selectively etched by use of the photolithography process.

The silicon oxide insulating film 151 under those layers is further selectively etched by one micrometer by a dry etching method. The etching condition is that 100 sccm of tetra-fluoride carbide gas and 20 sccm of oxygen gas are used as etching gases, under the power of 200 W and the pressure of 100 mTorr. As a result, the patterns 151 having a maximum height of 1.7 micro meters are formed on the bottom substrate 5.

The chromium metal layer on the island 22 is selectively removed by a third lithography process to form source and drain electrodes 8 and 9 on the island 22.

An aluminum layer having a thickness of 300 nm is deposited by a spattering method on the surface of glass substrate 5 on which the island 22 and the convex patterns 151 have been provided The convex patterns 151 causes the deposited aluminum layer to have a largely rough surface including large convex and large concave portions. The deposited aluminum layer is then patterned by a fourth lithography process to selectively remove the same over and in the vicinity of the island 22 to thereby form a light reflection plate 10 over the glass substrate 5 except on or in the vicinity of the island 22.

According to the fourth embodiment, one more process is necessary to form the convex patterns 152, but the time for etching becomes shorter than that for etching the glass substrate 5, and it is possible to freely control the oblique angle of the side walls of the convex patterns 152. Therefore, the intended light reflection characteristic can easily be obtained and the reflective liquid crystal display having high performances can be obtained.

In the fourth embodiment, the silicon oxide film was used as the film 151 for forming the convex patterns 152, but the present invention is not limited to this embodiment. That is to say, a silicon nitride film or polyimide film can be used instead of the silicon oxide film. Further, if the photo sensitive organic system film or the photo sensitive inorganic system film is used as the layer for forming the convex patterns 152, then the etching process becomes more simple.

Fifth Embodiment

Figure 18:
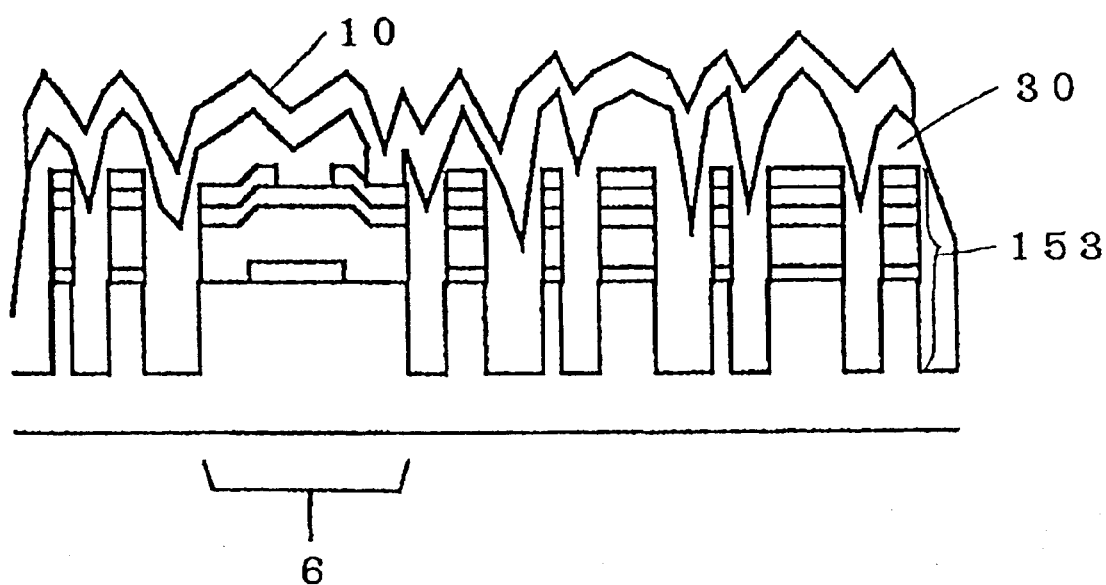
FIG. 18 is a cross-sectional elevation view illustrative of a structure of the bottom substrate with the light reflection plate in the reflective liquid crystal display device according to the fifth embodiment of the present invention.

FIG. 18 is a cross-sectional elevation view illustrative of a structure of the bottom substrate with the light reflection plate in the reflective liquid crystal display device according to the fifth embodiment of the present invention. In the fifth embodiment, an additional insulating film is further provided between the light reflecting plate 10 and the patterns, in the light of which the structure of the reflective liquid crystal display device differs from that of the third embodiment.

As shown in FIG. 18, an organic system insulating film 30 is provided over convex patterns 153 and the thin-film transistor element portion 6 and under the light reflecting plate 10. A photo sensitive polyimide film of RN-901 commercially available from Nissan Chemical Corporation is used for the insulating film. The conditions for forming the film are the same as those in the second embodiment.

As a result, the maximum height of the convex patterns 153 is defined by the total thickness of the convex patterns 153 formed on the glass substrate 5, the chromium layer formed over the convex patterns 153, the gate insulating film, the semiconductor film, the impurity doped semiconductor layer and the chromium film. According to the fifth embodiment, the height of the patterns 153 of the light reflecting plate 10 can be made high independent from the thickness of the thin-film transistor element. Further, since the patterns 153 are covered with the organic system insulating film 30 having a thickness of 1 micrometer, a small oblique angle of the patterns 153 can be obtained.

As a result, the light reflecting plate of the fifth embodiment has a performance that light reflecting intensity becomes greater in a wide angle of the field of view. When the light reflecting plate of the fifth embodiment is applied to the reflective liquid crystal display, sufficiently bright monochrome light reflection panel having a whiteness index as good as a news paper can be realized with a low cost. If an RGB color filter is provided on the opposite side substrate, a bright color reflective panel can be obtained with a low cost.

In the fifth embodiment, a positive type organic system insulating film is used as an inter-layer insulator provided between the thin-film transistor element and the rough surface. However, the present invention is not limited to this embodiment. For instance, if there is used photoneece UR3800, which is a negative type photo sensitive organic system insulating film commercially available from Toyo Rayon Co., Ltd., or HM-5001, which is a photo sensitive inorganic system insulating film commercially available from Nissan Chemical Corporation, then the same effects can be obtained as the present embodiment. Further, when the organic system insulating film having no photo sensitivity, for instance, RN-812 commercially available Nissan Chemical Corporation) or the non-organic system insulating film having no photo sensitivity (for instance, NT-L6008 commercially available from Nissan Chemical Corporation is used, then the reflective liquid crystal display having the same effect as the present embodiment can be obtained, provided that the processes for applying a photo resist material, developing and removing the photo resist material are necessary.

Further, in the fifth embodiment, the rough surface is formed by etching the glass substrate 5. If, however, the organic system or inorganic system insulation film is put on the glass substrate 5 for forming a rough surface thereon as described in the fourth embodiment, the same effect can be obtained by forming the rough surface on the insulating film formed on the substrate.

Sixth Embodiment

FIGS. 10A to 10E are cross sectional views showing the fabrication processes for the bottom substrate of the reflective liquid crystal display device according to the sixth embodiment of the present invention. In the sixth embodiment, a thin-film transistor having a forward stagger structure is used as an active matrix driving element, instead of the thin-film transistor having an inverse stagger structure. By using the thin-film transistor having a forward staggered structure, a bright reflective liquid crystal display can be obtained with less fabrication processes than those of the first embodiment.

Figure 10A:
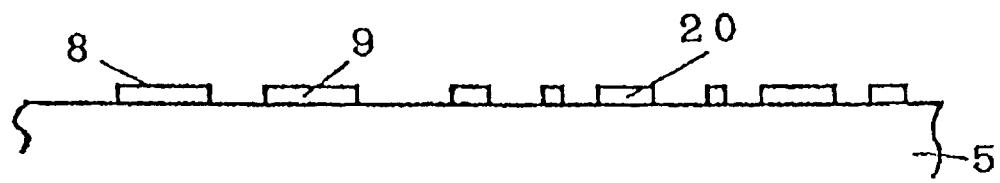
FIGS. 10A through 10D are cross-sectional elevation views illustrative of the fabrication process for the bottom substrate with a thin-film transistor having a forward stagger structure in the reflective liquid crystal display according to the present invention.

With reference to FIG. 10A, a chromium metal film having a thickness of 50 nm is formed on a glass substrate and then a gate electrode 8, a drain electrode 9, convex patterns 20 and interconnections are formed by a first photolithography process.

Figure 10B:
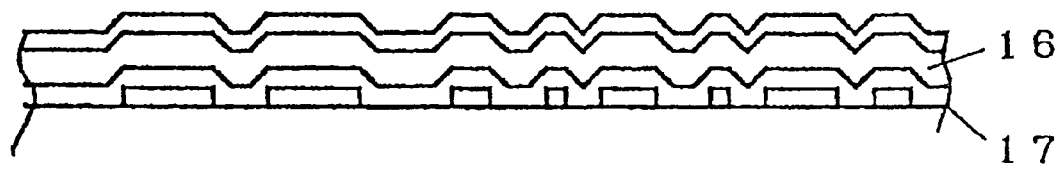

With reference to FIG. 10B, an impurity-doped semiconductor layer, the semiconductor film 17 and the gate insulating film 16 are formed by a continuous plasma chemical vapor deposition, where an amorphous silicone film having a thickness of 100 nm, whose the conductivity is changed into n-type by introducing phosphorous atoms, is used as the doping layer. An amorphous silicon film having a thickness of 100 nm is used as the semiconductor film. A silicon oxide film having a thickness of 300 nm and a silicon nitride film having a thickness of 100 nm are formed as the gate insulating film.

Figure 10C:
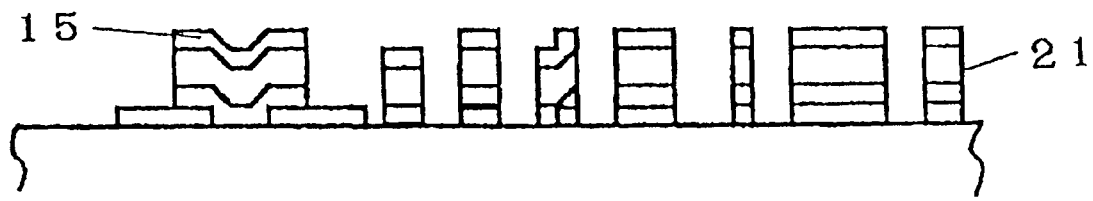

With reference to FIG. 10C, a chromium metal having a thickness of 50 nm is formed by a spattering, and then a gate electrode, an island 22 and a convex pattern 21 are formed by a second photolithography process.

Figure 10D:
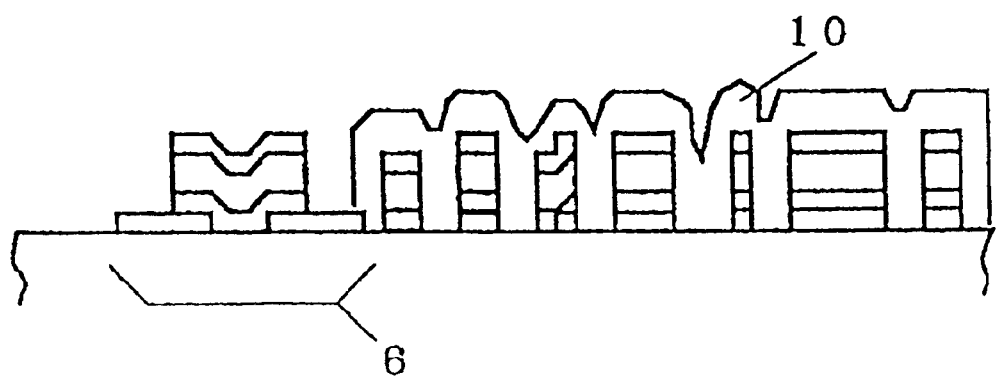

With reference to FIG. 10D, an aluminum layer having a thickness of 300 nm is formed by a spattering process and patterned by a fourth photolithography process to form a light reflection plate 10.

In the sixth embodiment, conditions for the plasma chemical vapor deposition used in forming the silicon oxide film, the silicon nitride film, the amorphous silicon film and the n-type amorphous silicon film are the same as those in the first embodiment. Further, the etching method and the conditions for forming the chromium layer, silicon oxide film, the silicon nitride film, the amorphous silicon film and the n-type amorphous silicon film to form the island 6 of the thin film transistor and the convex patterns 21 are also the same as those in the first embodiment.

In the sixth embodiment, it is possible to make the process for forming the bottom substrate simple by forming the rough surface on the light reflecting plate at the same time when the thin-film transistor element is formed during the above process illustrated in FIG. 10C. Particularly, in the sixth embodiment, since the thin-film transistor 6 having a forward stagger structure is used as an active matrix driving element, the number of the photo lithography is fewer than that in the first embodiment where the thin-film transistor having an inverse stagger structure is used. According to the sixth embodiment, the total number of the photo-lithography processes is only three, which is a half of those of the conventional method. The convex patterns comprises laminations of the chromium metal film, the silicon oxide film, the silicon nitride film, the amorphous silicon film, the n-type amorphous silicon film, and the chromium metal film. Therefore, the height of the convex patterns is defined by the total thickness of those films to be about 700 nm.

In the seventh embodiment, the plane shape and the position of the convex patterns 21 are may be modified.

When the convex patterns are formed, the side walls of the convex patterns can be modified to be tapered by adjusting the conditions of the photo resist and the exposure thereof. The oblique angle of the tapered side walls of the convex patterns in the sixth embodiment is set at about 5 to 15 degrees, and the aperture ratio of the light reflection plate is set at about 70 to 80%.

The bottom substrate fabricated according to the processes shown in FIGS. 10A through 10D is combined with the bottom substrate 1 having a transparent electrode 3 formed by ITO so as to have the surfaces of the substrates face to each other. It should be noted that orientations are applied both on the surface of the light reflecting plate of the bottom substrate and on the surface of the transparent electrode of the top substrate 1. Both the top and bottom substrates are bonded to each other with spacers of plastic particles by use of an epoxy system bonding agent applied on circumferential portions of the panel. Thereafter, a guest-host liquid crystal is injected into a gap between the top and bottom substrates to form a liquid crystal layer 11 between them whereby the liquid crystal display is completed.

According to the reflective liquid crystal display device of the second embodiment, sufficiently bright monochrome light reflection panel having a whiteness index as good as a news paper can be realized with a low cost. If an RGB color filter is provided on the opposite side substrate, a bright color reflective panel can be obtained with a low cost.

In the sixth embodiment, the height of the unevenness is set at about 100 nm, but the present invention is not limited to this height. It is possible to freely set the height of the convex patterns by changing the thickness of the electrode metal, the insulating layer or the semiconductor layer.

Seventh Embodiment

FIGS. 19A through 19E are cross-sectional elevation views illustrative of the fabrication processes for the bottom substrate with the light reflection plate in the reflective liquid crystal display device according to the seventh embodiment of the present invention. In the seventh embodiment, a thin-film transistor having a forward stagger structure is used as an active matrix driving element, instead of the thin-film transistor having an inverse stagger structure, which is used in the second embodiment. That is to say, an insulating layer is further provided between the light reflecting plate 10 and the convex patterns, in the light of which the reflective liquid crystal display device structurally differs from those in the sixth embodiment.

Figure 19A:
FIGS. 19A through 19E are cross-sectional elevation views illustrative of the fabrication processes for the bottom substrate with the light reflection plate in the reflective liquid crystal display device according to the seventh embodiment of the present invention.

With reference to FIG. 19A, a chromium metal film having a thickness of 50 nm is formed on a glass substrate and then a gate electrode 8, a drain electrode 9, convex patterns 20 and interconnections are formed by a first photo lithography process.

Figure 19B:
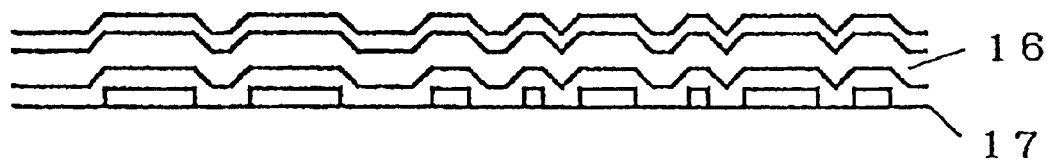

With reference to FIG. 19B, an impurity-doped semiconductor layer, the semiconductor film 17 and the gate insulating film 16 are formed by a continuous plasma chemical vapor deposition, where an amorphous silicone film having a thickness of 100 nm, whose the conductivity is changed into n-type by introducing phosphorous atoms, is used as the doping layer. An amorphous silicon film having a thickness of 100 nm is used as the semiconductor film. A silicon oxide film having a thickness of 300 nm and a silicon nitride film having a thickness of 100 nm are formed as the gate insulating film.

Figure 19C:

With reference to FIG. 19C, a chromium metal having a thickness of 50 nm is formed by a spattering, and then a gate electrode, an island 22 and a convex pattern 21 are formed by a second photo lithography process.

Figure 19D:
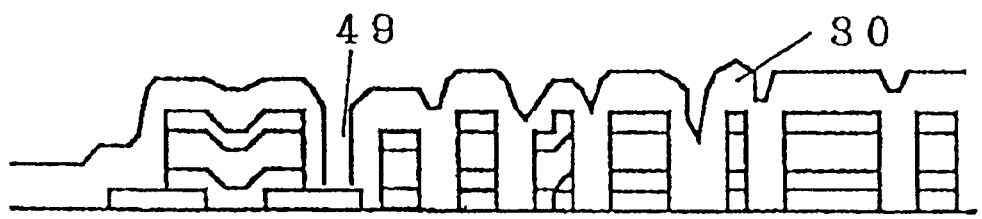

With reference to FIG. 19D, an insulating layer 30 is formed on the thin-film transistor and the convex pattern and then contact holes 49 are formed by a third photo lithography process.

Figure 19E:

With reference to FIG. 19E, an aluminum layer having a thickness of 300 nm is formed by the spattering method and then patterned by a fourth photolithography process to form a light reflecting plate 10.

The conditions of the plasma CVD for growing the silicon oxide film, silicon nitride film, amorphous silicon film and n-type amorphous silicon film is the same as those in the first embodiment. Further, the etching method and the conditions for forming the chromium layer, silicon oxide film, silicon nitride film, amorphous silicon film, the n-type amorphous silicon film to complete the island of the thin-film transistor element and the convex patterns 21 are also the same as those in the first embodiment.

In the seventh embodiment, it is possible to make the process for forming the bottom substrate simple because the convex patterns were formed at the same time when the thin-film transistor element was fabricated during the above process illustrated in FIG. 19C. Particularly, since the thin-film transistor having a forward stagger structure is used as an active matrix driving element, the number of the photolithography processes is fewer than the second embodiment where the thin-film transistor having an inverse stagger structure is used.

In the seventh embodiment, a photo sensitive polyimide film RN-901 commercially available from Nissan Chemical Corporation is used for the organic system insulating film formed on the convex patterns 21. The conditions for forming the film are the same as those in the second embodiment. In the seventh embodiment, the organic system insulating film 30 having a thickness of 1 micrometer covers the surface of the convex pattern 21 so that the oblique angle of the convex pattern 21 becomes small. As a result, a great light reflecting intensity is obtained in a wide angle of the field of view.

In the seventh embodiment, the number of photolithography is four, which is one more than that of the sixth embodiment. However, it is still possible to provide the reflective liquid crystal display with a fewer steps than the conventional method.

In the seventh embodiment, the mean angle of the convex patterns formed on the surface of the light reflecting plate is set at about 10 degrees. It should be noted that the plane shape and the position of the convex patterns may be modified.

Further, since the light reflecting plate 10 is positioned on the top layer of the bottom substrate, the area of the light reflecting plate can be made maximum. As a result, the aperture ratio of the light reflecting plate becomes about 80 to 90% and thus the light reflecting plate having a high brightness can be realized.

Similar to the sixth embodiment, the bottom substrate is bonded with the top substrate so as to have the surfaces of the substrates ace to each other. The guest-host liquid crystal is injected into the space between the top and bottom substrates to form a liquid crystal layer between them to thereby complete the liquid crystal display.

In the seventh embodiment, a positive organic system insulating film is used as an insulating film provided over the thin-film transistor element portion and the convex patterns and under the pixel electrode comprising the light reflecting plate. Even if the organic system insulating film having no photo-sensitivity were used as the insulating film, the same effect can be obtained, but the number of processes to complete the display device is different. In FIGS. 20A through 20L the processes to complete the display, where an organic system insulating film having no photo-sensitivity is used, is compared to the process to complete the display where an organic system insulating having a photo-sensitivity is used.

Figure 20A:
FIGS. 20A through 20C are cross-sectional elevation views illustrative of the fabrication processes for the bottom substrate with the light reflection plate in the reflective liquid crystal display, wherein a photo sensitive insulating film is used, according to the seventh embodiment of the present invention.
Figure 20B:
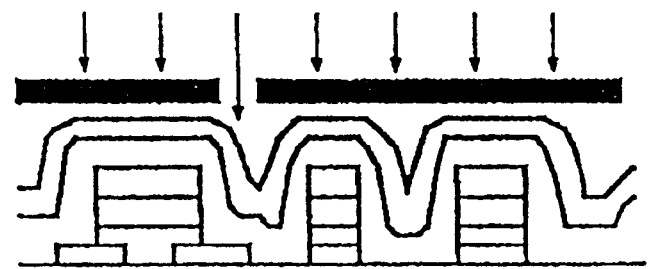
Figure 20C:
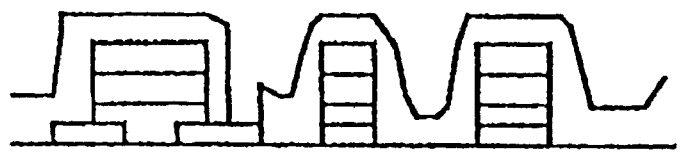

FIGS. 20A through 20C are cross-sectional elevation views illustrative of the fabrication processes for the bottom substrate with the light reflection plate in the reflective liquid crystal display, wherein a photo-sensitive insulating film is used, according to the seventh embodiment of the present invention.

FIGS. 20D through 20I are cross-sectional elevation views illustrative of the fabrication processes for the bottom substrate with the light reflection plate in the reflective liquid crystal display, wherein a normal insulating film is used, according to the seventh embodiment of the present invention.

In case the photo sensitive insulating film is used, only three processes are needed. With reference to FIG. 20A, an insulating layer is formed. With reference to FIG. 20B, the substrate is exposed to exposure. With reference to FIG. 20C, the substrate is then subjected to etching.

Figure 20D:
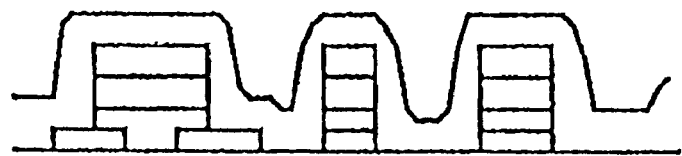
Figure 20E:
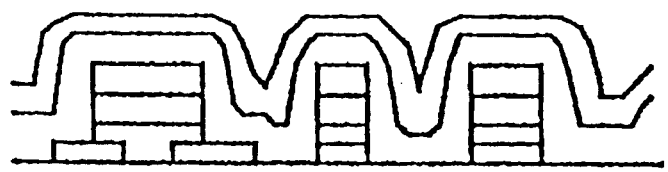
Figure 20F:
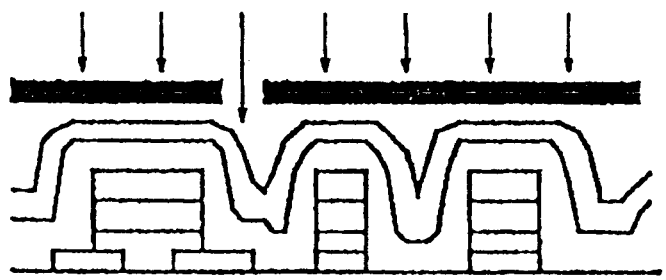
Figure 20G:
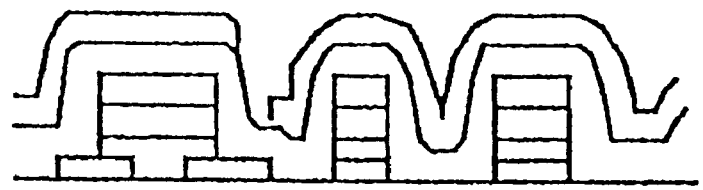
Figure 20H:
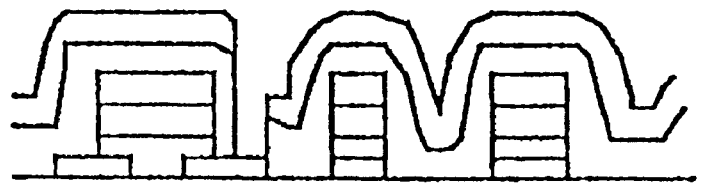
Figure 201:
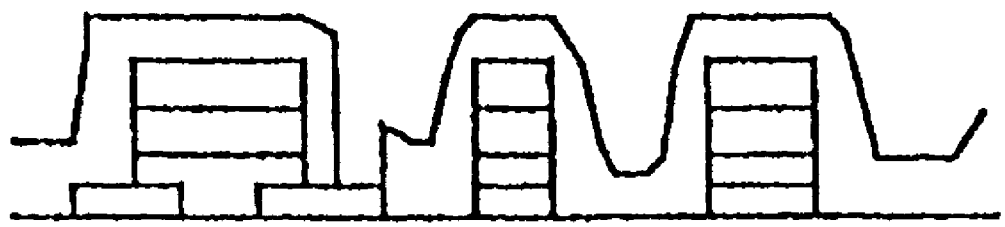

By contrast, when the non-photo-sensitive insulating film is used, the following six processes are needed. With reference to FIG. 20D, an insulating film is formed. With reference to FIG. 20E, a photo resist material is applied on the substrate. With reference to FIG. 20F, the substrate is then subjected to exposure. With reference to FIG. 20G, a development is made. With reference to FIG. 20H, an etching is made. With reference to FIG. 20I, removing the photo resist material is made. Therefore, in order to make the fabrication processes more simple, it is effective to use the photo-sensitive insulating film.

As the other photo-sensitive films, photoneece UR3800 commercially available Toyo Rayon Co., lid. can be considered as a negative type photo-resistive organic system insulating film or HM-5001 commercially available from Nissan Chemical Corporation as a photo-resistive inorganic film, and the same effect as the present embodiment can be obtained.

Eighth Embodiment

FIGS. 21A through 21E are cross-sectional elevation views illustrative of the fabrication processes for the bottom substrate with the light reflection plate in the reflective liquid crystal display according to the eighth embodiment of the present invention. The display device according to the eighth embodiment has almost the same structure as that of the third embodiment, except that the thin-film transistor having a forward stagger structure is used as an active matrix driving element instead of the thin-film transistor having an inverse stagger structure.

Figure 21A:
FIGS. 21A through 21E are cross-sectional elevation views illustrative of the fabrication processes for the bottom substrate with the light reflection plate in the reflective liquid crystal display according to the eighth embodiment of the present invention.

With reference to FIG. 21A, a chromium (Cr) metal layer having a thickness of 50 nm is formed on a glass substrate and then a source electrode 8, a drain electrode 9 and interconnections are formed by a first photolithography process.

Figure 21B:
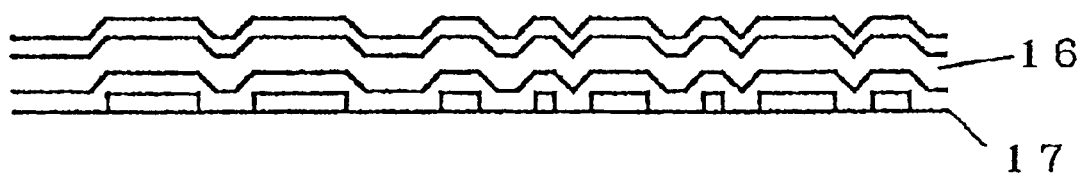

With reference to FIG. 21B, an impurity doped semiconductor layer, a semiconductor film 17 and a gate electrode film 16 are formed by a continuous plasma CVD process, where an amorphous silicone film having a thickness of 100 nm whose conductivity is changed into n-type by introducing phosphorus atoms is used as the impurity doped semiconductor layer, an amorphous silicone film having a thickness of 100 nm is used as the semiconductor film 17 and a silicone oxide film having a thickness of 300 nm and a silicone nitride film having a thickness of 100 nm are used as the gate insulating film 16.

Figure 21C:

With reference to FIG. 21C, a chromium metal having a thickness of 50 nm is formed on those films by a spattering method and then the gate electrode 15, the island 6 of the thin-film transistor 15, and the convex patterns 21 are formed by the second photolithography process.

The glass substrate is etched in the same manner as the third embodiment.

Figure 21D:
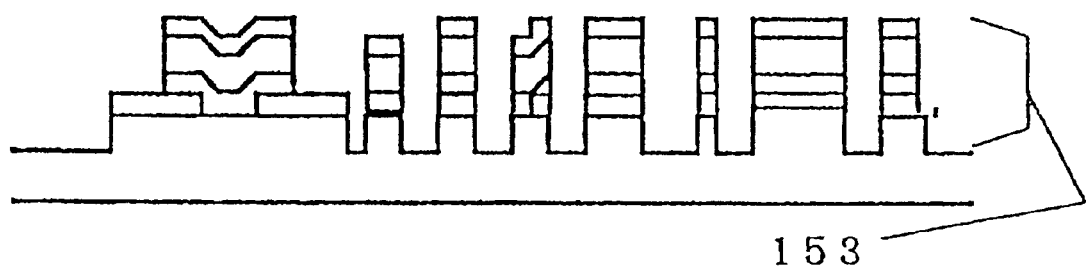

With reference to FIG. 21D, after the island of the thin-film transistor element 15 was formed, the laminations of the chromium metal film, the silicon oxide film/, the silicon divide film, the amorphous silicon film, the n-type amorphous silicon film, the chromium, and the glass substrate 5 are continuously etched. Subsequently, the etching by 1 micrometer to the glass substrate is conducted by using a solution of 50% hydrogen fluoride acid. As a result, convex patterns 153 having a maximum height of 1.7 micrometers are formed.

Figure 21E:
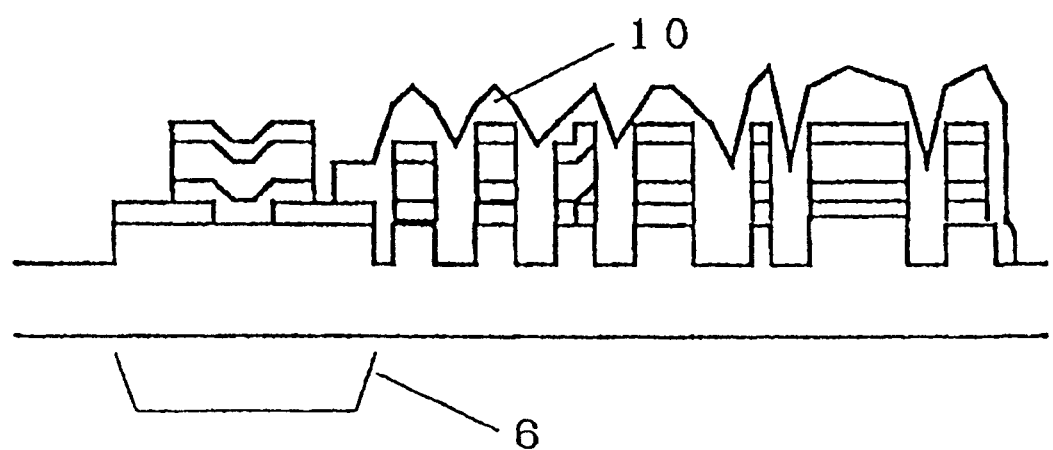

With reference to FIG. 21E, the aluminum layer having a thickness of 300 nm is formed by a spattering method and then patterned by the third photo lithography process to complete the light reflecting plate 10. Thereafter, the reflective liquid crystal display device is fabricated in the same manner as described in the sixth embodiment.

In the eighth embodiment, since the glass substrate 5 is etched, it is possible to make the height of the convex patterns 153 large independent from the thickness of the thin-film transistor element. Therefore, not only the optimum thickness can be set to obtain high performances of the thin-film transistor but also the height of the convex patterns 153 required to realize the preferred light reflecting performance can be obtained.

According to the reflective liquid crystal display device of the second embodiment, sufficiently bright monochrome light reflection panel having a whiteness index as good as a news paper can be realized with a low cost. If an RGB color filter is provided on the opposite side substrate, a bright color reflective panel can be obtained with a low cost.

In the eighth embodiment, the first pattern structure is obtained by etching the glass substrate 5. However, it may be possible to obtain the pattern by forming an inorganic system film, such as silicon oxide film, or silicon nitride film, or an organic system film, such as polyimide film, on the glass substrate 5 and etching it. In such a case, the same effect can be obtained.

Ninth Embodiment

FIGS. 22A through 22F are cross-sectional elevation views illustrative of the fabrication processes for the bottom substrate with the light reflection plate in the reflective liquid crystal display according to the ninth embodiment of the present invention.

The display according to the ninth embodiment has almost the same structure as that of the filth embodiment, but a thin-film transistor having a forward stagger structure is used as an active matrix driving element instead of the thin film transistor having an inverse stagger structure.

The thin-film transistor having a forward stagger is fabricated in the same manner as the sixth embodiment, and the insulating film under the light reflecting plate and over the convex patterns is formed in the same manner as the fifth embodiment.

Figure 22A:
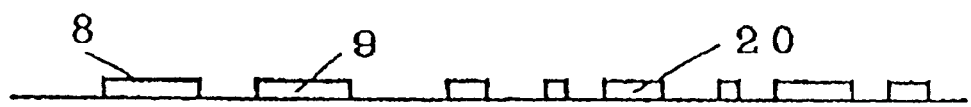

With reference to FIG. 22A, a chromium (Cr) metal layer having a thickness of 50 nm is formed on a glass substrate and then a source electrode 8, a drain electrode 9 and interconnections are formed by a first photolithography process.

Figure 22B:
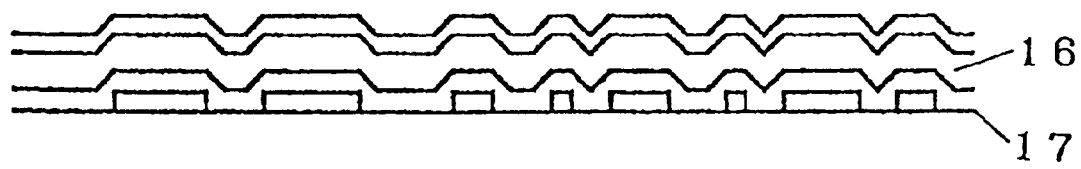

With reference to FIG. 22B, an impurity doped semiconductor layer, a semiconductor film 17 and a gate electrode film 16 are formed by a continuous plasma CVD process, where an amorphous silicone film having a thickness of 100 nm whose conductivity is changed into n-type by introducing phosphorus atoms is used as the impurity doped semiconductor layer, an amorphous silicone film having a thickness of 100 nm is used as the semiconductor film 17 and a silicone oxide film having a thickness of 300 nm and a silicone nitride film having a thickness of 100 nm are used as the gate insulating film 16.

With reference to FIG. 22C, a chromium metal having a thickness of 50 nm is formed on those films by a spattering method and then the gate electrode 15, the island 6 of the thin-film transistor 15, and the convex patterns 21 are formed by the second photolithography process.

The glass substrate is etched in the same manner as the third embodiment.

With reference to FIG. 22D, after the island of the thin-film transistor element 15 was formed, the laminations of the chromium metal film, the silicon oxide film/, the silicon nitride film, the amorphous silicon film, the n-type amorphous silicon film, the chromium, and the glass substrate 5 are continuously etched. Subsequently, the etching by 1 micrometer to the glass substrate is conducted by using a solution of 50% hydrogen fluoride acid. As a result, convex patterns 153 having a maximum height of 1.7 micrometers are formed.

Figure 22E:
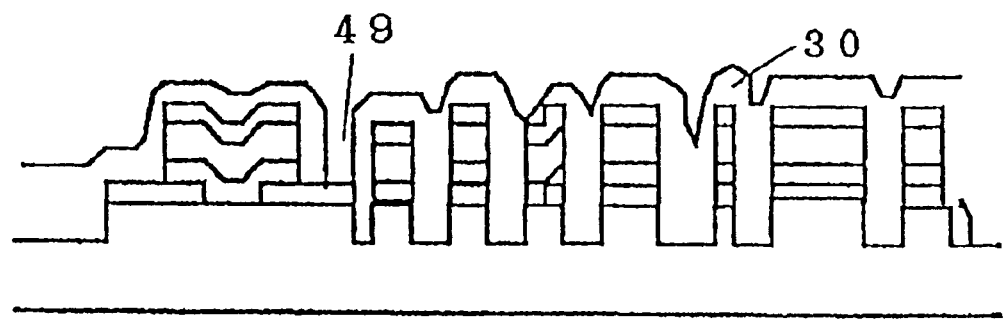

With reference to FIG. 22E, an organic system insulating film 30 is provided over convex patterns 153 and the thin-film transistor element portion 6 and under the light reflecting plate 10. A photo sensitive polyimide film of RN-901 commercially available from Nissan Chemical Corporation is used for the insulating film. The conditions for forming the film are the same as those in the second embodiment.

Figure 22F:
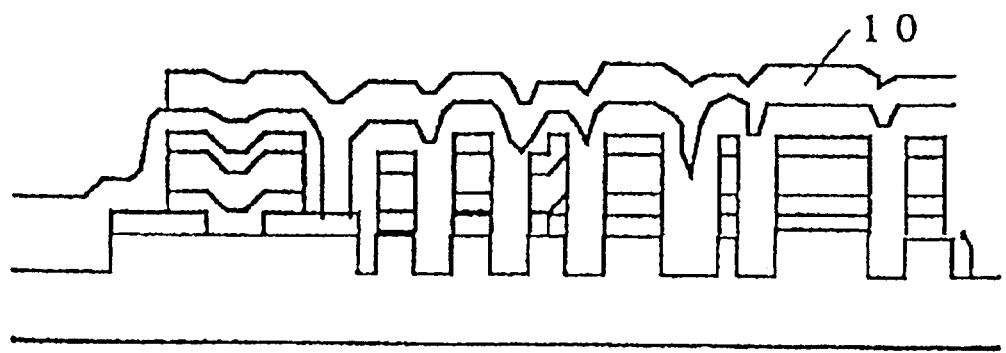

With reference to FIG. 22F, the aluminum layer having a thickness of 300 nm is formed by a spattering method on the organic system insulating film 30 and then patterned by the third photolithography process to complete the light reflecting plate 10. Thereafter, the reflective liquid crystal display device is fabricated in the same manner as described in the sixth embodiment.

As a result, the maximum height of the convex patterns 153 is defined by the total thickness of the convex patterns 153 formed on the glass substrate 5, the chromium layer formed over the convex patterns 153, the gate insulating film, the semiconductor film, the impurity doped semiconductor layer and the chromium film. According to the fifth embodiment, the height of the patterns 153 of the light reflecting plate 10 can be made high independent from the thickness of the thin-film transistor element. Further, since the patterns 153 are covered with the organic system insulating film 30 having a thickness of 1 micrometer, a small oblique angle of the patterns 153 can be obtained.

As a result, the light reflecting plate of the fifth embodiment has a performance that light reflecting intensity becomes greater in a wide angle of the field of view. When the light reflecting plate of the fifth embodiment is applied to the reflective liquid crystal display, sufficiently bright monochrome light reflection panel having a whiteness index as good as a news paper can be realized with a low cost. If an RGB color filter is provided on the opposite side substrate, a bright color reflective panel can be obtained with a low cost.

In the ninth embodiment, conditions for the plasma chemical vapor deposition used in forming the silicon oxide film, the silicon nitride film, the amorphous silicon film and the n-type amorphous silicon film are the same as those in the first embodiment. Further, the etching method and the conditions for forming the chromium layer, silicon oxide film, the silicon nitride film, the amorphous silicon film and the n-type amorphous silicon film to form the island 6 of the thin film transistor and the convex patterns 21 are also the same as those in the first embodiment.

In the ninth embodiment, the first convex patterns are obtained by etching the glass substrate. However, it may be possible to obtain the convex patterns by forming an inorganic system insulating film, such as silicon oxide film, or silicon nitride film, or an organic system insulating film, such as polyimide film on the glass substrate 5 for subsequent etching it. In this case, the same effect can be obtained.

Tenth Embodiment

In the tenth embodiment, the reflective liquid crystal display, which is fabricated according to the processes described in the second to fifth embodiments and seventh to ninth embodiments, is modified in such a manner that the contact holes are arranged in different positions in each pixel. According to this arrangement, the concave portion of the contact holes forms a part of the rough surface formed on the light reflecting plate, so that a bright display performance of the reflective liquid crystal display can be obtained.

In the tenth embodiment, a photo sensitive polyimide film (RN-902 commercially available from Nissan Chemical Corporation) is provided on the upper portion of the convex patterns so as to cover the active matrix driving element and the wire arrangement thereof, the light reflecting plate covers on the active matrix driving element, the light reflecting plate also serves as a pixel electrode, and the pixel electrode is connected to the active matrix driving element via the contact holes.

A mask pattern for use in forming the contact holes is arranged to put the contact holes in various positions for every pixels. The contact holes are formed by exposure of the photo-sensitive polyimide film and developing it with the aid of the mask pattern, whereby the positions of the contact holes, which are provided in the lower portion of the light reflecting plate, for electrically connecting the light reflecting plate to the active matrix driving element are arranged for every pixels. In the tenth embodiment, the shape of the contact hole is square having a side length of 10 micrometers, but the present invention is not limited to the embodiment.

In FIGS. 9A and 9B, the plan views show the arrangements of the contact holes where the contact holes are arranged in a periodic manner and the other arrangement of the contact holes where the contact holes are arranged in an irregular manner are compared. FIG. 9A is a plan view illustrative of arrays of the contact holes in the conventional liquid crystal display. FIG. 9B is a plan view illustrative of arrays of the contact holes in the liquid crystal display according to the present invention. In FIG. 9A, the contact holes 49 are arranged in a periodic manner in the displayed pixel element size, so that the flat portions of the contact holes 49 are observed on the panel. By contrast, the positions of the contact holes 49 are varied in the inside of each pixel element. Therefore, the concave portions of the contact holes form a part of the rough surface structure formed on the surface of the light reflecting plate. And since the contact holes are not observed on the panel, a preferred light reflection performance can be obtained.

Eleventh Embodiment

Figure 23:
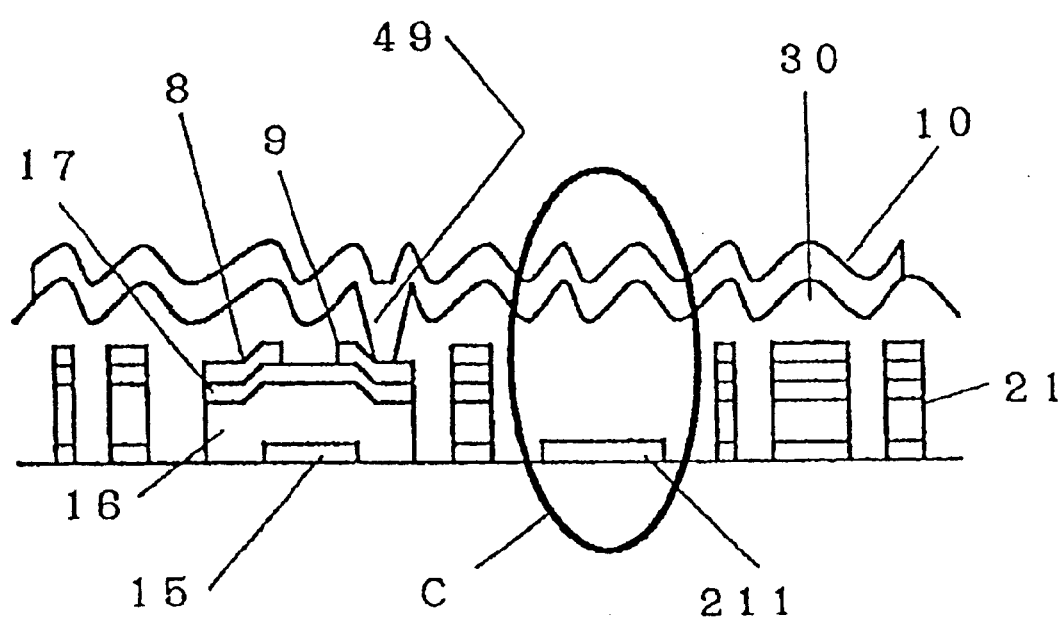
FIG. 23 is a cross-sectional elevation view illustrative of a structure of the bottom substrate with the light reflection plate in the reflective liquid crystal display according to the ninth embodiment of the present invention.

The display according to the eleventh embodiment has almost the same structure of the display device shown in the second embodiment, where the thin-film transistor having an inverse stagger structure is used as an active, matrix driving element. In the eleventh embodiment, a parallel capacity to the liquid crystal is provided for holding the applied voltage for writing data, which are supplied from the data line, until the next data are written. FIG. 23 is a cross-sectional view showing a light reflecting type liquid crystal display according to the eleventh embodiment where a storage capacity line and a gate storage line are illustrated.

The display device according to the eleventh embodiment has almost the same structure of the second embodiment, except that the chromium pattern 211 for the storage capacity line or the gate storage line are formed at the same time when the chromium pattern for the gate electrode 15 and the convex patterns 21 are formed in the same fabrication process as described in the second embodiment. According to the eleventh embodiment, since the chromium pattern 211 is provided, the storage capacity C can be obtained between the light reflecting plate 10 and the storage capacitor line or the gate storage line 211 via the insulating layer 30.

The above-mentioned parallel capacitor can be formed easily by modifying the mask pattern which is used in the second embodiment. That is to say, the pattern for the storage capacity line or the gate storage line can be made at the same time when the active matrix driving element and the convex patterns are fabricated.

In order to prevent that the optimum structure of the rough surface formed on the surface of the light reflecting plate is put into disorder by the shape of the parallel capacity, the plan shape of the storage capacity line or the gate storage line should be arranged in random. The irregularity can be obtained by using the mask pattern having a random arrangement. However, the irregularity is determined so that the capacitor volume in each pixel element becomes identical with each other.

In the eleventh embodiment, the parallel capacity can be formed at the same time when the active matrix driving element and the convex patterns are fabricated since the shape of the capacity is arranged to be irregular, it is possible to keep the capacity without deterioration of the performance of the light reflecting plate and without increasing the number of the fabrication processes. Therefore, a bright reflective liquid crystal display having an excellent display performance, where the observation is easy, can be obtained.

Twelfth Embodiment

Figure 24:
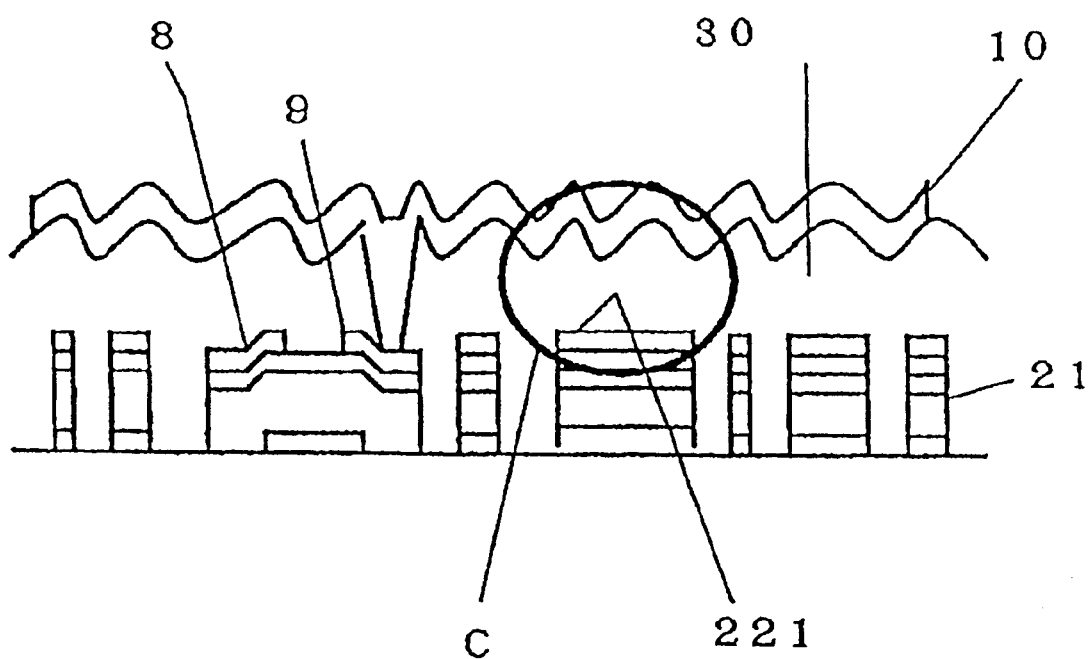
FIG. 24 is a cross-sectional elevation view illustrative of a structure of the bottom substrate with the light reflection plate in the reflective liquid crystal display according to the twelfth embodiment of the present invention.

The display according to the twelfth embodiment has almost the same structure of the display device shown in the second embodiment, where the thin-film transistor having an inverse stagger structure is used as an active matrix driving element. In the twelfth embodiment, the parallel capacity to the liquid crystal is provided for holding the applied voltage for writing data, which is supplied from the data line, until the next data is written. FIG. 24 is a cross-sectional view showing a reflective liquid crystal display according to the twelfth embodiment where the storage capacity line 221 is illustrated.

The display according to the twelfth embodiment has almost the same structure of the second embodiment, except that the chromium pattern 221 for the storage capacity line is formed at the same time when the chromium pattern 21 for forming the source electrode 8, the drain electrode 9 and the chromium pattern is formed. According to the twelfth embodiment, since the chromium pattern 221 is provided, the storage capacity C can be obtained between the light reflecting plate 10 and the storage capacitor line 221 via the insulating layer 30.

The above mentioned parallel capacitor can easily be formed by modifying the mask pattern which is used in the fabrication process described in the second embodiment.

That is to say, the pattern for the storage capacity can be made at the same time when the active matrix driving element and the convex patterns are fabricated.

In order to prevent that the optimum structure of the rough surface formed on the surface of the light reflecting plate is put into disorder by the shape of the parallel capacity, the plan shape of the storage capacity line is arranged in an irregular manner. The irregularity can be obtained by using a mask pattern having an irregular arrangement. However, the irregularity should be determined so that the capacitor volume in each pixel element becomes identical with each other.

In the eleventh embodiment, the parallel capacity can be formed at the same time when the active matrix driving element and the convex patterns are fabricated. Since the shape of the capacity is arranged to be irregular, it is possible to obtain the capacity without deteriorating the performance of the light reflecting plate and without increasing the number of the fabrication processes. Therefore, a bright reflective liquid crystal display having an excellent display performance, where the observation is easy, can be obtained.

Thirteenth Embodiment

Figure 25:
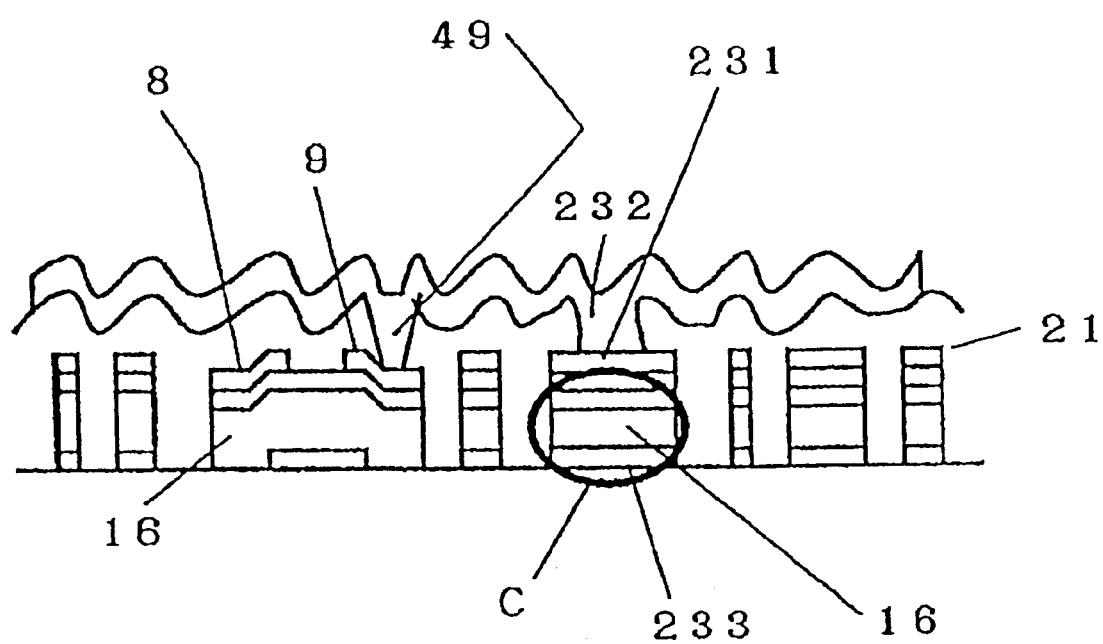
FIG. 25 is a cross-sectional elevation view illustrative of a structure of the bottom substrate with the light reflection plate in the reflective liquid crystal display according to the thirteenth embodiment of the present invention.

The display device according to the thirteenth embodiment has almost the same structure of the display shown in the second embodiment, where the thin-film transistor having an inverse stagger structure is used as an active matrix driving clement. In the thirteenth embodiment, the parallel capacity to the liquid crystal for holding the applied voltage for writing data, which are supplied from the data line, until the next data are written. FIG. 25 is a cross-sectional view showing the structure of a reflective liquid crystal display device according to the present embodiment where the storage capacity line is illustrated.

The display device according to the Thirteenth embodiment has almost the same structure of the second embodiment, except that the chromium pattern 231 for the storage capacity line is formed at the same time when the chromium pattern 21 for forming the source electrode 8, the drain electrode 9 and the chromium pattern is formed.

A chromium metal layer having a thickness of 50 nm is formed on a glass substrate 5 and then patterned by a first photolithography process to form both a gate electrode 15 and a convex and concave pattern 20 on the glass substrate 5.

A gate insulating film 16 is formed by a plasma chemical vapor deposition method so that the gate insulating film 16 covers the entire surface of the glass substrate 5 including the gate electrode 15 and the convex and concave pattern 20. The gate insulating film 16 comprises laminations of a silicone oxide film having a thickness of 300 nm and a silicon nitride film having a thickness of 100 nm. A semiconductor film 17 made of an amorphous silicon and having a thickness of 100 nm is formed by the plasma chemical vapor deposition method on the gate insulating film 16. An impurity doped semiconductor layer made of an amorphous silicon doped with an n-type impurity of phosphorous is further formed by the plasma chemical vapor deposition method on the semiconductor film 17. The impurity doped semiconductor layer has a thickness of 100 nm. Further, a chromium metal layer having a thickness of 50 nm is deposited by a spattering method on the impurity doped semiconductor layer. The gate electrode 15 and the convex and concave pattern 20 results in formation of a rough surface including convex and concave portions of the gate insulating film 16. This rough surface including convex and concave portions of the gate insulating film 16 results in formation of a rough surface including convex and concave portions of the semiconductor film 17. This rough surface including convex and concave portions of the semiconductor film 17 results in formation of a rough surface including convex and concave portions of the impurity doped semiconductor layer. Further, this rough surface including convex and concave portions of the impurity doped semiconductor layer results in formation of a rough surface including convex and concave portions of the chromium metal layer.

An island 22 and convex patterns 21 are formed by a second lithography process so that the convex patterns 21 are provided only on the chromium patterns 20.

A chromium metal pattern 21 for the convex patterns the source electrode 8 and the drain electrode 9 is formed at the same time when another chromium metal pattern 231 for storage capacitor lines is formed. The chromium metal layer on the island 22 is selectively removed by a third lithography process to form source and drain electrodes 8 and 9 on the island 22.

An insulating film 30 is formed on the island 22 and the patterns 21. Contact holes 49 are formed by the fourth photolithography process. During formation of the contact holes 49, the contact portion 232 between the chromium pattern 231 for the storing capacity line, which is provided in the same layer of the source and drain electrodes, and the light reflecting plate 10 are formed and the pattern 231 is electrically conducted to the plate 10. According to the thirteenth embodiment, since the chromium pattern 231 is provided, a storing capacity C can be obtained between the light reflecting plate 10 and the chromium pattern 233 of the storage capacitor line via the gate insulating layer 16.

An aluminum layer having a thickness of 300 nm is formed on the insulating film 30 by a spattering method and patterned by the fifth photolithography process to complete the light reflecting plate 10.

In order to prevent that the optimum structure of the rough surface formed on the surface of the light reflecting plate is put into disorder by the shape of the parallel capacity, the plan of the storage capacity line is arranged in an irregular manner. The irregularity can be obtained by using the mask pattern having an irregular arrangement. However, the irregularity should be determined so that the capacitor volume in each pixel element becomes the same to each other.

In the eleventh embodiment, the parallel capacity can be formed at the same time when the active matrix driving element and the rough surface are formed. Since the shape of the capacity is arranged to be irregular, it is possible to obtain the capacity without deterioration in the performance of the light reflecting plate and without increasing the number of the fabrication processes. Therefore, a bright reflective liquid crystal display having an excellent display performance, where the observation is easy, can be obtained.

Fourteenth Embodiment

Figure 26:
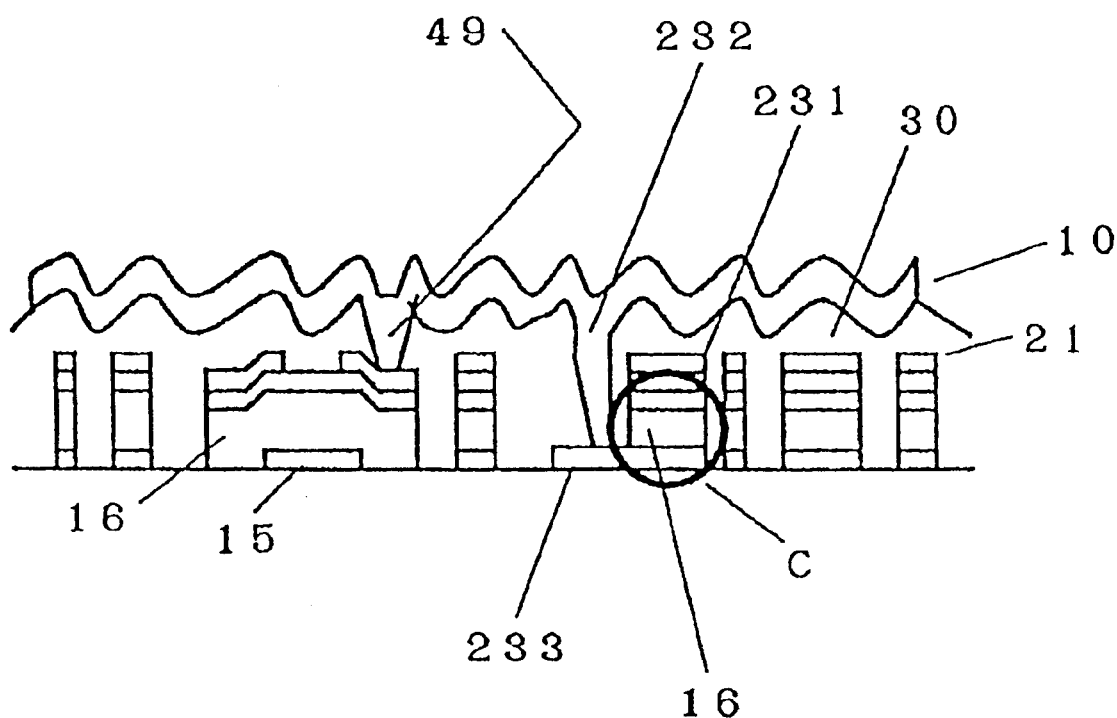
FIG. 26 is a cross-sectional elevation view illustrative of a structure of the bottom substrate with the light reflection plate in the reflective liquid crystal display according to the fourteenth embodiment of the present invention.

FIG. 26 is illustrative of a reflective liquid crystal display according to the fourteenth embodiment. This reflective liquid crystal display of this embodiment has almost the same structure as that of the thirteenth embodiment, but the chromium pattern 233 for the storage capacity line, which is provided in the same window of the gate electrode is connected to the light reflecting plate 10 via the contact portion 232.

Thereby, a storage capacity C can be obtained between the light reflecting plate 10 and the storage capacity line 231 via the gate insulation layer 16, which is formed at the same time when the thin-film transistor element is formed.

A chromium metal layer having a thickness of 50 nm is formed on a glass substrate 5 and then patterned by a first photo lithography process to form both a gate electrode 15 and a convex and concave pattern 20 on the glass substrate 5.

A gate insulating film 16 is formed by a plasma chemical vapor deposition method so that the gate insulating film 16 covers the entire surface of the glass substrate 5 including the gate electrode 15 and the convex and concave pattern 20. The gate insulating film 16 comprises laminations of a silicone oxide film having a thickness of 300 nm and a silicon nitride film having a thickness of 100 nm. A semiconductor film 17 made of an amorphous silicon and having a thickness of 100 nm is formed by the plasma chemical vapor deposition method on the gate insulating film 16. An impurity doped semiconductor layer made of an amorphous silicon doped with an n-type impurity of phosphorous is further formed by the plasma chemical vapor deposition method on the semiconductor film 17. The impurity doped semiconductor layer has a thickness of 100 nm. Further, a chromium metal layer having a thickness of 50 nm is deposited by a spattering method on the impurity doped semiconductor layer. The gate electrode 15 and the convex and concave pattern 20 results in formation of a rough surface including convex and concave portions of the gate insulating film 16. This rough surface including convex and concave portions of the gate insulating film 16 results in formation of a rough surface including convex and concave portions of the semiconductor film 17. This rough surface including convex and concave portions of the semiconductor film 17 results in formation of a rough surface including convex and concave portions of the impurity doped semiconductor layer. Further, this rough surface including convex and concave portions of the impurity doped semiconductor layer results in formation of a rough surface including convex and concave portions of the chromium metal layer.

An island 22 and convex patterns 21 are formed by a second lithography process so that the convex patterns 21 are provided only on the chromium patterns 20.

A chromium metal pattern 21 for the convex patterns the source electrode 8 and the drain electrode 9 is formed at the same time when another chromium metal pattern 231 for storage capacitor lines is formed. The chromium metal layer on the island 22 is selectively removed by a third lithography process to form source and drain electrodes 8 and 9 on the island 22.

An insulating film 30 is formed on the island 22 and the patterns 21. Contact holes 49 are formed by the fourth photo lithography process. During formation of the contact holes 49, the contact portion 232 between the chromium pattern 231 for the storing capacity line, which is provided in the same layer of the source and drain electrodes, and the light reflecting plate 10 are formed and the pattern 231 is electrically conducted to the plate 10. According to the thirteenth embodiment, since the chromium pattern 231 is provided, a storing capacity C can be obtained between the light reflecting plate 10 and the chromium pattern 233 of the storage capacitor line via the gate insulating layer 16.

An aim layer having a thickness of 300 nm is formed on the insulating film 30 by a spattering method and patterned by the fifth photo lithography process to complete the light reflecting plate 10.

In order to prevent that the optimum structure of the rough surface formed on the light reflecting plate is put into disorder by the shape of the parallel capacity, the plan shape the storage capacity line is arranged in an irregular manner. The irregularity can be obtained by using the mask pattern having an irregular arrangement. However, the irregularity should be determined so that the capacitor in each pixel element becomes identical with each other.

In the fourteenth embodiment, the parallel capacity can be formed at the same time when the active matrix driving element and the unevenness are manufactured; since the shape of the capacity is arranged to be irregular, it is possible to obtain the capacity without deterioration of the performance of the light reflecting plate and without increasing the number of the manufacturing process. Therefore, a bright reflective liquid crystal display having an excellent display performance, where the observation is easy, can be obtained.

Fifteenth Embodiment

Figure 27:
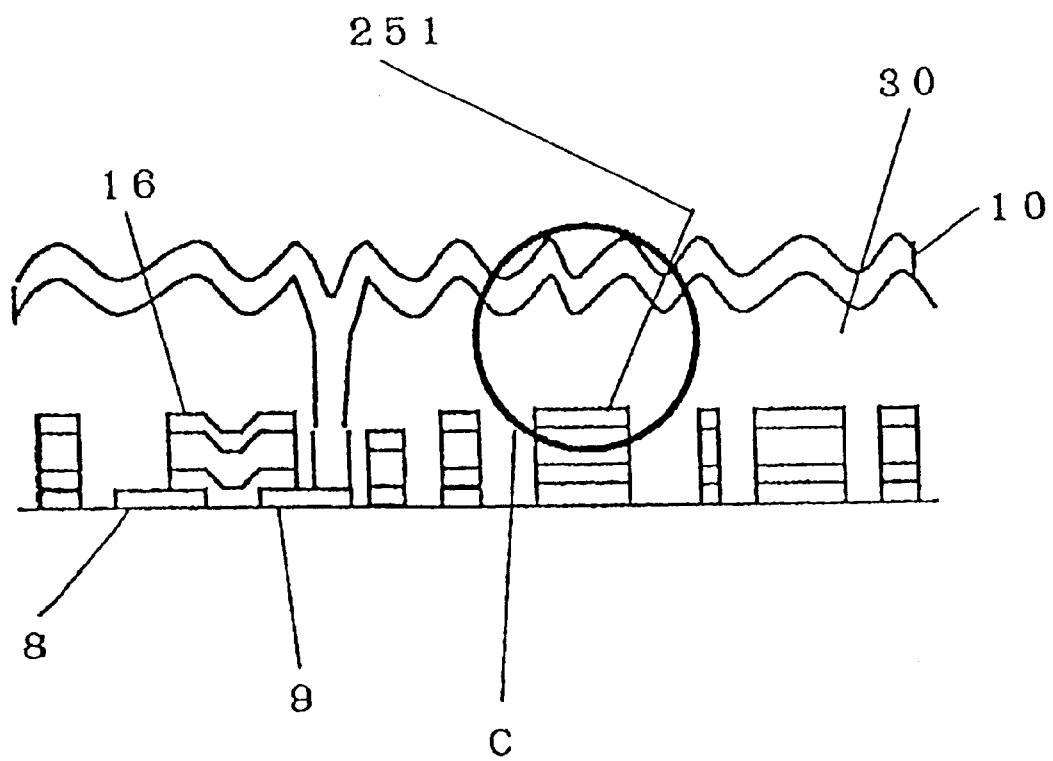
FIG. 27 is a cross-sectional elevation view illustrative of a structure of the bottom substrate with the light reflection plate in the reflective liquid crystal display according to the fifteenth embodiment of the present invention.

The display according to the fifteenth embodiment has almost the same structure of the display shown in the sixth embodiment, where the thin-film transistor having a forward stagger structure is used as an active matrix driving element. In the thirteenth embodiment, the parallel capacity to the liquid crystal is provided for holding the applied voltage for writing data, which are supplied from the data line, until the next data are written. FIG. 27 is a cross-sectional view showing a reflective liquid crystal display devices according to the present invention where the storage capacity line or the gate storage line is illustrated.

The display according to the fifteenth embodiment has almost the same structure as that in the sixth embodiment, except that the chromium pattern 251 for the data storage capacity line or the gate storage line is formed at the same time when the chrome pattern 21 for forming gate electrode 15 and the convex patterns is formed. According to the fifteenth embodiment, since the chromium pattern 251 is provided, a storage capacity C can be obtained between the light reflecting plate 10 and the chromium pattern 251 for the storage capacitor line or the data storage line via the insulating layer 30.

The above mentioned capacitor can easily be formed only by modifying the mask pattern which is used in the fabrication process in the second embodiment. That is to say, the pattern for the storage capacity or the gate storage can be made at the same time when the active matrix driving element and the convex patterns are fabricated.

In order to prevent that the optimum structure of the roughness formed on the surface of the light reflecting plate is put into disorder by the shape of the parallel capacity, the plan shape of the storage capacity line or the gate storage line is arranged in random. The irregularity can be obtained by using the mask pattern having an irregular arrangement. However, the irregularity is determined so that the capacitor area in each pixel becomes the same to each other.

In the fifteenth embodiment, the parallel capacity can be formed at the same time when the active matrix driving element and the unevenness are manufactured; since the shape of the capacity is arranged to be irregular, it is possible to obtain the capacity without deteriorating the performance of the light reflecting plate and without increasing the number of the manufacturing process. Therefore, a bright light reflecting type liquid crystal display having an excellent display performance, where the observation is easy, can be obtained.

Sixteenth, Seventeenth and Eighteenth Embodiments

The same variations about the storage capacitor line can be considered for the reflective liquid crystal display device using the thin-film transistor having a forward stagger structure as well as the display device using the thin-film transistor having an inverse stagger structure.

Figure 28:
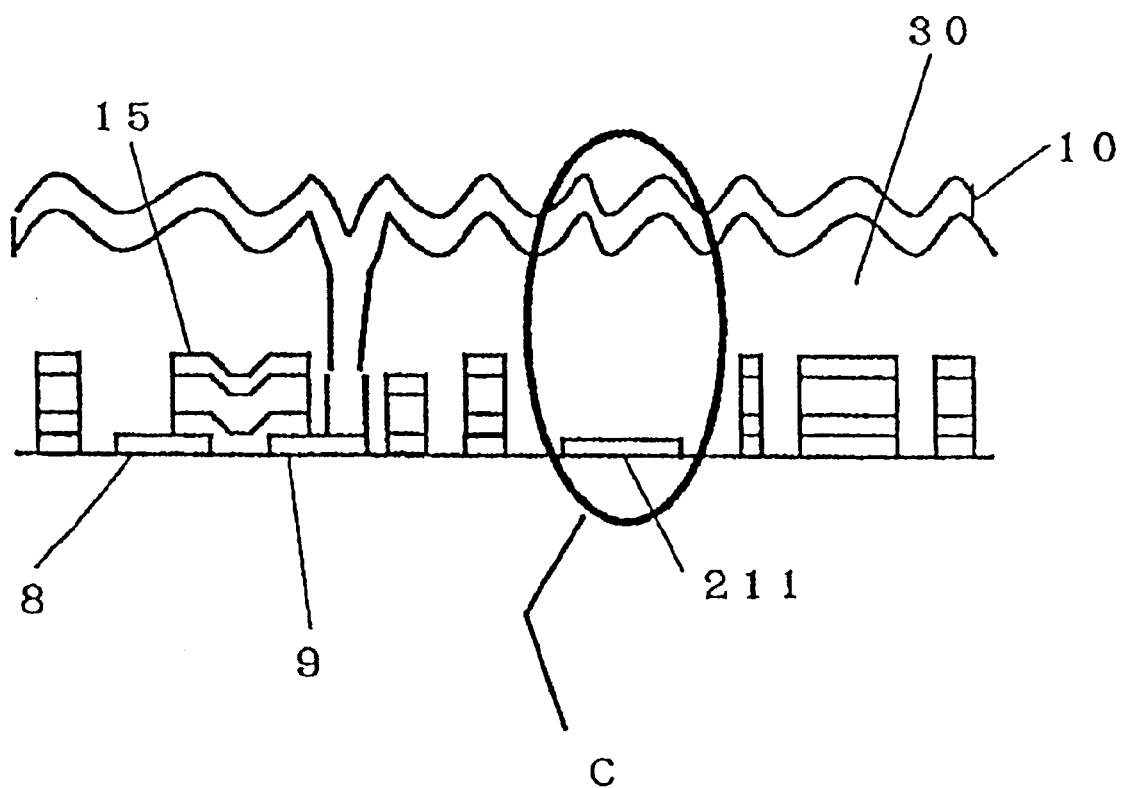
FIG. 28 is a cross-sectional elevation view illustrative of a structure of the bottom substrate with the light reflection plate in the reflective liquid crystal display according to the sixteenth embodiment of the present invention.

FIG. 28 is a cross-sectional elevation view illustrative of a structure of the bottom substrate with the light reflection plate in the reflective liquid crystal display according to the sixteenth embodiment of the present invention.

Figure 29:
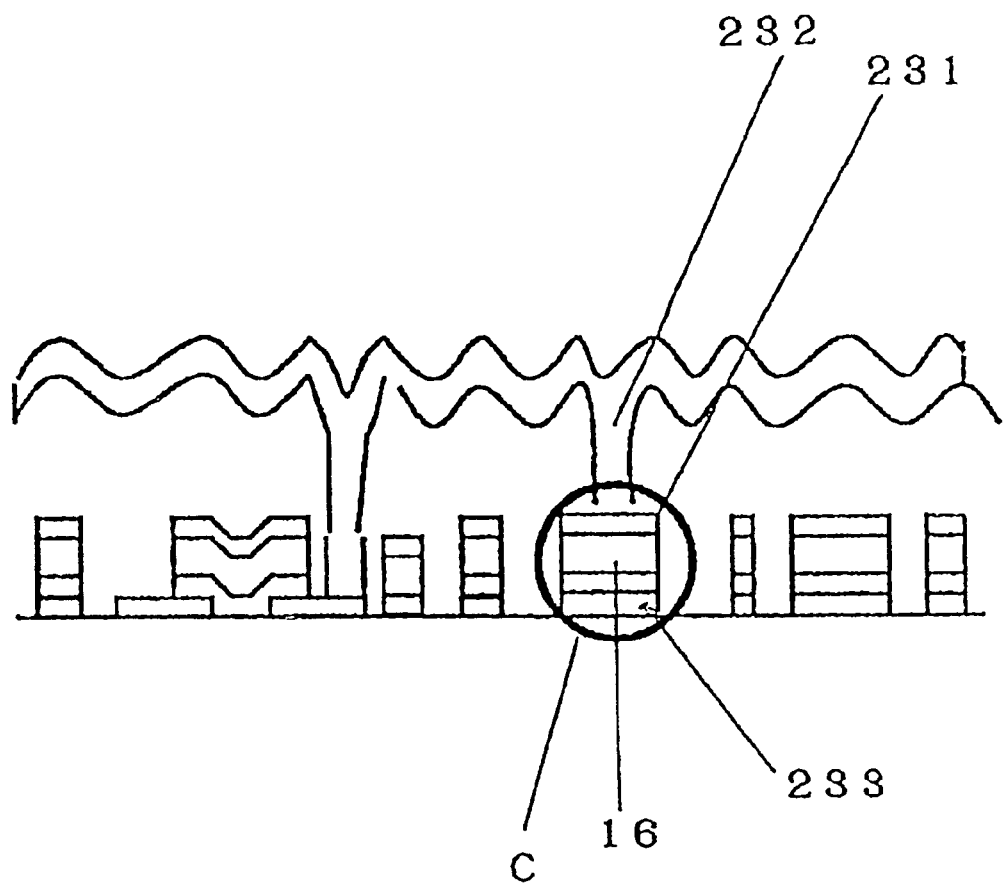
FIG. 29 is a cross-sectional elevation view illustrative of a structure of the bottom substrate with the light reflection plate in the reflective liquid crystal display according to the seventeenth embodiment of the present invention.

FIG. 29 is a cross-sectional elevation view illustrative of a structure of the bottom substrate with the light reflection plate in the reflective liquid crystal display according to the seventeenth embodiment of the present invention.

Figure 30:
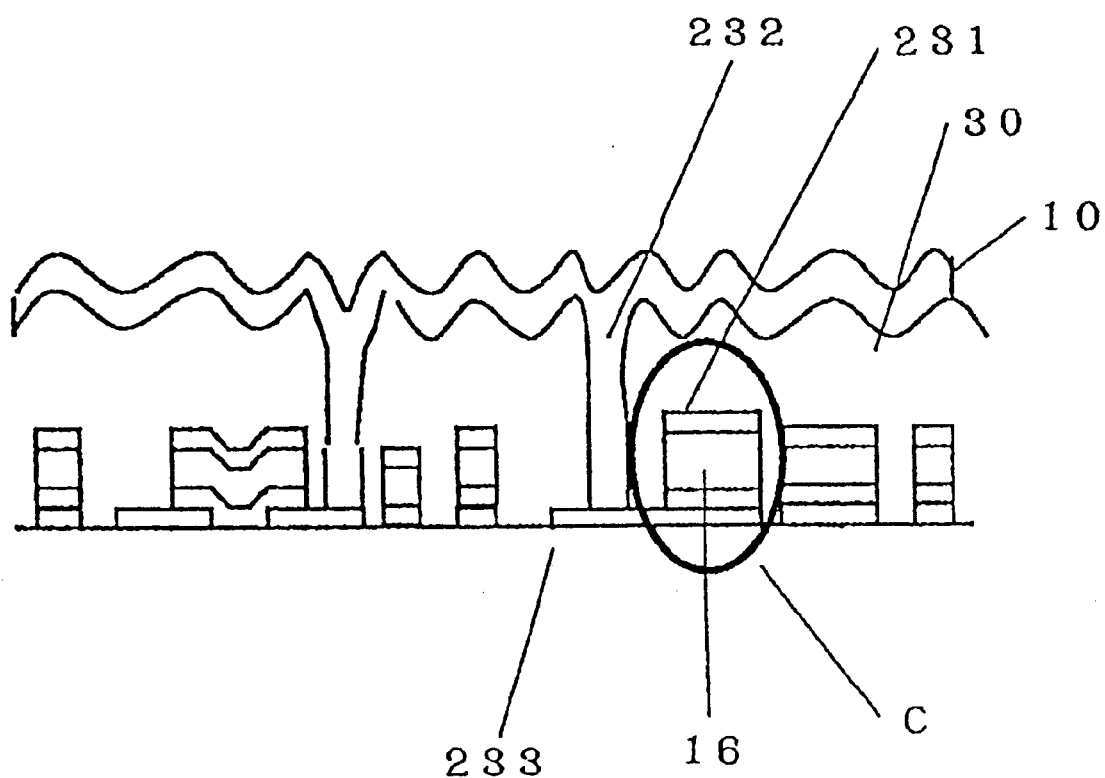
FIG. 30 is a cross-sectional elevation view illustrative of a structure of the bottom substrate with the light reflection plate in the reflective liquid crystal display according to the eighteenth embodiment of the present invention.

FIG. 30 is a cross-sectional elevation view illustrative of a structure of the bottom substrate with the light reflection plate in the reflective liquid crystal display according to the eighteenth embodiment of the present invention.

As will be apparent from FIG. 28, in the sixteenth embodiment, the storage capacitor C is provided between the chromium pattern 211, which is provided in the same layer of the source and drain electrodes of the transistor and the light reflecting plate 10.

As will be apparent from FIG. 29, in the seventeenth embodiment, the chromium pattern 231, which is formed in the same layer of the gate electrode, is connected to the light reflecting plate 10 via the contacting portion 232. The storage capacity C is provided between the chromium pattern 231 and the chromium pattern 233, which is formed in the same layer of the source and drain electrodes of the transistor.

As will be apparent from FIG. 30, in the eighteenth embodiment, the chromium pattern 233, which is formed in the same layer of the source and drain electrodes of the transistor, is connected to the light reflecting plate 10 via the contacting portion 232. The storage capacitor C is provided between the chromium pattern 233 and the chromium pattern 231 which is formed in the same layer of the gate electrode of the transistor.

In the eleventh through eighteenth embodiments, the convex patterns comprise laminations of the layers formed at the same time when the thin-film transistor element is formed and the insulating layer formed thereon. However, in case that the convex patterns are provided by etching the glass substrate, or the glass substrate and the insulting layer formed on the glass substrate, it is possible to provide the above parallel capacitor.

Nineteenth Embodiment

FIGS. 31A through 31D are cross-sectional elevation views illustrative of a structure of the bottom substrate with the light reflection plate in the reflective liquid crystal display according to the nineteenth embodiment of the present invention in the first to tenth embodiments, the thin-film transistor was used as an active matrix driving element of the liquid crystal display. However, in the nineteenth embodiment, an MIM (metal/insulating layer/metal) diode is used as an active matrix driving element.

Figure 31A:
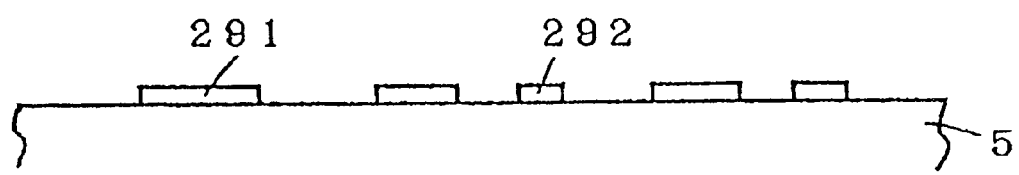
FIGS. 31A through 31D are cross-sectional elevation view illustrative of a structure of the bottom substrate with the light reflection plate in the reflective liquid crystal display according to the nineteenth embodiment of the present invention.

With reference to FIG. 31A, a glass substrate is used as a bottom substrate. On the glass substrate, the chromium layer having a thickness of 50 nm is formed by the spattering. The lead electrodes 291 and the convex patterns 292 are formed by patterning the layer using the general photo-resist method.

Figure 31B:
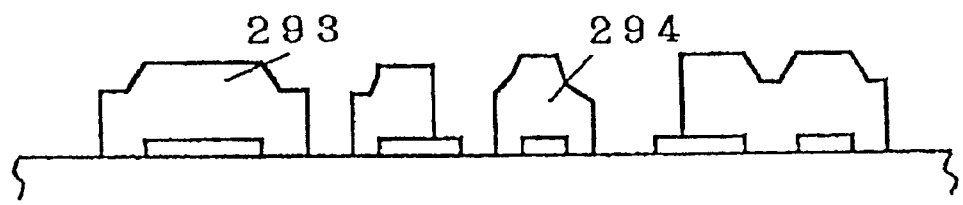

With reference to FIG. 31B, an insulating film made of SiNx having a thickness of 500 nm is formed by the plasma CVD method. The insulating portion 293 of the MIM element and the convex patterns 294 of the light reflecting plate are formed by patterning the film by the general photo-resist method.

Figure 31C:
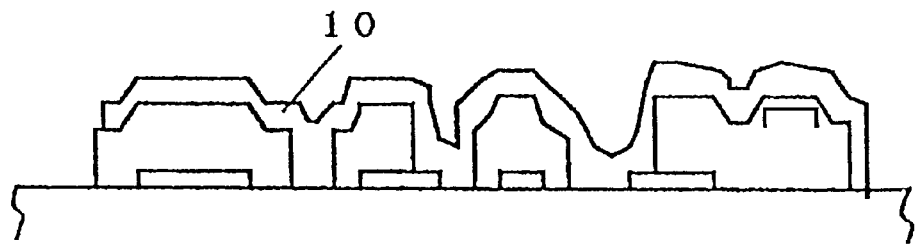

With reference to FIG. 31C, an aluminum layer having a thickness of 300 nm is formed by the spattering method to complete the light reflecting plate 10.

Figure 31D:
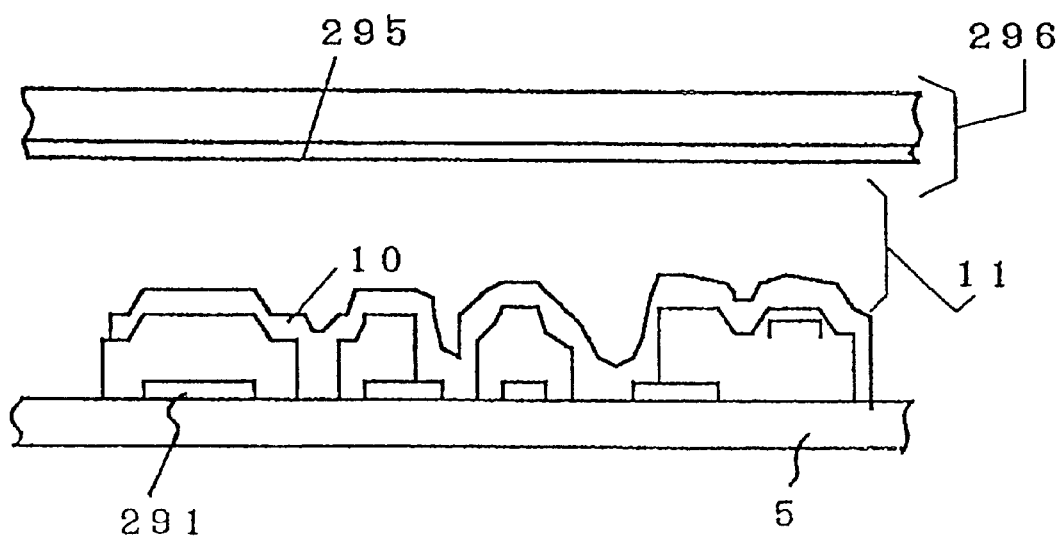

With reference to FIG. 31D, the glass plate 5, on which the MIM element is provided, and a top substrate 296, on which the transparent conductive film ITO 295 is provided, are bonded to each other so as to have the surfaces of the layers face to each other. The opposite side substrate 296 has a longitudinal shape and extended in a perpendicular direction of the lead electrode 291. On the glass substrate 5, on which the MIM element is provided, and on the opposite side substrate 296, are applied orientations. Both the top and bottom substrates are bonded to each other via spacers of plastic particles by use of an epoxy system bonding agent applied on the circumference of the panel. Thereafter, a guest-post liquid crystal is injected into a gap between the substrates to form a liquid crystal layer 11, then the liquid crystal display is completed.

According to this embodiment, a monochrome reflecting panel having practically sufficient brightness and whiteness was realized at a low cost. Further, it is preferable that an RGB color filter is arranged on the top substrate 1, a bright color reflection panel may be obtained at a low cost.

Twentieth Embodiment

FIGS. 32A to through 32D are cross-sectional elevation views illustrative of the fabrication processes for the bottom substrate with the light reflection plate in the reflective liquid crystal display according to the twentieth embodiment of the present invention. The reflective liquid crystal display of this embodiment has almost the same structure as that of the nineteenth embodiment, but the glass substrate 5 is further etched to make the height of the convex patterns higher.

Figure 32B:
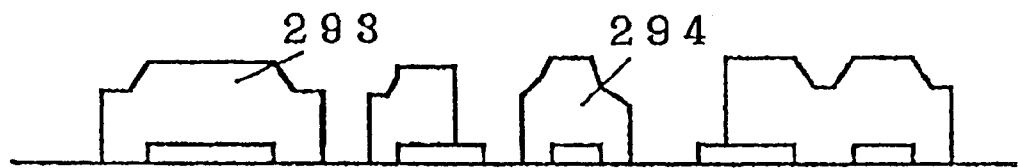

The fabrication processes of the twentieth embodiment are the same as those in the nineteenth embodiment, except for the process illustrated in FIG. 32B.

With reference to FIG. 31A, a glass substrate is used as a bottom substrate. On the glass substrate, the chromium layer having a thickness of 50 nm is formed by the spattering. The lead electrodes 291 and the convex patterns 292 are formed by patterning the layer using the general photo-resist method.

With reference to FIG. 31B, an insulating film made of SiNx having a thickness of 500 nm is formed by the plasma CVD method. The insulating portion 293 of the MIM element and the convex patterns 294 of the light reflecting plate are formed by patterning the film by the general photo-resist method. The bottom glass substrate 5 is continuously etched by 1 micrometer after the silicon nitride layer is etched by the patterning using a general photo-resist method.

With reference to FIG. 31C, an aluminum layer having a thickness of 300 nm is formed by the spattering method to complete the light reflecting plate 10.

With reference to FIG. 31D, the glass plate 5, on which the MIM element is provided, and a top substrate 296, on which the transparent conductive film ITO 295 is provided, are bonded to each other so as to have the surfaces of the layers face to each other. The opposite side substrate 296 has a longitudinal shape and extended in a perpendicular direction of the lead electrode 291. On the glass substrate 5, on which the MIM element is provided, and on the opposite side substrate 296, are applied orientations. Both the top and bottom substrates are bonded to each other via spacers of plastic particles by use of an epoxy system bonding agent applied on the circumference of the panel. Thereafter, a guest-post liquid crystal is injected into a gap between the substrates to form a liquid crystal layer 11, then the liquid crystal display is completed.

In the twentieth embodiment, since the glass substrate 5 is etched, the height of the convex patterns can be made high independent from the thickness of the films of the MIM element. Therefore, not only the thickness of the layer for the MIM but also the height of the convex patterns can be made optimum.

According to this embodiment, a monochrome reflecting panel having practically sufficient brightness and whiteness was realized at a low cost. Further, it is preferable that an RGB color filter is arranged on the top substrate 1, a bright color reflection panel may be obtained at a low cost.

Twenty First Embodiment

FIG. 33 is a cross-sectional view showing the structure of the bottom substrate, on which the MIM element is formed, of the reflective liquid crystal display according to the twenty first embodiment.

Figure 32C:
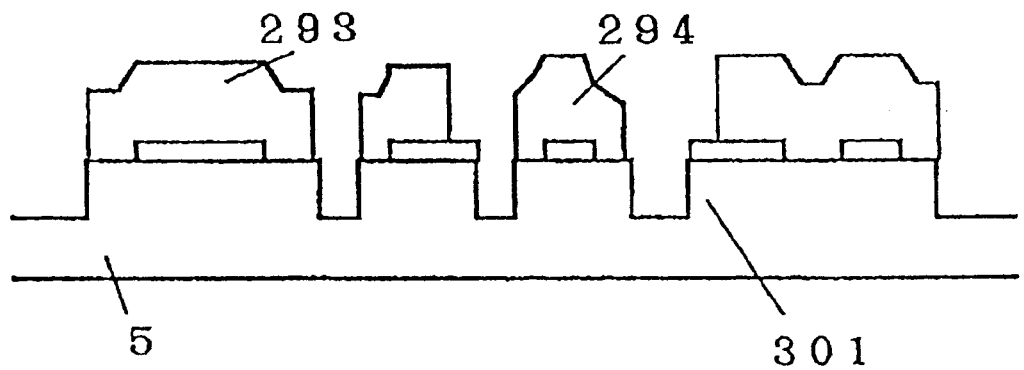
Figure 32D:
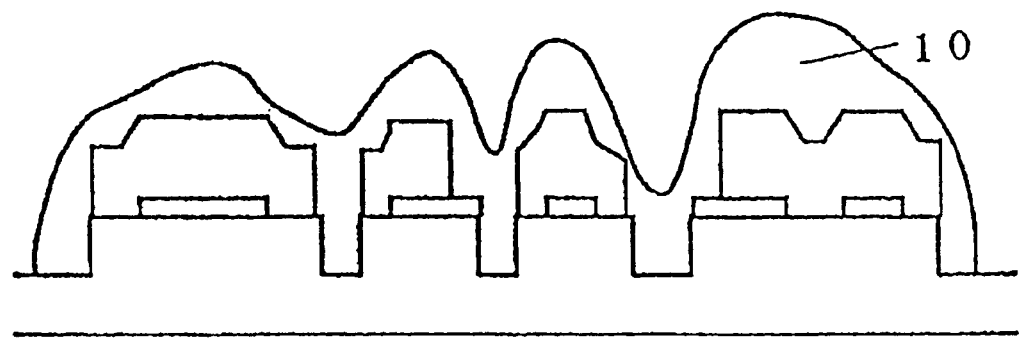

In this embodiment, after the insulating portion of the MIM element and the rough surface of the light reflecting plate are formed as shown in FIG. 32C, a photo sensitive polyimide film 311 (RN-901) is applied on the MIM and the convex patterns, and the film is preliminary baked at 90° C., and then a pattern is formed by exposure and development before the film is primary baked at 250° C. for 30 minutes. The convex patterns, the MIM element and the lead lines are covered with the polyimide film with a thickness of 0.5 to 2 micrometers. The MIM element and the light reflecting plate 10 are connected to each other via the contact hole 312.

In this embodiment, one more photolithography step is necessary than that of the twentieth embodiment in order to provide the photo-sensitive polyimide film. However, the oblique angle of the side walls of the convex patterns becomes small, so that the light reflection performance of the light reflecting plate can be set optimum. Further, the manufacturing cost for the reflective liquid crystal display using the MIM diode becomes lower than the conventional display.

Similar to the nineteenth embodiment, the glass substrate on which the MIM element is provided and the top substrate are bonded to each other to form the liquid crystal display. According to this embodiment, a monochrome reflecting panel having practically sufficient brightness and whiteness was realized at a low cost. Further, it is preferable that an RGB color filter is arranged on the top substrate 1, a bright color reflection panel may be obtained at a low cost.

Twenty Second Embodiment

FIGS. 34A through 34D are cross-sectional elevation views illustrative of the fabrication processes for the bottom substrate with the light reflection plate in the reflective liquid crystal display according to the twenty second embodiment of the present invention. In this embodiment, an MIM diode is used as an active matrix driving element and tantalum is used for the lead electrode of the MIM diode.

Figure 34A:
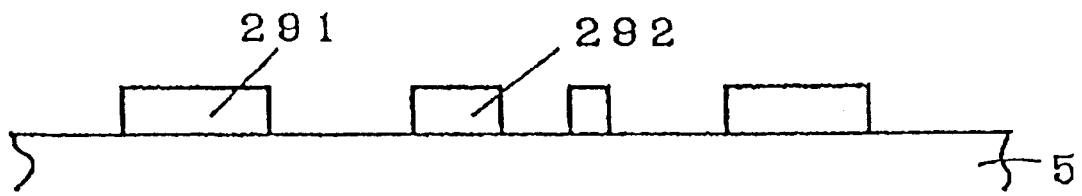

With reference to FIG. 34A, a tantalum layer for the lead electrode is formed on the glass substrate 5 by a spattering method before the lead electrode 291 are formed at the same time when the convex patterns 292 is formed.

Figure 34B:
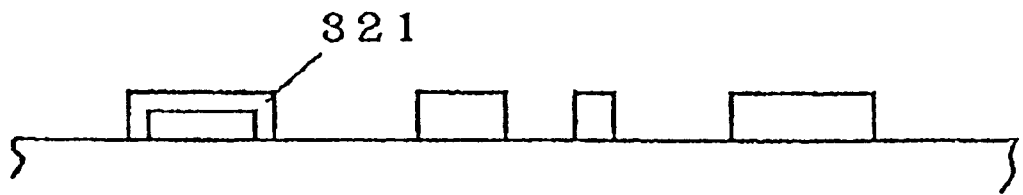

With reference to FIG. 34B, the lead line 291 is immersed in a solution including 0.1% by weight of a citric acid and a constant voltage of 2 V is applied thereto to conduct an anodic oxidation, whereby the surface of the lead electrode is covered with an anodic oxidation insulating thin film 321. The thickness of the anodic oxidation insulating thin film 321 is about 200 nm.

Figure 34C:
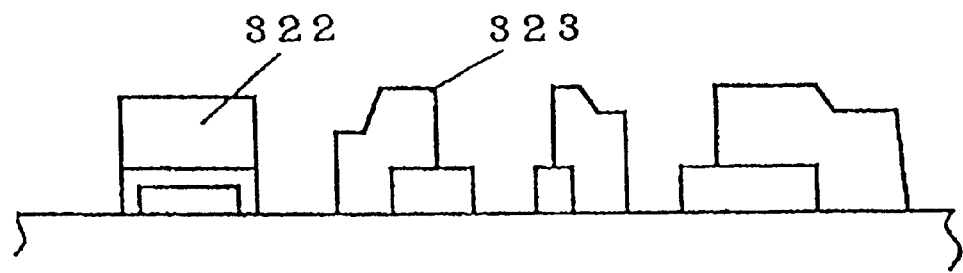

With reference to FIG. 34C, a silicon dioxide insulating layer having a thickness of 600 nm is deposited thereon. By etching the silicon oxide layer, the island 322 for the MIM diode region and the convex patterns 323 are formed simultaneously.

Figure 34D:
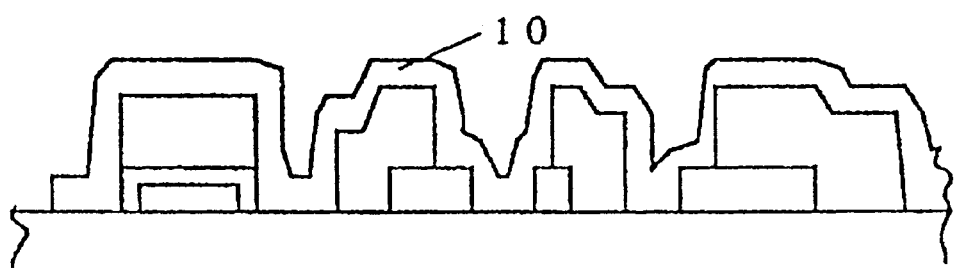

With reference to FIG. 34D, an aluminum layer having a thickness of 300 nm is formed by the spattering method to complete the light reflecting plate 10.

Similar to the nineteenth embodiment, the glass substrate, on which the MIM element is provided and the opposite side substrate are bonded to each other to complete the liquid crystal display.

According to this embodiment, a monochrome reflecting panel having practically sufficient brightness and whiteness was realized at a low cost. Further, it is preferable that an RGB color filter is arranged on the top substrate 1, a bright color reflection panel may be obtained at a low cost.

Twenty Third Embodiment

FIGS. 35A through 35D are cross-sectional elevation views illustrative of the fabrication processes for the bottom substrate with the light reflection plate in the reflective liquid crystal display according to the twenty third embodiment of the present invention.

Figure 35A:
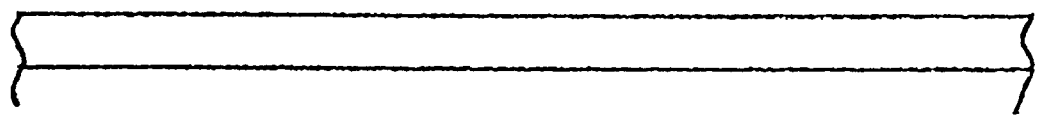

With reference to FIG. 35A, a tantalum layer for the lead electrode is formed on the glass substrate 5 by a spattering method before the lead electrode 291 are formed at the same time when the convex patterns 292 is formed.

Figure 35B:

With reference to FIG. 35B, after the lead electrode is formed as described in the twenty second embodiment, the bottom glass substrate is continuously etched by one micrometer. Thereafter, the tantalum (Ta) layer is subjected to the anodic oxidation to cover the surface portion of the lead electrode by the anodic oxidation insulating layer 321.

Figure 35C:
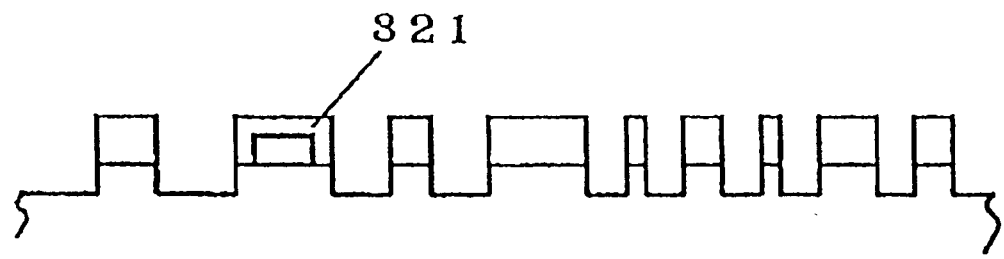

With reference to FIG. 35C, an aluminum layer having a thickness of 300 nm is formed by the spattering method to complete the light reflecting plate 10.

Figure 35D:
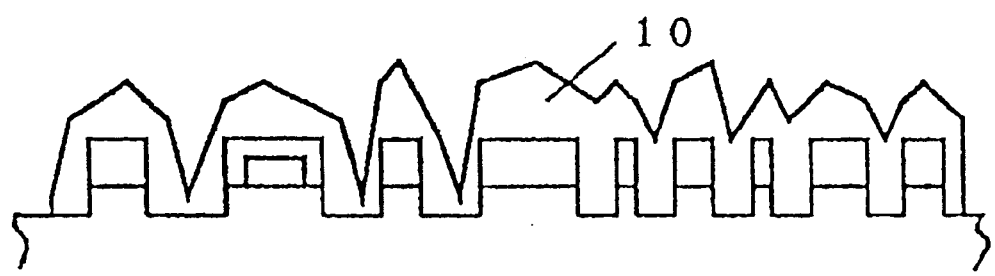

With reference to FIG. 35D, the glass substrate, on which the MIM element is provided, and the opposite side substrate are bonded to each other to complete the liquid crystal display.

According to this embodiment, a monochrome reflecting panel having practically sufficient brightness and whiteness was realized at a low cost. Further, it is preferable that an RGB color filter is arranged on the top substrate 1, a bright color reflection panel may be obtained at a low cost.

Twenty Fourth Embodiment

FIGS. 36A through 36E are cross-sectional elevation views illustrative of the fabrication processes for the bottom substrate with the light reflection plate in the reflective liquid crystal display according to the twenty fourth embodiment of the present invention. The display according to this embodiment has almost the same structure of the twenty third embodiment.

Figure 36A:
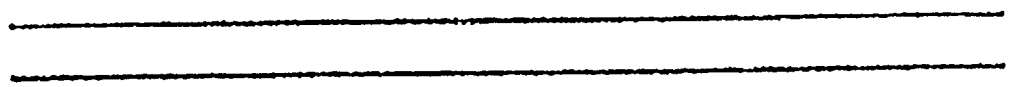

With reference to FIG. 36A, a tantalum layer for the lead electrode is formed on the glass substrate 5 by a spattering method before the lead electrode 291 are formed at the same time when the convex patterns 292 is formed.

Figure 36B:

With reference to FIG. 36B, the lead line 291 is immersed in a solution including 0.1% by weight of a citric acid and a constant voltage of 2 V is applied thereto to conduct an anodic oxidation, whereby the surface of the lead electrode is covered with an anodic oxidation insulating thin film 321. The thickness of the anodic oxidation insulating thin film 321 is about 200 nm.

Figure 36C:

With reference to FIG. 36C, a silicon dioxide insulating layer having a thickness of 600 nm is deposited thereon. By etching the silicon oxide layer, the island 322 for the MIM diode region and the convex patterns 323 are formed simultaneously.

Figure 36D:
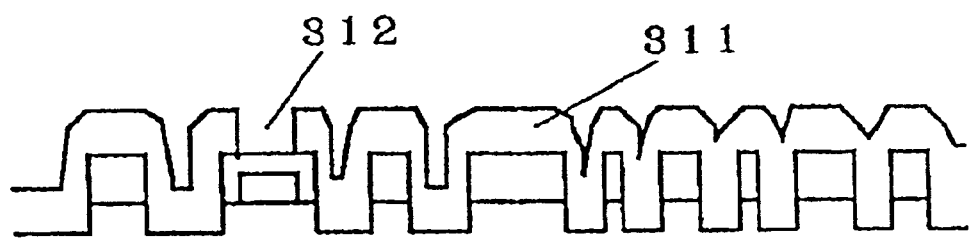

With reference to FIG. 36D, after the anodic oxidation is conducted, organic system or inorganic system insulating film 311 is formed, and then the contact holes 312 are provided.

Figure 36E:
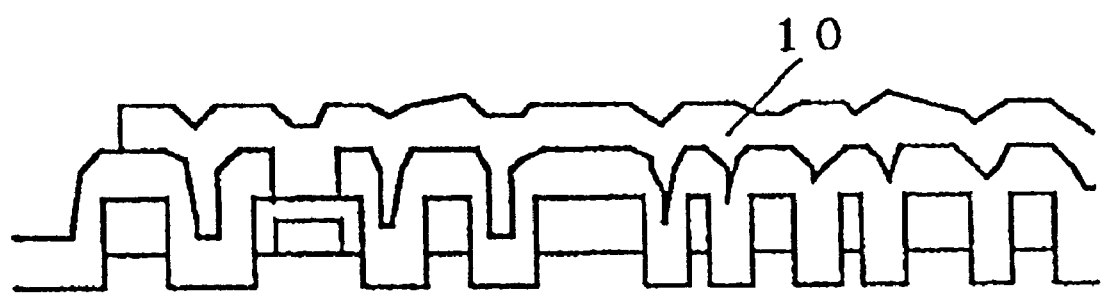

With reference to FIG. 36E, an aluminum film having a thickness of 300 nm is formed by the spattering to complete the light reflecting plate 10. In this embodiment, a photosensitive polyimide is used as the organic or non-organic system insulating film.

After the photo sensitive polyimide (RN-9019) is applied, the substrate is preliminary baked at a temperature of 90° C. and after the pattern is formed by exposure and development, the substrate is primary baked at a temperature of 250° C. for 30 minutes, whereby the convex patterns, the MIM element, and the upper portion of the lead line are covered with the polyimide film of 0.5 to 2 micrometers.

In this embodiment, one more photolithography step than that of the twenty third embodiment is necessary to form the polyimide film. However, the oblique angle of the side walls of the convex patterns becomes small, so that the light reflection performance of the light reflecting plate can be set optimum. Further, the manufacturing cost for the light reflecting type liquid crystal display using the MIM diode becomes lower than the conventional display.

Similar to the nineteenth embodiment, the glass substrate on which the MIM element is provided and the opposite side substrate are bonded to each other to complete the liquid crystal display. According to the present invention, the unevenness formed on the light reflecting plate, by which the light reflection performance of the liquid crystal display is determined, is formed at the same time when pattern for the active matrix driving element is formed, therefore the light reflecting type liquid crystal display having an excellent display performance can be obtained with a low manufacturing cost.

Whereas modifications of the present invention will be apparent o a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. A light reflection plate for a reflective liquid crystal display, comprising:

a substrate;

plural rigid projections on a surface of said substrate, said projections being irregularly shaped and having side walls defining apertures, bottoms of said apertures being said surface of said substrate, said substrate comprising recessed portions between said projections; and a light reflective film comprising an electrically conductive material extending continuously over said projections, said film having a rough surface with peaks and valleys that are related to the corresponding irregularly shaped plural rigid projections and apertures thereebeneath.

2. The plate of claim 1, wherein the plate comprises thin film transistors on said surface of said substrate, said thin film transistors comprising plural layers of materials, and wherein said projections comprise plural layers of said materials that correspond layer-for-layer with said materials of said plural layers of said thin film transistors.

3. The plate of claim 1, wherein said side walls are substantially perpendicular to said surface of said substrate.

4. The plate of claim 1, wherein said side walls are oblique to said surface of said substrate.

5. The plate of claim 1, further comprising an interlayer insulator between said projections and said light reflective film, said insulator having a rough surface corresponding to the peaks and valleys of said film.

6. A liquid crystal display device comprising the light reflection plate of claim 1.

7. The plate of claim 1, wherein the display comprises metal-insulation metal (MIM) diodes on said surface of said substrate, said MIM diodes comprising plural layers of materials, and wherein said projections comprise plural layers of said materials that correspond layer-for-layer with said materials of said plural layers of said MIM diodes.

8. The plate of claim 1, wherein tops of a plurality of said irregularly shaped projections have irregular notches therein.

9. The plate of claim 1, wherein said projections have a plurality of different heights and widths.

10. A method for forming a light reflection plate on a substrate for a reflective liquid crystal display device, said method comprising the steps of:

forming irregularly shaped and diversely positioned, rigid projections on a surface of the substrate, the projections having sidewalls defining apertures, bottoms of the apertures being the substrate;

forming recessed portions in the substrate between the projections; and forming a conductive light reflective film continuously over the projections and the apertures so that the light reflective film possesses a rough surface with convex and concave portions having positions and sizes related to positions and sizes of the projections.

11. The method of claim 10, further comprising the steps of forming thin film transistors on the substrate, the thin film transistors comprising plural layers of materials, and forming the projections with plural layers of the materials that correspond layer-for-layer with the materials of the plural layers of the thin film transistors.

12. The method of claim 10, wherein the side walls are formed substantially perpendicular to the substrate.

13. The method of claim 10, wherein the side walls are formed oblique to the substrate.

14. The method of claim 10, further comprising the step of providing an interlayer insulator between the projections and the light reflective film, the insulator being provided with a rough surface corresponding to the convex and concave portions of the film.

15. The plate of claim 10, further comprising the steps of forming MIM diodes on the substrate, the MIM diodes comprising plural layers of materials, and forming the projections with plural layers of the materials that correspond layer-for-layer with the materials of the plural layers of the MIM diodes.

16. The method of claim 10, wherein tops of a plurality of said irregularly shaped projections have irregular notches therein.

17. The method of claim 10, wherein said projections have a plurality of different heights and widths.

* * * * *